(12) United States Patent
Stark et al.

(10) Patent No.: US 7,900,228 B2
(45) Date of Patent: Mar. 1, 2011

(54) MAINTAINING A GRAPHICAL USER INTERFACE STATE THAT IS BASED ON A SELECTED PIECE OF CONTENT

(75) Inventors: Korina J. B. Stark, Seattle, WA (US); Daniel R. Sterling, Mill Creek, WA (US); Michael Stacie, Kirkland, WA (US); Marcellino Tanumihardja, Seattle, WA (US)

(73) Assignee: Vulcan Inc., Seattle, WA (US)

( * ) Notice: Subject to any disclaimer, the term of this patent is extended or adjusted under 35 U.S.C. 154(b) by 777 days.

(21) Appl. No.: 11/120,664

(22) Filed: May 2, 2005

(65) Prior Publication Data

US 2006/0026636 A1 Feb. 2, 2006

Related U.S. Application Data

(60) Provisional application No. 60/567,177, filed on Apr. 30, 2004, provisional application No. 60/667,836, filed on Apr. 1, 2005.

(51) Int. Cl.
*H04N 5/445* (2006.01)
*G06F 13/00* (2006.01)
*G06F 3/00* (2006.01)

(52) U.S. Cl. .................. 725/45; 725/37; 725/39; 725/40; 725/43; 348/563

(58) Field of Classification Search ............... 725/28, 725/30, 39, 13, 14, 46, 47, 50, 37, 41–43; 348/13, 906, 3, 731, 734, 564, 569; 345/326, 345/327, 146, 352
See application file for complete search history.

(56) References Cited

U.S. PATENT DOCUMENTS

| 5,473,609 | A |   | 12/1995 | Chaney |         |
|-----------|---|---|---------|--------|---------|
| 5,585,838 | A |   | 12/1996 | Lawler et al. | |
| 5,727,060 | A |   | 3/1998  | Young  |         |
| 5,850,218 | A | * | 12/1998 | LaJoie et al. | 725/45 |
| 5,883,677 | A |   | 3/1999  | Hofmann |        |
| 6,040,829 | A | * | 3/2000  | Croy et al. | 715/864 |
| 6,122,648 | A |   | 9/2000  | Roderick |       |
| 6,151,059 | A | * | 11/2000 | Schein et al. | 725/37 |
| 6,163,345 | A |   | 12/2000 | Noguchi et al. | |

(Continued)

OTHER PUBLICATIONS

Joyce, E., "Gemstar Patent Woes Signal Shift in iTV Tech," Jun. 25, 2002, retrieved Oct. 11, 2005, from http://www.atnewyork.com/news/print.php/1371211, 3 pages.

(Continued)

*Primary Examiner* — Joseph P Hirl
*Assistant Examiner* — Joshua Taylor
(74) *Attorney, Agent, or Firm* — Perkins Coie LLP

(57) ABSTRACT

A graphical user interface ("GUI") for a content management system is provided, such as to present television program information and/or information associated with other forms of multimedia content. In some situations, the GUI displays various types of information about multiple pieces of content that are currently appropriate for display, and one or more users may make various types of selections that affect the information being displayed. In addition, in some situations various techniques are employed to maintain a state of the GUI that is focused on one or more current selections as changes occur, such as to coordinate information display between multiple distinct information panes or other view areas of the GUI, to alter the information to be displayed in the GUI based on a selected piece of content, and/or to enable identification of a selected piece of content from within a large number of pieces of content.

22 Claims, 49 Drawing Sheets

U.S. PATENT DOCUMENTS

| | | | |
|---|---|---|---|
| 6,177,931 B1* | 1/2001 | Alexander et al. | 725/52 |
| 6,347,400 B1 | 2/2002 | Ohkura et al. | |
| 6,363,434 B1 | 3/2002 | Eytchison | |
| 6,370,455 B1 | 4/2002 | Larson et al. | |
| 6,466,971 B1 | 10/2002 | Humpleman et al. | |
| 6,507,950 B1 | 1/2003 | Tsukidate et al. | |
| 6,526,577 B1 | 2/2003 | Knudson et al. | 725/40 |
| 6,536,041 B1 | 3/2003 | Knudson et al. | 725/39 |
| 6,563,430 B1 | 5/2003 | Kemink et al. | |
| 6,564,378 B1 | 5/2003 | Satterfield et al. | 725/40 |
| 6,587,217 B1 | 7/2003 | Lahey et al. | |
| 6,601,238 B2 | 7/2003 | Morrison et al. | |
| 6,640,337 B1 | 10/2003 | Lu | |
| 6,784,805 B2 | 8/2004 | Harris et al. | |
| 6,792,323 B2 | 9/2004 | Krzyzanowski et al. | |
| 6,857,128 B1 | 2/2005 | Borden, IV et al. | 725/39 |
| 6,938,101 B2 | 8/2005 | Hayes et al. | |
| 6,981,273 B1* | 12/2005 | Domegan et al. | 725/39 |
| 7,017,120 B2 | 3/2006 | Shnier | |
| 7,047,547 B2* | 5/2006 | Alten et al. | 725/28 |
| 7,065,777 B2 | 6/2006 | Inoue et al. | |
| 7,136,709 B2 | 11/2006 | Arling et al. | |
| 7,140,033 B1 | 11/2006 | Durden et al. | |
| 7,207,057 B1 | 4/2007 | Rowe | |
| 7,434,153 B2 | 10/2008 | Liu et al. | |
| 7,539,759 B2 | 5/2009 | Narayanan et al. | |
| 2001/0010046 A1 | 7/2001 | Muyres et al. | |
| 2001/0011373 A1 | 8/2001 | Inoue | |
| 2001/0026287 A1 | 10/2001 | Watanabe | |
| 2001/0030950 A1 | 10/2001 | Chen et al. | |
| 2001/0042107 A1 | 11/2001 | Palm | |
| 2002/0013852 A1 | 1/2002 | Janik | |
| 2002/0035404 A1 | 3/2002 | Ficco et al. | |
| 2002/0068558 A1 | 6/2002 | Janik | |
| 2002/0078161 A1 | 6/2002 | Cheng | |
| 2002/0103934 A1 | 8/2002 | Fishman et al. | |
| 2002/0168177 A1 | 11/2002 | Kajitani | |
| 2002/0170057 A1* | 11/2002 | Barrett et al. | 725/41 |
| 2002/0174430 A1 | 11/2002 | Ellis et al. | |
| 2002/0178279 A1 | 11/2002 | Janik et al. | |
| 2003/0023975 A1 | 1/2003 | Schrader et al. | |
| 2003/0048295 A1 | 3/2003 | Lilleness et al. | |
| 2003/0051246 A1 | 3/2003 | Wilder et al. | |
| 2003/0084449 A1 | 5/2003 | Chane et al. | |
| 2003/0086023 A1 | 5/2003 | Chung et al. | |
| 2003/0093790 A1 | 5/2003 | Logan et al. | |
| 2003/0095156 A1 | 5/2003 | Klein et al. | |
| 2003/0103088 A1 | 6/2003 | Dresti et al. | |
| 2003/0110514 A1* | 6/2003 | West et al. | 725/134 |
| 2003/0115593 A1 | 6/2003 | Alten et al. | |
| 2003/0229900 A1 | 12/2003 | Reisman | |
| 2004/0031058 A1 | 2/2004 | Reisman | |
| 2004/0068739 A1 | 4/2004 | Russ et al. | |
| 2004/0070491 A1 | 4/2004 | Huang et al. | |
| 2004/0078815 A1 | 4/2004 | Lemmons et al. | |
| 2004/0083266 A1 | 4/2004 | Comstock et al. | |
| 2004/0253945 A1 | 12/2004 | Janik | |
| 2004/0261040 A1 | 12/2004 | Radcliffe et al. | |
| 2004/0268407 A1 | 12/2004 | Sparrell et al. | |
| 2005/0055716 A1 | 3/2005 | Louie et al. | |
| 2005/0080915 A1 | 4/2005 | Shoemaker et al. | |
| 2005/0188078 A1 | 8/2005 | Kotzin et al. | |
| 2005/0210507 A1 | 9/2005 | Hawkins et al. | |
| 2005/0235047 A1 | 10/2005 | Li et al. | |
| 2005/0262535 A1 | 11/2005 | Uchida et al. | |
| 2005/0278741 A1* | 12/2005 | Robarts et al. | 725/46 |
| 2006/0020962 A1 | 1/2006 | Stark et al. | |
| 2006/0026638 A1 | 2/2006 | Stark et al. | |
| 2006/0031880 A1 | 2/2006 | Stark et al. | |
| 2006/0041927 A1 | 2/2006 | Stark et al. | |
| 2006/0064720 A1 | 3/2006 | Istvan et al. | |
| 2006/0080408 A1 | 4/2006 | Istvan et al. | |
| 2006/0085825 A1 | 4/2006 | Istvan et al. | |
| 2006/0085835 A1 | 4/2006 | Istvan et al. | |
| 2006/0248557 A1 | 11/2006 | Stark et al. | |
| 2006/0253874 A1 | 11/2006 | Stark et al. | |
| 2007/0098362 A1 | 5/2007 | Sharma | |
| 2008/0189737 A1 | 8/2008 | Ellis et al. | |

OTHER PUBLICATIONS

"TiVo Online Scheduling," TiVo.com, retrieved Oct. 11, 2005, from http://www.tivo.com/4.9.6.asp, 2 pages.

"TiVo Desktop," TiVo.com, retrieved Oct. 11, 2005, from http://www.tivo.com/4.9.4.1.asp, 2 pages.

"The TiVo Advantage," TiVo.com, retrieved Oct. 11, 2005, from http://www.tivo.com/1.0.chart.asp, 2 pages.

"TiVo Service," TiVo.com, retrieved Oct. 11, 2005, from http://www.tivo.com/1.2.asp, 3 pages.

"What We Do—TV Guide On Screen," Gemstar-TV Guide International, retrieved Oct. 11, 2005, from http://www.gemstartvguide.com/whatwedo/tvgonscreen.asp, 2 pages.

"Gemstar Wars: Murdoch Strikes Back," Business Week Online, Jun. 3, 2002, retrieved Oct. 11, 2005 from http://www.businessweek.com/print/magazine/content/02_22/b3785064.htm.?chan=mz, 2 pages.

"5500 Features," ReplayTV, retrieved Oct. 11, 2005, from http://www.digitalnetworksna.com/dvr/5500/features.asp, 2 pages.

"5500 Demo," ReplayTV, retrieved Oct. 11, 2005, from http://www.digitalnetworksna.com/demo/, 1 page.

"DigiGuide User Manual," DigiGuide Interactive TV & Radio Guide, Apr. 28, 2005, retrieved Oct. 11, 2005, from http://www.digiguide.com/support/DigiGuideUserManual.pdf, pp. 1-35.

"Project Standard Guide," Microsoft Corporation, 2003, retrieved Oct. 11, 2005, from http://download.microsoft.com/download/2/9/d/29d9b1f1-f875-430e-8138-8d0a23dbd1c4/ProjectStdGuide.doc, 28 pages.

"Microsoft Office Outlook 2003 Product Guide," Microsoft Corporation, 2004, retrieved Oct. 11, 2005 from http://download.microsoft.com/download/2/d/9/2d9e7b12-f966-422c-82c4-679ba323d1ab/Outlook2003ProductGuide.doc, pp. 1-73.

McLean, S. et al., "Understanding the .NET Remoting Architecture," Microsoft .NET Remoting, Chapter 2, http://proquest.safaribooksonline.com/print?xmlid=0735617783/ida5rzr, 5 pages [accessed on Sep. 24, 2008].

Tindall, P. "Taking the Enterprise Application to the Net," Developing Enterprise Applications-An Imputrist's View, Chapter 12, http://proquest.safaribooksonline.com/print?xmlid=0789722690/ch12Iev1sec1, 8 pages [accessed on Sep. 24, 2008].

"Slink-e Specs," Device features, Nirvis, Inc., 2001, http://www.nirvis.com/slinke_specs.htm, 2 pages [Internet accessed on Jul. 10, 2008].

"CDJ Compatibility," Nirvis, Inc., 2001, http://www.nirvis.com/cdj_compat.htm, 4 pages, [Internet accessed on Jul. 10, 2008].

"Slink-e Schematic," Datasheet, Nirvis, Inc., 2001, http://www.nirvis.com/schemati2_0.htm, 2 pages [Internet accessed on Jul. 10, 2008].

Phillips, W., "The Nirvis Slink-e and CDJ Software," Product Review, Jun. 15, 2001, http://www.onhifi.com/product/nirvis_slinke.htm, 4 pages [Internet accessed on Jul. 9, 2008].

"CDJ Features," Nirvis, Inc., 2001, http://www.nirvis.com/cdj_features.htm, 2 pages, [Internet accessed on Jul. 10, 2008].

"Slink-e," Product Controllng Panels, Nirvis, Inc., 2001, http://www.nirvis.com/slink-e.htm, 1 page [Internet accessed on Jul. 9, 2008].

CDJ Screenshot, CDJ GUI Interface, Nirvis, Inc., 2001, http://www.nirvis.com/Images/ir/screenshot.gif, 1 page [Internet accessed on Jul. 10, 2008].

Block, R. "Toss that remote, score one for cellphones," Jun. 30, 2004, http://engadget.com/entry/5178754663242732/, 3 pages [Internet accessed on Jan. 20, 2005].

Zap2it, TV Listings Printable Grid, http://tvlistings.zap2it.com/grid_printable.asp, 1 page [Internet accessed on Mar. 18, 2005].

Dudley, B, "Consumer Electronics Show: Buzz is on Home-Media centers," Rearden Studios, Jan. 6, 2002, http://www.rearden.com/articles/seattletimesjan0602.html, 3 pages [Internet accessed on Mar. 18, 2005].

"About HAVi—HAVi Essentials—Fast Track," HAVi, http://www.havi.org/about/aboutoverview.asp 2 pages [Internet accessed on Mar. 18, 2005].

Chen, K. et al., "Programming Open Service Gateways with Java Embedded Server Technology," Chapter 1, Addison Wesley Professional, ed. 1, Aug. 30, 2001, http://awprofessional.com/title/0201711028, cover page & pp. 1-14 [Internet accessed on Jan. 26, 2005].

Yomogita, H., "PnP Middleware Connects Home Appliances for Networking," Nikkei Electronics—Asia, Special Report, Aug. 1999, http://nikkeibq.com/nea/aug99/specrep, 7 pages [Internet accessed on Jan. 26, 2005].

"Understanding Universal Plug and Play," Microsoft Windows, Me-Millennium Edition, White Paper, Jun. 2000, 45 pages.

"Jini Network Technology—An Executive Overview," Sun Microsystems, Inc., Palo Alto, CA, Feb. 2001, 19 pages.

"The Connected Home Powered by Java Embedded Server TM Software—White Paper," Sun Microsystems, Inc., Palo Alto, CA, Dec. 2000, 28 pages.

"JXTA Technolgy: Creating Connected Communities," Sun Microsystems, Inc., Palo Alto, CA, Jan. 2004, http://www.jxta.org/project/www/docs/JXTA-Exec-Brief.pdf, 6 pages [Internet accessed on Nov. 8, 2004].

"GigaSpaces Platform—White Paper," GigaSpace Technologies, Ltd., Feb. 25, 2002, http://webarchive.org/web/20030607073327/j-spaces.com/dowload/GigaSpacesWhitePaper.pdf, 14 pages [Internet accessed on Nov. 8, 2004].

"Technical JXTA™ FAQ," http://www.jxta.org/JXTAFAQTech.html, 10 pages [Internet accessed on Nov. 8, 2004].

"General JXTA™ FAQ," http://www.jxta.org/JXTAFAQ.html, 12 pages [Internet accessed on Nov. 8, 2004].

Final Office Action for U.S. Appl. No. 11/120,656, Mail Date Apr. 30, 2009, 19 pages.

Final Office Action for U.S. Appl. No. 11/397,531, Mail Date Aug. 13, 2009, 36 pages.

"Windows Media-Windows Media Player," Microsoft Corporation, 2004, http://download.microsoft.com/download/0/b/8/0b89049d-dc57-4571-aa69-cf592743a241/WMPlayer.doc, 211 pages [Internet accessed on Apr. 4, 2006].

* cited by examiner

MAINTAINING A GRAPHICAL USER INTERFACE STATE THAT IS BASED ON A SELECTED PIECE OF CONTENT

CROSS REFERENCE TO RELATED APPLICATIONS

The present application claims the benefit under 35 U.S.C. §119(e) of U.S. Provisional Patent Application Ser. No. 60/567,177, entitled "Browser For Multimedia Content" and filed Apr. 30, 2004, and of U.S. Provisional Patent Application Ser. No. 60/667,836, entitled "Interface For Manipulating Multimedia Content" and filed Apr. 1, 2005, each of which is incorporated herein by reference in its entirety.

The present application is also related to U.S. patent application Ser. No. 11/120,641, entitled "Maintaining A Graphical User Interface State That Is Based On A Selected Type Of Content," to U.S. patent application Ser. No. 11/120,642, entitled "Maintaining A Graphical User Interface State That Is Based On A Selected Time," and to U.S. Provisional patent application Ser. No. 60/677,059, entitled "Interface For Manipulating Multimedia Content," each of which is filed concurrently, and each of which is hereby incorporated by reference in its entirety.

TECHNICAL FIELD

The present disclosure generally relates to techniques for reviewing, manipulating and presenting content, such as to manage television-related content via a graphical user interface of a computing device in such a manner as to maintain a state of the GUI that is focused to reflect one or more selected pieces of content.

BACKGROUND INFORMATION

In the current world of television, movies, and related media systems, many consumers receive television programming-related content via broadcast over a cable network to a television or similar display, with the content often received via a set-top box ("STB") from the cable network that controls display of particular television (or "TV") programs from among a large number of available television channels, while other consumers may similarly receive television programming-related content in other manners (e.g., via satellite transmissions, broadcasts over airwaves, over packet-switched networks, etc.). In addition, enhanced television programming services and capabilities are increasingly being provided to consumers, such as the ability to receive television programming-related content that is delivered "on demand" using Video on Demand ("VOD") technologies (e.g., based on a pay-per-view business model) and/or various interactive TV capabilities. Consumers generally subscribe to services offered by a cable network "head-end" or other similar content distribution facility to obtain particular content, which in some situations may include interactive content and Internet content.

Consumers of content are also increasingly using a variety of devices to record and control viewing of content, such as via digital video recorders ("DVRs") that can record television-related content for later playback and/or can temporarily store recent and current content to allow functionality such as pausing or rewinding live television. A DVR may also be known as a personal video recorder ("PVR"), hard disk recorder ("HDR"), personal video station ("PVS"), or a personal television receiver ("PTR"). DVRs may in some situations be integrated into a set-top box, such as with Digeo's MOXI™ device, while in other situations may be a separate component connected to an STB and/or television. In addition, electronic programming guides ("EPGs") are often made available to aid consumers in selecting a desired program to currently view and/or to schedule for delayed viewing. Using an EPG and a DVR, a consumer can cause a desired program to be recorded and can then view the program at a more convenient time or location.

However, as the cable industry grows and as additional types of content are increasingly being stored and made available to consumers, it is becoming increasingly difficult for consumers to effectively manage the content and the related capabilities of the various devices that are available. Moreover, the proliferation of networked presentation devices within homes (e.g., televisions, handheld and desktop computing systems, stereos, speakers, cell phones, etc.) makes the task of effectively managing the content, including its presentation via the various devices, even more difficult.

BRIEF DESCRIPTION OF THE DRAWINGS

Non-limiting and non-exhaustive embodiments are described with reference to the figures, wherein like reference numerals refer to like parts throughout the various views unless otherwise specified.

DETAILED DESCRIPTION

Figure 1:
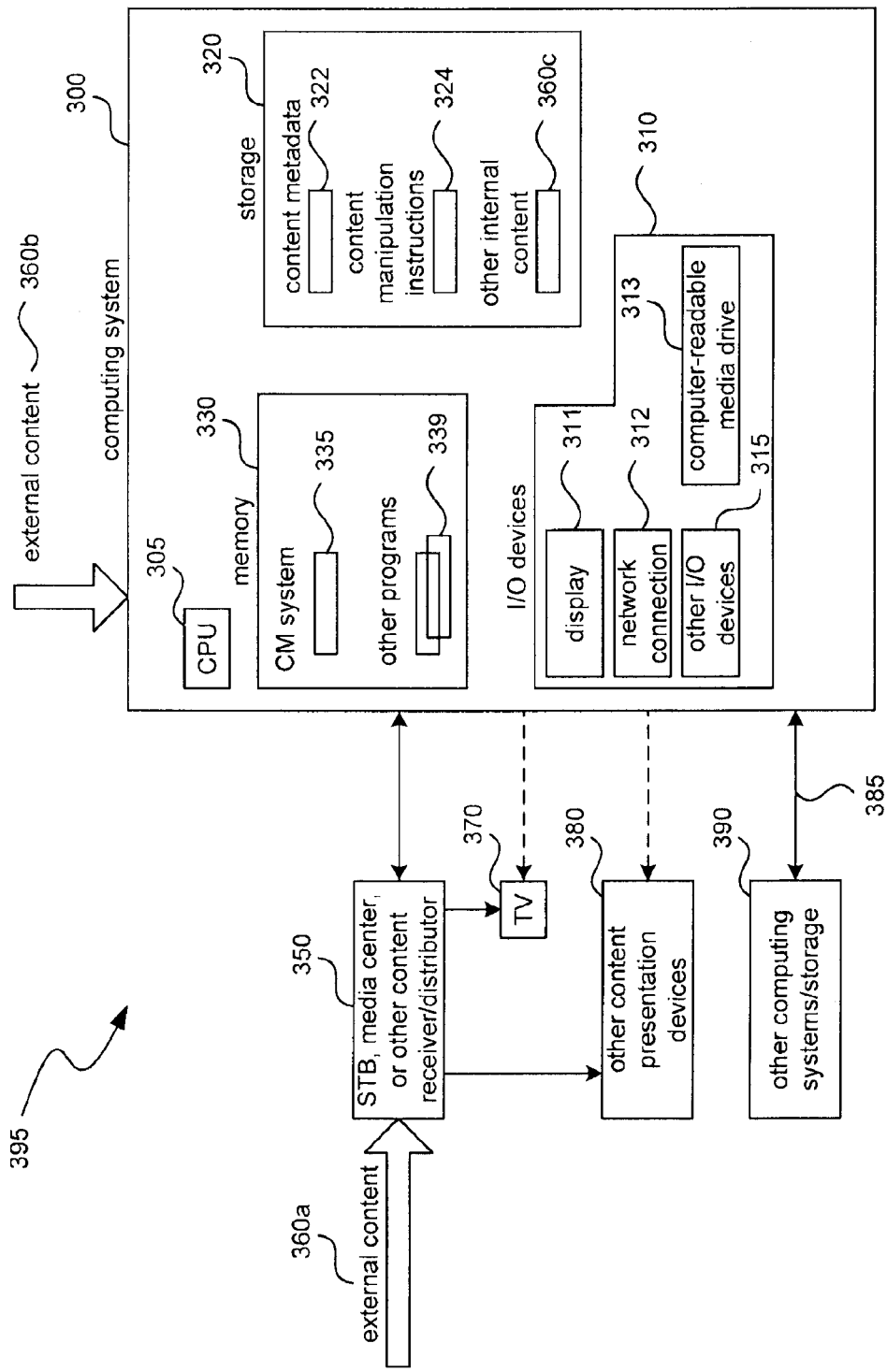
FIG. 1 is a block diagram of an embodiment of a content management ("CM") system environment that can provide a time-based GUI to manage content.

Techniques are described below for managing various types of content in various ways, such as via a graphical user interface ("GUI") of a Content Management ("CM") system executing on a computing device, such as a GUI displayed in a single graphical window with multiple display areas to display varying types of information and controls. In some embodiments, at least some of the content being managed includes television programming-related content, with the CM system receiving EPG metadata information for the content (e.g., via interactions with an STB). In such embodiments, the television programming-related content can then be managed via the CM system GUI so as to maintain a state of the GUI as the content changes, such as for a GUI that is presenting information in such a manner as to reflect a prior user selection of a piece of content or on another type of selection. Such content changes may occur, for example, when a user locates and identifies content of potential interest, schedules recordings of selected content, manages previously recorded content in various ways (e.g., to play or delete the content), controls live television, modifies the manner in which the GUI presents information in various ways, etc. In addition, the CM system may further manage various other types of contents and perform various other types of content management functions, as described in greater detail below.

In at least some embodiments, the CM system GUI displays a variety of types of information about a group of multiple pieces of content that are chosen as being currently appropriate for display, as discussed in greater detail below, such as based on those pieces of content having presentation times or other associated times that correspond to a currently selected time period and/or based on those pieces of content having other appropriate characteristics (e.g., characteristics that match user-specified search criteria or information filtering criteria). In addition, in at least some embodiments one or more users of the CM system GUI may make various types of current selections via the GUI that affect the information being displayed in the GUI—for example, a user may select a piece of content for which various detail information is displayed, may select a time of interest for which corresponding pieces of content are displayed (e.g., content corresponding to a currently selected period of time based on the selected time), may select one or more criteria of interest such that matching or otherwise corresponding pieces of content are identified, etc. Moreover, in at least some embodiments a current state of the CM system GUI may be focused to reflect one or more such current selections by users, such as to present in a coordinated manner various types of information that are based on or otherwise related to the current selections, as discussed in greater detail below. Furthermore, in at least some such embodiments various techniques are employed to maintain such a focused state of the CM system GUI as changes occur with respect to the GUI, such as changes in the types of information being displayed and/or changes in pieces of content for which information is being displayed.

Embodiments of the CM system GUI may display or otherwise present various types of Information about various pieces of content in various manners. For example, in some embodiments the CM system GUI simultaneously displays at least some metadata information about multiple pieces of content in a single view area, as discussed in greater detail below, such as to provide information about multiple television programs that are available for display on one or more channels during a specified period of time (e.g., by displaying a grid whose rows each correspond to a distinct channel and whose columns each correspond to a distinct time segment within the specified period of time, such as half-hour time segments for a period of time of multiple hours). In addition, in at least some embodiments the CM system GUI also includes one or more other distinct information panes or other display areas that may each simultaneously display distinct information, as discussed in greater detail below, such as information about different pieces of content and/or different types of information (e.g., different levels of detail of information) for a single piece of content (e.g., a currently selected piece of content, such as a television program).

Thus, the CM system GUI may provide various types of information about various pieces of content that are currently appropriate for display, and in at least some embodiments may modify the types of information being displayed and/or the pieces of content for which the information is being displayed in various manners. For example, as discussed in greater detail below, various techniques and user-selectable controls are provided in various embodiments for displaying, sorting, identifying, filtering, and otherwise managing content, and user selections related to such controls may cause changes in the pieces of content that are currently appropriate for display and/or in one or more currently selected pieces of content. As one example, in at least some embodiments the metadata information displayed in a single view area for multiple pieces of content may be displayed using different types of views, as discussed in greater detail below, such as a grid-based view, a channel-based view, an icon-based view, a list-based view, and a tree-based view. In addition, the GUI may further automatically modify the types of information being displayed and/or the pieces of content for which the information is being displayed in various manners, such as to update a currently selected period of time and the corresponding pieces of content based on changes in the current time.

As noted above, in at least some embodiments the CM system GUI displays information such that a state of the GUI is focused based on one or more current selections. For example, in some embodiments one or more pieces of content may be currently selected (e.g., based on one or more prior selections by a user), and if so at least portions of the GUI may be focused to reflect those currently selected pieces of content, such as by simultaneously displaying various types of information related to the currently selected pieces of content in a coordinated manner in multiple distinct display areas of the GUI. In addition or alternatively, in some embodiments one or more types of content may be currently selected (e.g., based on user selection of a predefined genre or category of content, based on a user specification of one or more criteria that identify content characteristics of interest, etc.), and if so at least portions of the GUI may be focused to reflect those currently selected types of content, such as by displaying various types of information related to content of those currently selected types in a coordinated manner in multiple distinct display areas of the GUI (e.g., by displaying only content of those currently selected types, by displaying content of those currently selected types in a manner distinct from other content, etc.). Moreover, in some embodiments one or more times may be currently selected (whether instead of or in addition to one or more currently selected pieces of content and/or one or more currently selected types of content), such as based on user selection of a time displayed in one or more timebars, and if so at least portions of the GUI may be focused to reflect those currently selected times, such as by displaying various types of information related to content corresponding to those currently selected times in a coordinated manner in multiple distinct display areas of the GUI (e.g., by displaying only such corresponding content, by displaying such corresponding content in a manner distinct from other content, etc.).

In addition, in at least some embodiments a state of the CM system GUI that is focused to reflect one or more currently selected pieces of content may be maintained in various ways, such as when changes occur in the CM system GUI and/or in information displayed in the GUI. For example, when information in one or more display areas of the GUI changes (e.g., when the display of metadata information for multiple pieces of content in a single view area changes, such as based on changing a type of view for the information and/or changing some or all of the pieces of content for which metadata information is being displayed), corresponding information in one or more other display areas of the GUI may be updated so as to maintain a coordination among the displayed information. In addition, when such information in one or more such display areas of the GUI changes, the changed information may also be displayed in such a manner as to include or emphasize a currently selected piece of content on which the GUI state is focused (e.g., when possible, such as when the changed information includes information for the currently selected piece of content, or instead always, such as to cause information for the currently selected piece of content to be included in the changed information). Emphasizing information about a currently selected piece of content in the GUI can be particularly beneficial when large numbers of pieces of content are available, for example, and may be performed in a variety of ways (e.g., by changing a visual representation of an indication of the currently selected piece of content, such as a color or a degree of highlighting, by adding a suitably colored line or other graphical indication around displayed information for the currently selected piece of content, etc.). Moreover, if information about a currently selected piece of content is not currently displayed in one or more display areas of the GUI, various controls and capabilities may be provided to assist a user in easily locating the currently selected piece of content, such as to find the currently selected piece of content in a current view.

Similarly, in at least some embodiments a state of the CM system GUI that is focused to reflect one or more currently selected types of content and/or currently selected times may be maintained in various ways, such as in manners similar to those described with respect to a currently selected piece of content. For example, information in multiple display areas of the GUI that relates to one or more current selection may be updated so as to maintain a coordination among the displayed information, and information may be displayed in such a manner as to include or emphasize content that corresponds to current selection(s) on which the GUI state is focused (e.g., content of a currently selected type and/or content that corresponds to a currently selected time). In addition, various controls and capabilities may be provided to assist a user in easily selecting or identifying content that corresponds to one or more current selections.

For illustrative purposes, some embodiments are described below in which specific types of content are managed in specific ways via specific example embodiments of the CM system GUI. For example, while in some embodiments the techniques are described with respect to maintaining state information for a GUI while managing information related to live television, in other embodiments a variety of other types of television programming-related content may be managed, such as programs that are scheduled, that are being recorded, that are already recorded, that are available on Demand or otherwise at the request of a user, etc. However, the techniques can be used in a wide variety of other situations, and that the invention is not limited to the specific illustrative details discussed. For example, the techniques described with respect to maintaining state information for a GUI while managing information may further apply to a variety of other types of content, with the term multimedia "content" as used herein generally including television programs, movies and other video information (whether stored, such as in a file, or streamed), photos and other images, music and other audio information (whether stored or streamed), presentations, video/teleconferences, videogames, Internet Web pages and other data, and other similar video or audio content.

Referring first to FIG. 1, a network diagram illustrates an example use of an embodiment of the CM system in a home environment 395 for entertainment purposes, although the CM system could similarly be used in business or other non-home environments and for purposes other than entertainment. In this example, the home environment includes an STB or other media center 350 receiving external content 360a that is available to one or more consumers (not shown) in the home environment 395, such as television programming-related content 360a for presentation on a television 370. Other types of audio and/or video content could similarly be received by and/or stored by the media center 350 and presented to the consumer(s) on the television and/or optional other content presentation devices 380 (e.g., other televisions, a stereo receiver, stand-alone speakers, the displays of various types of computing systems, a digital picture frame, etc.) in the home environment 395.

The home environment 395 also includes an example computing system 300 suitable for executing a software embodiment of the CM system, as well as one or more optional other local computing systems and/or storage devices 390 with which the computing system 300 can interact via local network 385 (e.g., a wireless or wired/cabled LAN). In the illustrated embodiment, the computing system includes a CPU 305 or other processor(s), various I/O devices 310, storage 320, and memory 330, and the illustrated I/O devices include a display 311, a network connection 312, a computer-readable media drive 313, and other I/O devices 315 (e.g., a keyboard, a mouse, a pointing device, speakers, etc.). In some embodiments, the computing system 300 may further interact with one or more external computing systems, not shown (e.g., via the World Wide Web or otherwise via the Internet), such as to receive additional external content 360b and/or other information or services.

In the illustrated embodiment, the computing system 300 interacts with the media center 350 in a variety of ways (e.g., via a direct connection, as part of local network 385, or as part of another network, not shown), including to receive information about current and/or future television programming-related content 360a and/or other content 360a. In this example, the information received by the computing system 300 includes EPG metadata information for the television programming-related content (e.g., from a cable network operator), and can further include a variety of other types of metadata for the content 360a, whether from the cable network operator or other third-parties (e.g., from various external computing systems, not shown, such as via external content 360b). This received content metadata is then stored in a content metadata database 322 (or other suitable data structure) in the illustrated embodiment for use by the CM system.

An embodiment of the CM system 335 is executing in memory 330. As discussed in greater detail below, the CM system provides information about the available content to one or more users (e.g., one or more of the consumers in the home environment), such as via a GUI that is displayed on the display device 311 and/or on one or more of the content presentation devices 370 or 380 or other computing systems 390. The CM system may, for example, provide some or all of the stored content metadata 322 to the users and allow the user to manipulate the content in a variety of ways (e.g., to select content for current presentation, for future recording, etc.), as well as in some embodiments maintaining a state of the GUI as displayed information changes. As the user provides instructions related to manipulation of the content, those content manipulation instructions are in the illustrated embodiment stored in a database 324 (or other suitable data structure) on storage 320 for later retrieval and use by the CM system, and at least some such content manipulation instructions may additionally in some embodiments be provided to the media center 350 for use in actually performing the tasks to satisfy the manipulation instructions. In addition, in some embodiments the CM system may also interact with other executing programs in order to provide additional information and/or functionality to the user(s), such as one or more optional executing other programs 339 in memory 330 or instead remote executing programs (not shown) on another computing system.

In the illustrated embodiment, the CM system does not itself present the external content 360a to the user(s), instead interacting with the media center 350 to control the display of the content to the user via the TV and/or one or more of the other content presentation devices. However, in other embodiments the CM system may instead receive some or all of the external content 360a, whether via the media center 350 or instead directly from the source of that content, and if so could directly control the presentation of that content to the user(s) on the display device 311 and/or other content presentation device 370 or 380 or other computing system 390. Conversely, in the illustrated embodiment the computing system 300 and/or media center 350 may have access to additional content, such as external content 360b (e.g., from remote computing systems over the Internet), locally stored other content 360c on storage 320, and/or other locally accessible content (not shown), such as from one or more of the other computing systems/storage devices 390—if so, the computing system 300 may in some embodiments directly present some or all of that content to the user(s), such as on display device 311 (e.g., as part of the CM system GUI) and/or on one or more other content presentation devices 370 or 380 or other computing system 390, while in other embodiments may present some or all of that content to the user(s) by instead interacting with the media center 350 to facilitate the presentation (e.g., by providing the additional content to be presented and/or associated instructions to the media center). As previously noted, the additional content may be content related to the external content 360a but from another source (e.g., additional television-related programming, such as streamed or downloaded over a computer network) and/or multimedia content of other types (e.g., movies and other video information, photos and other images, music and other audio information, presentations, video/teleconferences, videogames, Internet Web pages and other data, etc.).

The functionality of the CM system can be accessed in various ways in various embodiments. For example, some users may have physical access to the computing system 300, and if so can interact with the various I/O devices 310 to provide and/or receive information. Alternatively or additionally, other users may use other client computing devices to remotely access the CM system, such as other local computing systems 390 or instead one or more remote computing systems, not shown (e.g., via the World Wide Web or otherwise via the Internet). Such remote users may use software or other functionality provided on the client computing systems (not shown), such as a browser, to interact with the CM system. In other embodiments, users may receive functionality and/or information from the CM system indirectly via interactions with one or more other devices, such as the media center 350, which may directly receive that functionality or information from the CM system before providing it to the users.

As one example, in some embodiments the computing system 300 and/or one of more of the computing systems 390 is a cellphone (e.g., a smartphone) or other mobile or handheld device with communications capabilities (e.g., a Pocket PC computer, a PDA, an electronic organizer, etc.), and if so the user may use that device to manage content in various ways. In such embodiments, the communications between the cellphone or other device and other computing systems and devices in the example home environment may occur in various manners. For example, some devices may support various types of local communication mechanisms (e.g., wireless communications via Bluetooth, Wi-Fi, direct infrared, etc.) and/or communication mechanisms that may be used remotely (e.g., if the device supports Internet access, such as via GPRS and using HTTP or WAP, or instead using a standard telecommunications link for exchanging voice and other audio information), and may further support various communication and messaging protocols (e.g., Universal Plug-and-Play (or "UPnP"), Home Audio Video Interoperability (or "HAVI"), etc.). When a device supports both local and remote communication mechanisms, the device may further be configured to seamlessly switch between local and remote communications as appropriate, such as to automatically use local communications when available and to use remote communications otherwise, or instead may use various communications as directed by the user. Remote communications may be appropriate, for example, when the device is remote from the home environment (e.g., outside a building that contains the home environment, not shown, such as at significant distances), such as to perform some or all data exchange via Internet access and/or using voice commands over a standard telecommunication link. In addition, various types of devices may have varying communications abilities, and thus devices in various embodiments may use different forms of communication for a single type of information exchange.

Figure 30A:
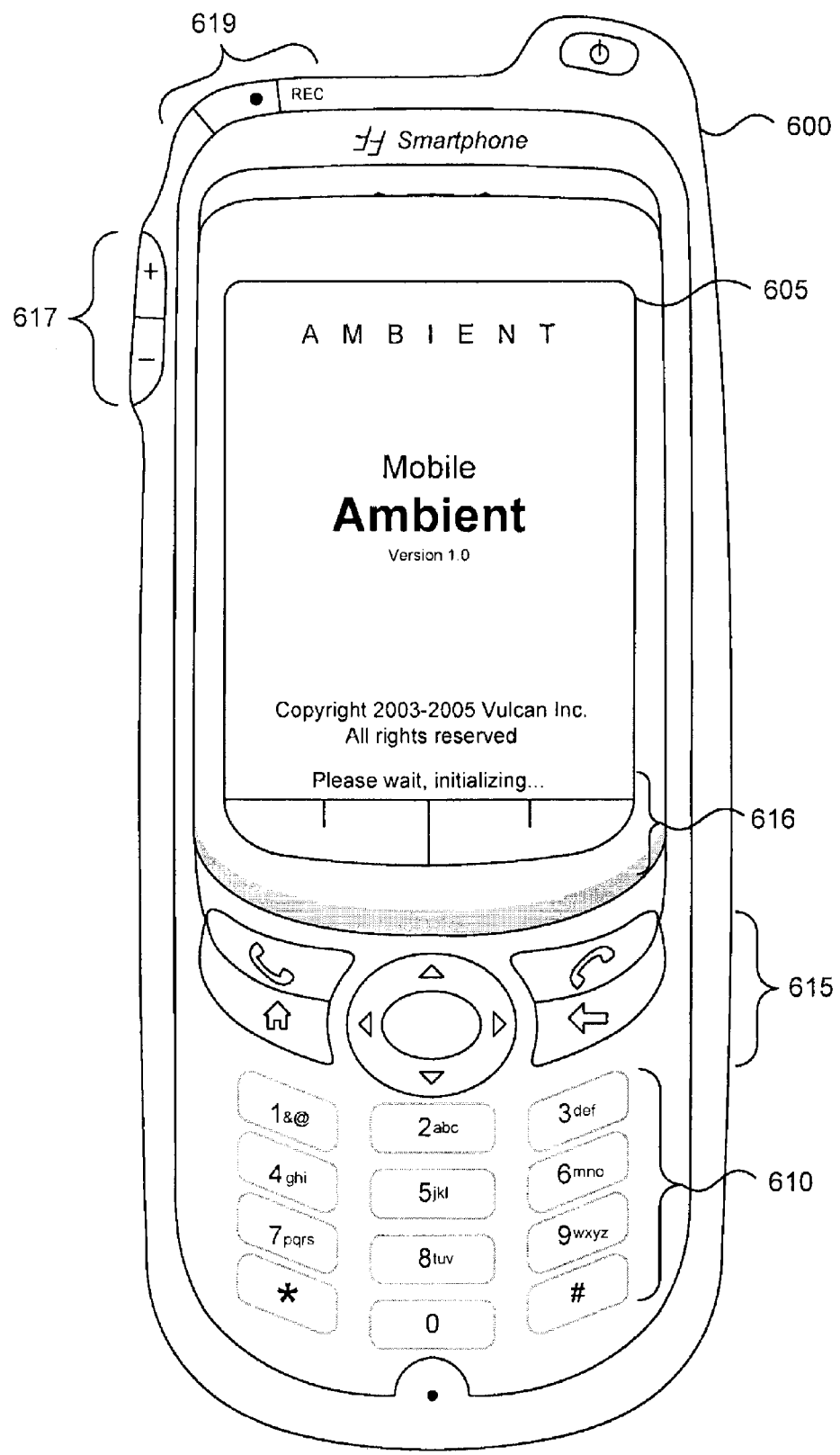
FIGS. 30A-30S provide examples of a GUI and related capabilities that may be used in some embodiments with a cellphone or other device with limited display and/or input capabilities.

When a user uses a cellphone or other mobile or handheld device to manage content, various types of information may be exchanged in various ways. For example, software to implement at least a portion of the CM system on the device and/or to interact with a remote executing CM system may be preinstalled on the device when provided to the user (e.g., by the distributor of the device) and/or may be downloaded to the device after the user has the device (e.g., as an executable file from another local computing system to which the device has a physical or wireless connection, or directly from a remote Web site if the device supports Internet access). EPG information and/or other types of metadata may similarly be provided to the device in various ways, such as via Internet access to a local computing system (e.g., computing system 300) and/or a remote computing system, or instead from a local computing system and/or media center device 350 via local communication mechanisms. Commands and other information from the user may similarly be provided from the device to computing systems and other devices in the home environment in various ways, including via Internet access and/or local communication mechanisms. FIGS. 30A-30S provide examples of a GUI and related capabilities that may be used in some embodiments with a cellphone or other device with a limited display screen and/or limited input device capabilities (e.g., a device without an alphanumeric keyboard), as discussed in greater detail below—in at least some such embodiments, a state of the example GUI is maintained to reflect one or more current selections, such as when changes occur in information being displayed via the example GUI.

Computing system 300 is merely illustrative and is not intended to limit the scope of the present invention. For example, the computing system may instead be comprised of multiple interacting computing systems or devices, and may be connected to other devices that are not illustrated, including through one or more networks such as over the World Wide Web ("Web") or otherwise via the Internet. More generally, the computing system 300 and/or the other computing systems 390 may each comprise any combination of hardware or software that can perform the described techniques, including (without limitation) desktop or other computers, network devices, Internet appliances, PDAs, cordless and other wireless phones, cellphones, devices with walkie-talkie and other push-to-talk capabilities, personal/digital video recorders, pagers, electronic organizers, television-based systems and various other consumer products that include appropriate inter-communication and computing capabilities. In addition, the functionality provided by the CM system may in some embodiments be distributed in additional systems, and the CM system may have multiple components that each provides a portion of the functionality of the system. Similarly, in some embodiments some of the illustrated types of functionality of the CM system may not be provided and/or other additional functionality may be available.

While various items are illustrated as being stored in memory or on storage while being used, these items or portions of them can be transferred between memory and other storage devices, such as for purposes of memory management and data integrity. Alternatively or additionally, in other embodiments some or all of the software system (or portions of it) may execute in memory on another device and communicate with the illustrated computing system via inter-computer communication. Some or all of the system and/or data structures (e.g., portions of a database, such as one or more tables or views or portions thereof) used by the system may also be stored (e.g., as software instructions or structured data) on a computer-readable medium, such as a hard disk, a memory, a computer network or other transmission medium, or a portable media article (e.g., a CD, DVD or flash memory device) to be read by an appropriate drive or via an appropriate connection. Some or all of the system and data structures may also be transmitted via generated data signals (e.g., by being encoded in a carrier wave or otherwise included as part of an analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, one or more embodiments may be practiced with other computer system configurations.

FIGS. 2-28 illustrate examples of information and capabilities provided by an embodiment of the CM system. More particularly, features of an example GUI are shown and described, including a variety of information and user-selectable controls, and with the example GUI maintaining state to reflect current selections in various ways. While specific layouts and formats are shown, such specific details are not intended to be limiting or exhaustive.

Figure 2:
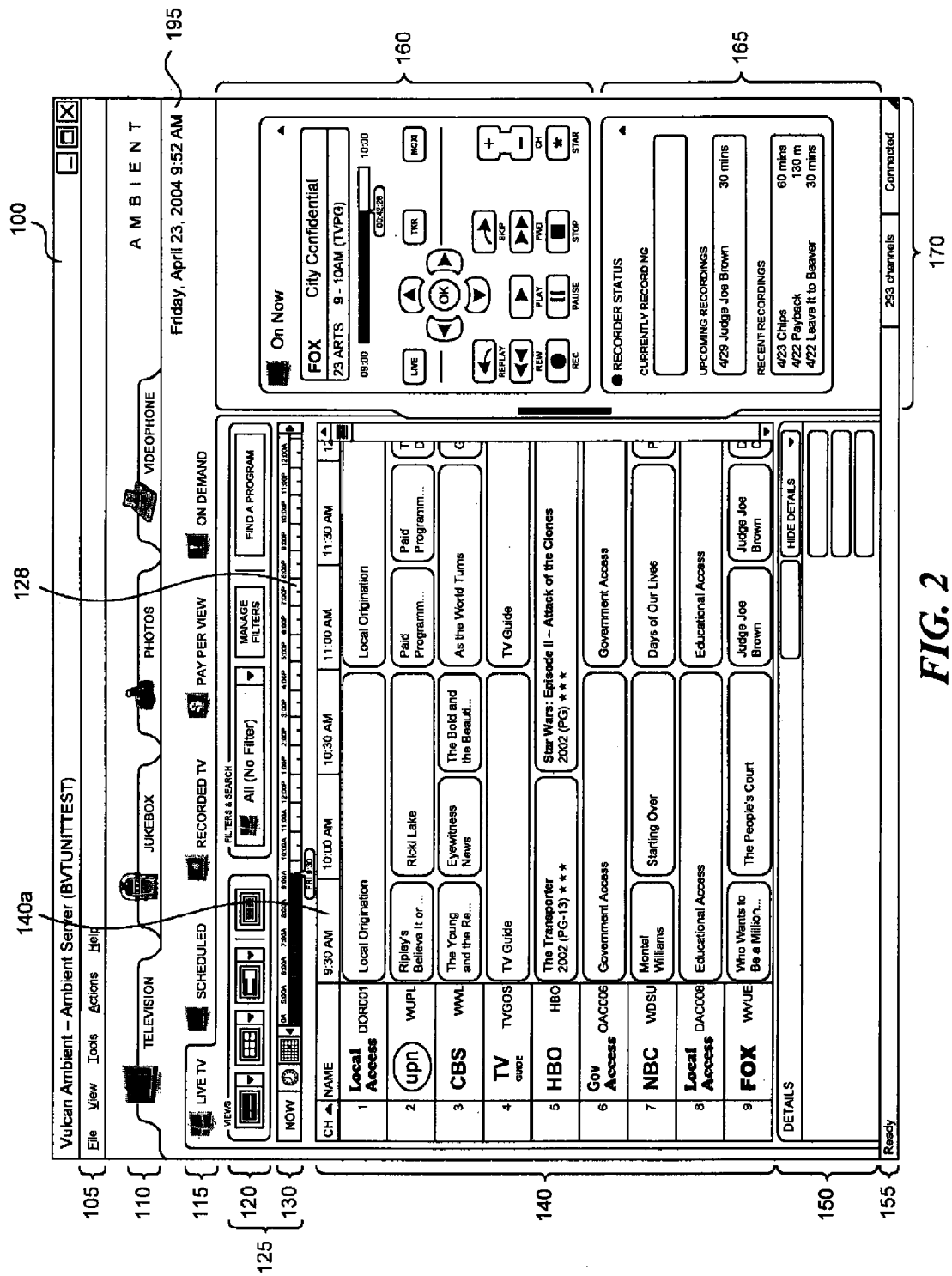
FIGS. 2-28 show example embodiments of a GUI for a content management system.

FIG. 2 illustrates a GUI 100 with a variety of displayed information and user-selectable controls. In the current example, the GUI is displaying program listing information for live TV in a view area 140, with the displayed listings initially based on a current time 195. The TV listings in the view area 140 are initially shown in a grid format, with columns of the grid corresponding to successive time segments of thirty minutes each and with each row corresponding to a different TV channel that may show one or more TV programs during the displayed time period. The GUI also includes a variety of other areas, including a menu bar 105 with dropdown menus, primary content-type navigation tabs 110, secondary content-type-specific navigation tabs 115, a view control area 125 that includes view and filter controls 120 and time controls 130, a detail area 150, a status bar 155, and a status control sidebar area 170 that includes virtual remote control functionality 160 and a user-focused content summary area 165.

As described in further detail below, the view control area 125 also includes a first timebar 128 that corresponds to a relatively long first time period at a first time scale (which is selected based in part using time controls 130) and that may in certain situations display limited information about content, while the view area 140 illustrates detailed information about content for a relatively short second time period at a second time scale. In this example, the first time scale corresponds to approximately 16 hours (with the current first time period being from 8 am to 12 am of the next day, as shown in the first timebar 128), and the second time scale corresponds to approximately 3½ hours (with the current second time period being a first time period subset of 9:30 am to 12:30 pm, as shown in a second timebar 140a rendered at the top of the view area 140). In addition, in this example details about televisions programs shown in the view area 140 include, for example, program title (e.g., "The Transporter"), year of release (e.g., "2002"), and rating information (e.g., "PG-13" and a three-star rating)—various other types of details could similarly be shown, such as information about actors and/or other people associated with the program (e.g., director, producer, etc.), a textual summary of the plot, whether the program is closed captioned and/or broadcast in stereo, whether the program is a repeat, etc. In this example, the first timebar does not display any limited information about any television programs or other content.

Figure 3:
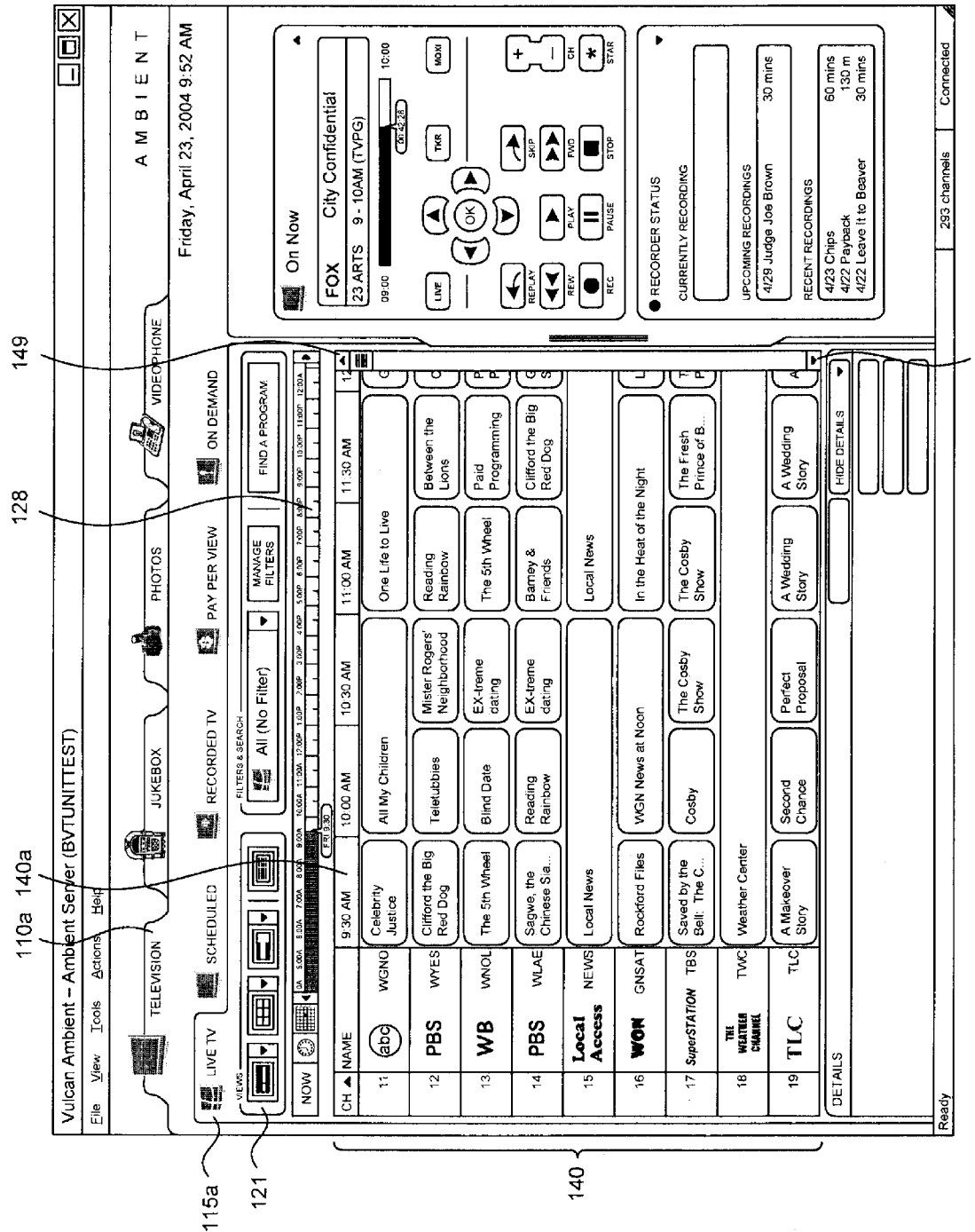

FIG. 3 illustrates a similar view to that shown in FIG. 2, but with other channels shown in the view area 140. For the sake of simplicity and clarity, the labels for the various components of the GUI 100 are not repeated in FIG. 3 and in the subsequent figures, except where appropriate to provide additional description. In the example of FIG. 3, a user has used a scroll bar 149 to scroll to additional channel listings, although in other embodiments and/or situations the display could instead be changed in other manners. As is illustrated, the primary content-type navigation tab for "Television" 110a continues to be currently selected, the secondary content-type-specific navigation tab for "Live TV" 115a continues to be currently selected, and a "Grid" view control 121 continues to be currently selected.

In a similar manner, FIG. 4 displays program listing information similar to that of FIG. 3, but for a later second time period. In particular, the second timebar rendered at the upper portion of the view area 140 indicates that the second time scale has remained at approximately 3½ hours, but that the current second time period has changed to correspond to times from approximately 11 am to 2 pm—the first time scale and first time period reflected in the first timebar in the view control area have not changed, however. In this example, a user has used a timebar scroll control 136 below the first timebar to change the currently selected time for the second timebar to begin at 11 am (e.g., by dragging the timebar scroll control to a point on the first timebar that corresponds to a time of interest), resulting in the program listing information shown in the view area 140 changing to reflect the times for the second timebar—the actual current time 195, however, remains unchanged with respect to FIG. 3. In this example embodiment, the timebar scroll control 136 includes a textual display of the currently selected time of "FRI 11:00", corresponding to a change in this example to 11:00 AM later in the same day, and the second time scale of the view area 140 renders a breakdown of time segments in ½ hour increments after 11:00 AM, with the remainder of the view area 140 rendering program listings for each of the time segments so as to indicate programs whose presentation times make them available for presentation during the time segment (e.g., based on the programs having start times at the beginning of the time segment). In other embodiments and/or situations, a new time could instead be selected in other manners, such as by manually selecting a specified point on the first timebar (e.g., by clicking a left mouse button while the mouse cursor is above the desired time), or instead by manipulating the second timebar in various ways (e.g., by manually selecting a displayed specified point on the second timebar, by dragging the second timebar so as to select a time that was not previously displayed on the second timebar, etc.).

Figure 4:
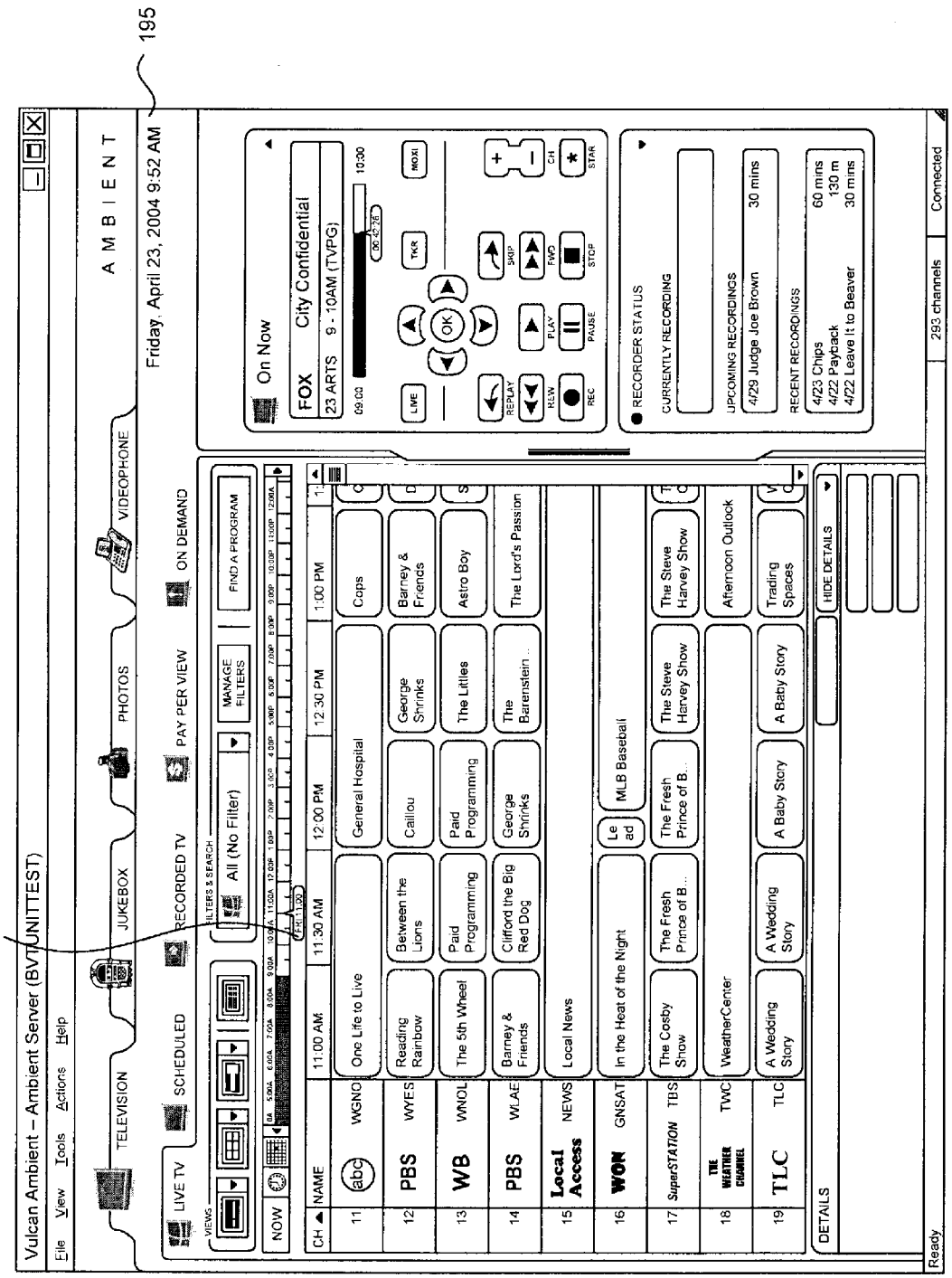
Figure 5:
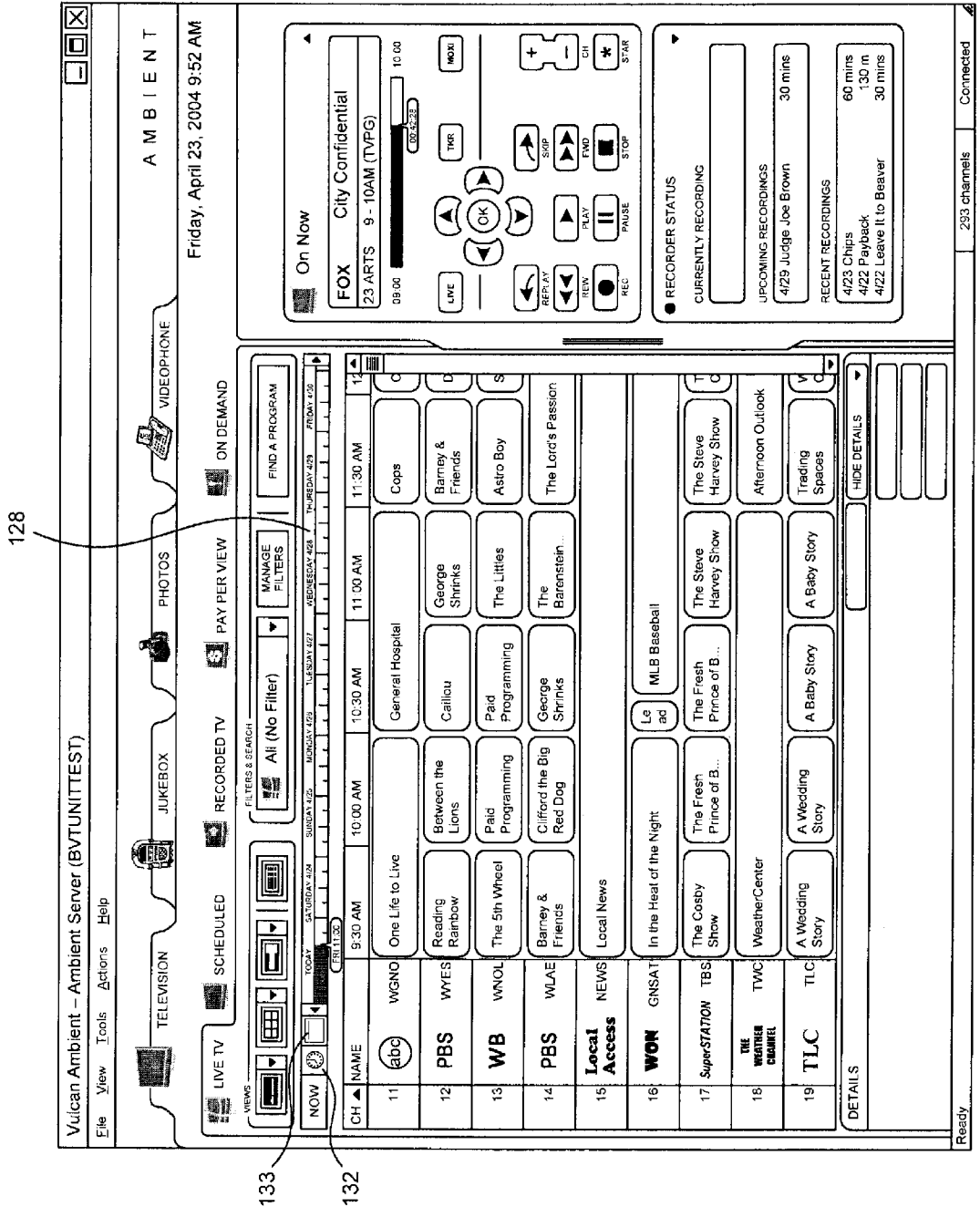

In FIGS. 2-4, the first timebar in the view control area has been displayed using a linear hour-based representation for a multi-hour time first time scale, with the displayed units on the first timebar corresponding to hours and fractions of hours. This hour-based time scale and view corresponds to time control 132 shown in FIG. 5, which in this example embodiment has an icon that includes a representation of a clock. However, the first timebar display in FIG. 5 has been updated to reflect user selection of a day-based time control 133, with the representation of the first timebar now showing successive days and fractions of days as part of a new multi-day first time scale. Nonetheless, the currently selected time for the TV listing display of 11:00 AM on Friday has not changed, and thus the second timebar of the view area 140 continues to show program listings for the same second time period at the same second time scale. While not illustrated here, the GUI could similarly include controls to display the first timebar using other first time scales, such as weekly or monthly.

Figure 6:
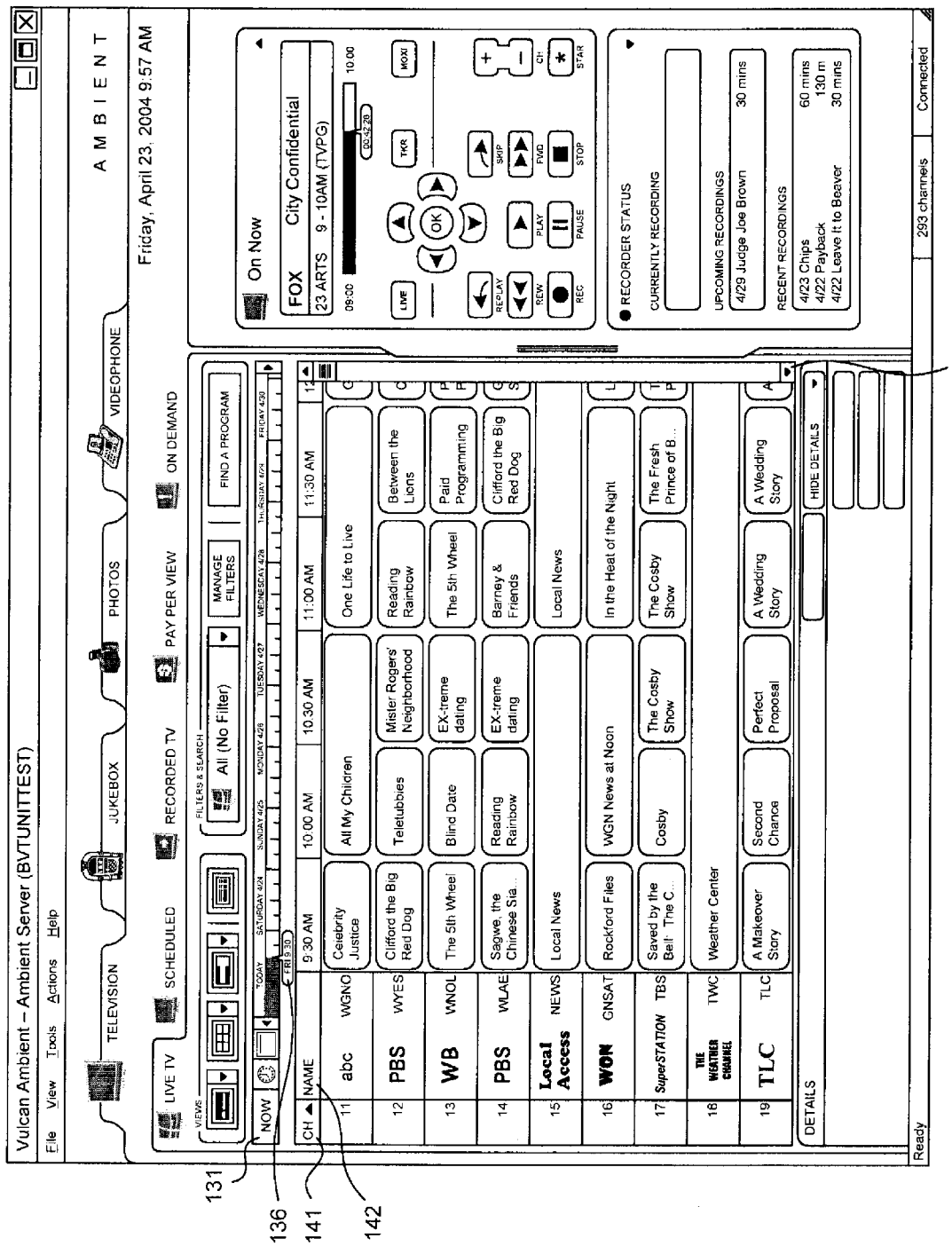

FIG. 6 next corresponds to a similar display after the "Now" time control 131 was selected, causing the currently selected time in the second timebar of the view area 140 to revert to a time corresponding to the current time 195, with the newly selected current time in this example being the beginning of the half-hour segment of time to which the current time belongs (e.g., the half-hour period beginning at 9:30 AM, as shown by the textual display of the timebar scroll control 136, for the current time 195 of 9:57 AM). The second time period of the second time bar now begins at 9:30 am, and the corresponding program listings in the view area 140 now provide the 9:30 AM and onward program listings corresponding to half-hour segments for the second time period.

Figure 8:
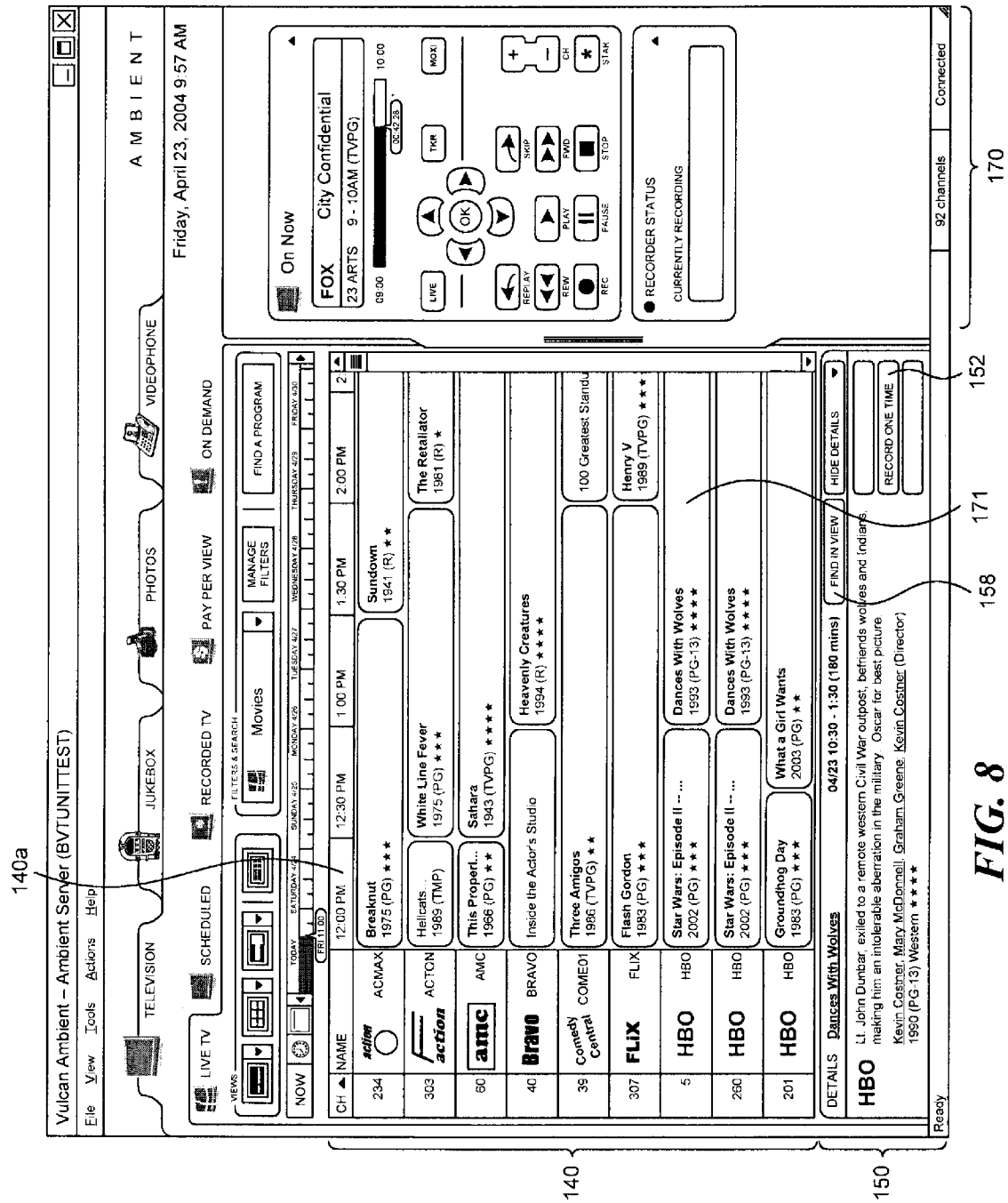

As previously described above with reference to FIG. 4, in the illustrated embodiment the user can select (such as by clicking or mouse-over) any time indicated in the first timebar for a specific day, with the second time period shown in the second timebar and the corresponding program listings in the view area 140 then being updated to present the program listings for the selected time and afterwards. Moreover, the scroll bar 149 can be used to scroll up or down in the grid display in the view area 140 for the selected time, so as to view the various television program listings for each particular television channel. Also, the grid display in the view area 140 can be modified in various other ways, such as by arranging the channels in descending order (not shown) by clicking on a "CH" channel number column heading control 141 in FIG. 6. As is shown, a small triangle is currently displayed in the column heading to indicate that the current display reflects an ascending order that is sorted by channel number, but selection of the control 141 would cause the small triangle to change to point down and would cause the channels to be sorted in descending order by channel number (e.g., by first displaying a largest available channel 998, followed by a next available channel 945, etc.). The same information can be sorted in ascending or descending alphabetical order based on the displayed name of the channel, such as by selecting a "NAME" column heading control 142 in FIG. 6 (e.g., as shown in FIG. 8). While not illustrated here, in other embodiments additional similar types of controls and sorting could be made available, such as by sorting channels alphabetically based on the names of current programs being shown at a selected time (e.g., by clicking on a time-segment column heading in the second timebar for the grid that corresponds to that time).

Figure 7:
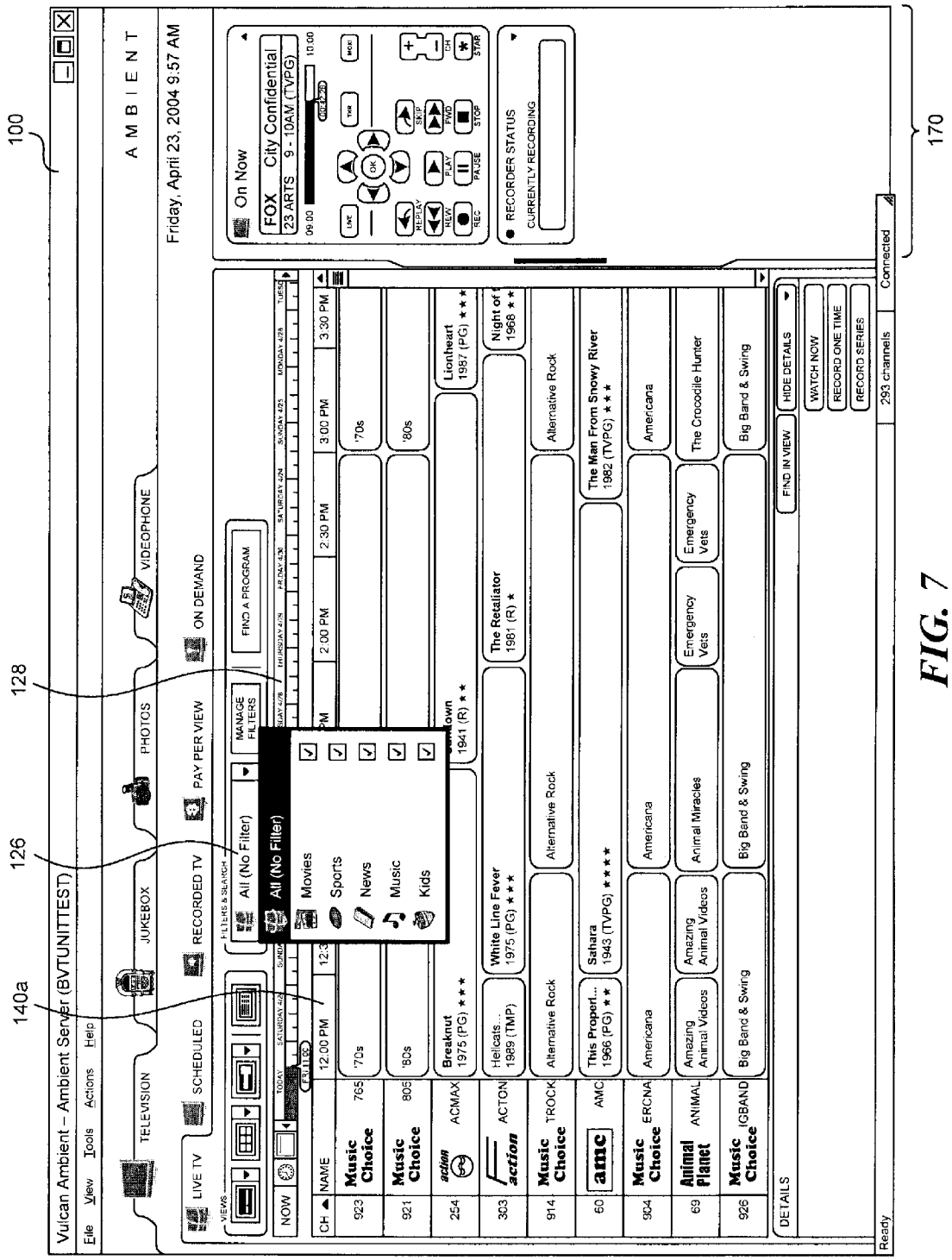

In addition, different programs can be listed using different colors, display patterns (e.g., shading) and/or amounts of highlighting to provide various types of information about the programs. In particular, such differing visual representations can be used to illustrate different types of TV programs (and/or differences in and/or between different types of content) in some embodiments. FIG. 7 illustrates examples of differing types of visual representations that may be mapped to different types of programs (e.g., by default) via a dropdown menu that shows several predefined types of filters, which in this example was displayed based on user selection of a filter control button 126. For example, the color red may be assigned to programs of the type "movie," the color green may be assigned to programs of the type "sports," and programs of type "news," "music," or "kids" may not have colors assigned to them. Furthermore, each row may in some embodiments be displayed using a different visual representation than the preceding row to assist in readability.

In addition, FIG. 7 also illustrates that the second timebar 140a has been modified so that the second time scale now corresponds to just over 4 hours (with a current second time period of 12 pm to past 4 pm), such as automatically based on an amount of space to display program detail information of interest for current programs being smaller than an amount of space for programs illustrated in prior figures. Similarly, the first timebar 128 has also been modified so that the first time scale now is longer (with a current first time period of 7 days), such as automatically based on the change to the second time scale and/or for other reasons. In addition, the first and/or second time scales may also be automatically modified in other situations in at least some embodiments, such as if the view area 140 decreases in size (e.g., due to GUI window 100 being resized to a smaller size or due to another window area such as the status control sidebar area 170 being expanded, such as to cause the second time scale and second timebar to be automatically changed so that programs beginning at 3:30 PM, 4:00 PM and 4:30 PM are no longer visible) or if the view area 140 increases in size. Moreover, with changes to the second time period displayed in the second timebar, the channels that are displayed may again be updated to reflect only those channels that include programs matching the current filter during the currently displayed second time period.

Using the filter control button 126, the user can select the "movies" filter, for example, which would limit the channels displayed in the view area 140 to those that are showing at least one movie during the currently displayed second period of time for the second timebar, such as is shown with respect to FIG. 8. For example, the status control sidebar area 170 of FIG. 8 reflects that 92 channels (for example) match the "movies" filter when selected for the current second period of time, as contrasted with 293 channels (for example) that were available when no filter was selected in FIG. 7.

FIG. 8 further illustrates that a particular one of the displayed program listings in the view area 140 has been selected, which in this example is the "Dances With Wolves" program beginning at 1:00 PM on channel 5 HBO—in the example embodiment, the selection of and the status of the program as being the currently selected program is shown by a suitably colored line (e.g., green) around the outside of the program listing in the view area 140 (e.g., a selection rectangle 171 or other suitable navigation or selection element). In addition, once the "Dances With Wolves" program has been selected as the currently selected piece of content, the detail area 150 is updated to display various additional detail metadata information about the selected program, such as a description of the program, information about cast and crew, information about a genre (e.g., Western) of the program, information about a rating of the program, etc. In addition, a control 152 in the detail area 150 has been enabled to allow a selection to be made to schedule the program to be recorded. While not shown here, a variety of additional types of information and/or functionality could also be shown in the detail area, such as data obtained from third-party sources (e.g., a trailer for the movie, or extra content such as deleted scenes) and/or the ability to select additional services (e.g., providing additional content), such as for a fee.

A different filter can similarly be selected to limit the program listings in the view area 140, such as the "Sports" filter or other available filters, although the results of such a selection are not illustrated here. Such selection of a different filter may cause a variety of changes, such as to cause the status control sidebar area 170 to indicate a different number of channels having programs that match the filter, and to update the view area 140 to display only channels having programs that match the filter during the second time period and/or to display only the matching program listings during the second time period. If a currently selected program is no longer shown in the updated view area 140 (e.g., to not display the "Dances With Wolves" program when a "Sports" filter is selected since the program is not content of type "Sports"), the detail area will nonetheless continue to show information pertaining to that currently selected program in at least some embodiments. In addition, the various previously discussed controls for altering the display continue to be available when showing a filtered view of the TV program listings. For example, filtered sports programs can be sorted in ascending channel number order, such as by selecting the "CH" column heading to sort the channels that offer sports programming.

As with non-filtered views, the information about filtered sports programs (or any other filtered view) may be modified by the user in various ways. For example, a new current selected time may be chosen by selection within the first timebar, such as by changing the current selected time to 12:00 PM noon on Sunday, and with the second time period displayed for the second timebar changed to show sports program listings on 12:00 PM noon onward on Sunday for the filtered channels that offer sports programming during that second time period. As previously discussed, only the channels that have programs matching the current filter during the currently displayed second time period will be shown in the view area 140 in at least some embodiments, and thus the set of channels that are displayed in the view area 140 may be changed based on changes to the second time period, since some channels may not offer sports programming during a particular second time period. Moreover, the current selected time may also be changed in at least some embodiments and situations by user selection of a "Find In View" control 158, such as when the currently selected program "Dances With Wolves" is not currently visible in the current program display of the view area 140, although in other embodiments the currently selected program may nonetheless be visible in the view area 140 even if the program does not match a current filter or other specified criteria and/or even if the program is not associated with the current second time period (or with a second time period that would have been selected if not for the currently selected program). Selection of the control 158 in the illustrated embodiment causes the second time period and corresponding current program display in the view area 140 to be adjusted so that the currently selected program is displayed, including by changing the currently selected time as needed, even though the program does not match the current "Sports" filter. In addition, if a currently selected predefined or custom filter does not have a distinct associated color or other visual representation (e.g., for the "News" filter), the programs displayed in the view area 140 may in some embodiments be shown with their default colors but with the programs that match the current filter being displayed using highlighting so as to distinguish them from other programs displayed.

Figure 9:
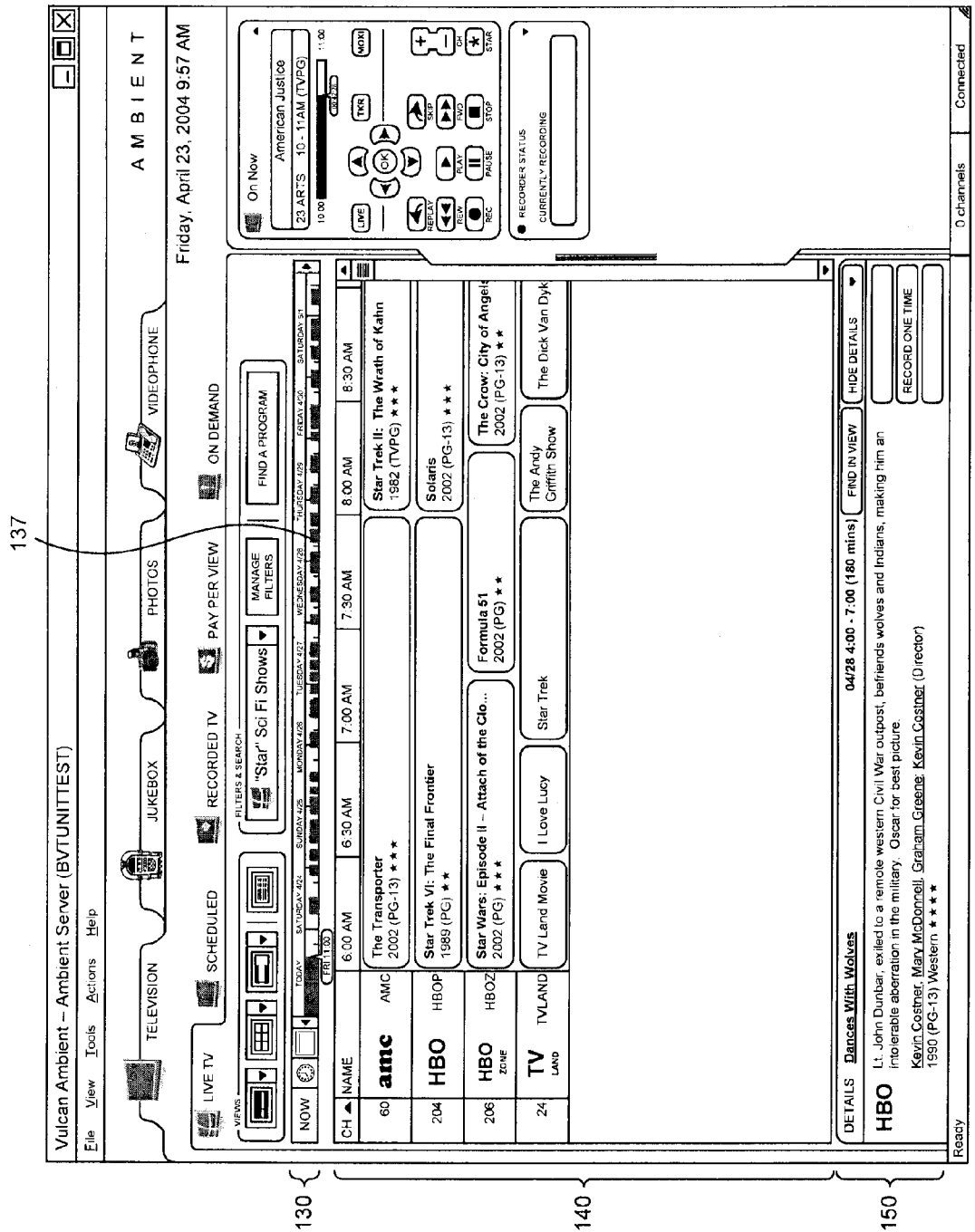

In addition, in at least some embodiments users may each create one or more custom filters that can then be applied to restrict the TV programs that are displayed. For examples, creation of such custom filters may include selection of one or more user-selectable filter criteria and specification of corresponding matching values for the criteria, such as to select one or more program genres, people in the cast or crew, specific words in the title and/or description, specific ratings, programs that appear on specific channels, programs that are not repeats, programs that are in HDTV format, programs that have specified audio-visual options, programs that are scheduled for recording, etc. As one specific example, a user may create a custom filter for programs in the "Science Fiction" genre and with the word "Star" in the title. For the sake of brevity, these example filter customization features are not shown or described in detail herein, although FIG. 9 illustrates information being displayed in the view area 140 to correspond to that example custom filter. Instead, the reader is requested to refer to the parent provisional patent application, if desired, for additional information, such as with respect to FIGS. 1R-1Y and corresponding text. After one or more custom filters are created, an updated dropdown menu (not shown) may be generated for the filter control 126, with the new custom filter(s) then present in the dropdown list as available filters that may be selected and applied. The view area 140 would then, after a new custom filter is selected, display results in a manner similar to that previously discussed with respect to predefined filters—for example, if there are no programs during the currently displayed second time period that match the filter, the current view area 140 may in some embodiments be displayed as blank, while in other embodiments the user may be presented with a warning or other information so that they understand why the view area is blank.

FIG. 9 illustrates one example of how additional information may be provided to users in the first timebar 128 when a filter is being applied, which in this example is a user-specified custom filter, with the first timebar in this example embodiment including small colored (e.g., red) graphical indications 137 to identify times during which programs matching the current filter occur. This allows a user to easily see times at which matching programs occur that do not correspond to the current program display for the second time period, as well as to select one of these times (such as by directly clicking one of the indicators 137) to see details about the matching programs at that time in the view area 140 and/or the detail area 150. Thus, FIG. 9 reflects a situation in which a new current time has been selected, such as by selecting the time of 6 am on Sunday based on the first timebar having an indicator showing that one or more programs at that time match the current filter. The resulting updated view area 140 display shows that four channels have programs that match the applied custom filter during a corresponding second time period beginning at 6 am on Sunday.

Figure 10:
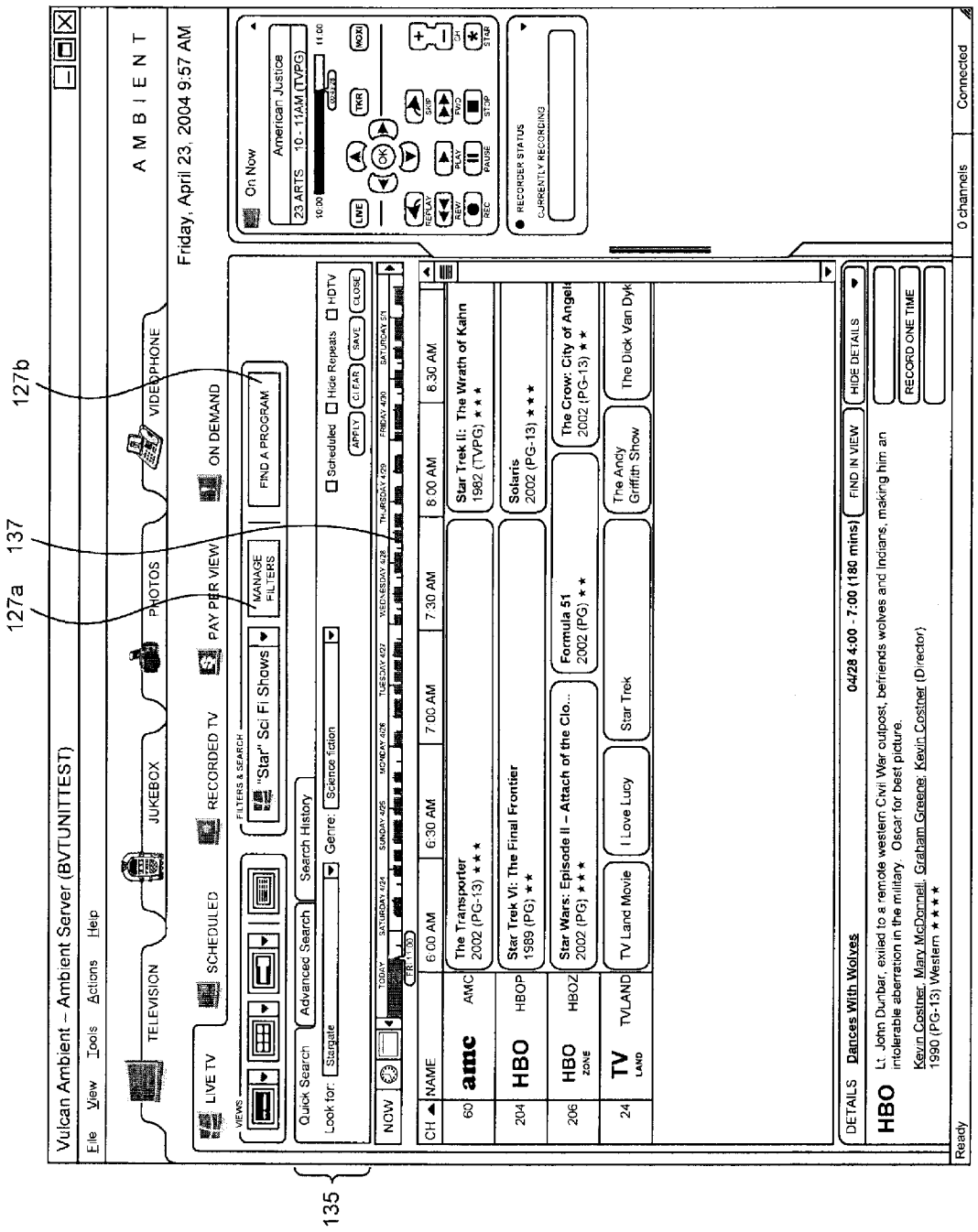

FIG. 10 next illustrates results after the user has selected the "Find A Program" search control 127b to initiate a search for programs matching specified criteria. In particular, in this example an additional collapsible search area 135 is displayed in response that allows a user to specify various search criteria, with a "Quick Search" capability being selected by default. The Quick Search capability allows the user to specify one or more terms to search for, one or more genres to search for, whether to limit the search to programs that have been scheduled to be recorded, whether to exclude or hide programs that are repeats of previously shown programs, whether to limit the search to programs that are in high-definition TV ("HDTV") format, etc. In this example, the user has selected to look for programs that include the term "Stargate" in the "Science Fiction" genre. FIG. 10 also illustrates an additional "Manage Filters" control 127a, such as to provide a pop-up filter management window.

After the user selects the "Apply" control in the search area 135 to perform the search specified in FIG. 10, the results of the search may be displayed in the view area 140 (not shown). For example, the initial results may not include any programs at the currently displayed time period, and thus the view area 140 may be initially blank for the currently displayed time period. However, the first timebar may similarly be used to provide graphical indicators 137 at times at which any programs that satisfy the search occur, and if a new time is selected from the first timebar (such as by clicking one of the indicators 137 or by other using other functionality of the time controls 130), the view area 140 may be updated to display channels having programs matching the specified search at the selected new time. After the user next selects the "Save" control in the search area 135, the user is allowed to save the previously specified search as a new custom filter. For instance, in this example a new pop-up window (not shown) may be displayed to the user to allow specification of a name for the new custom filter, which may subsequently be included in an updated dropdown menu (not shown) for the filter control 126 as an available filter that can be selected and applied.

Figure 11:
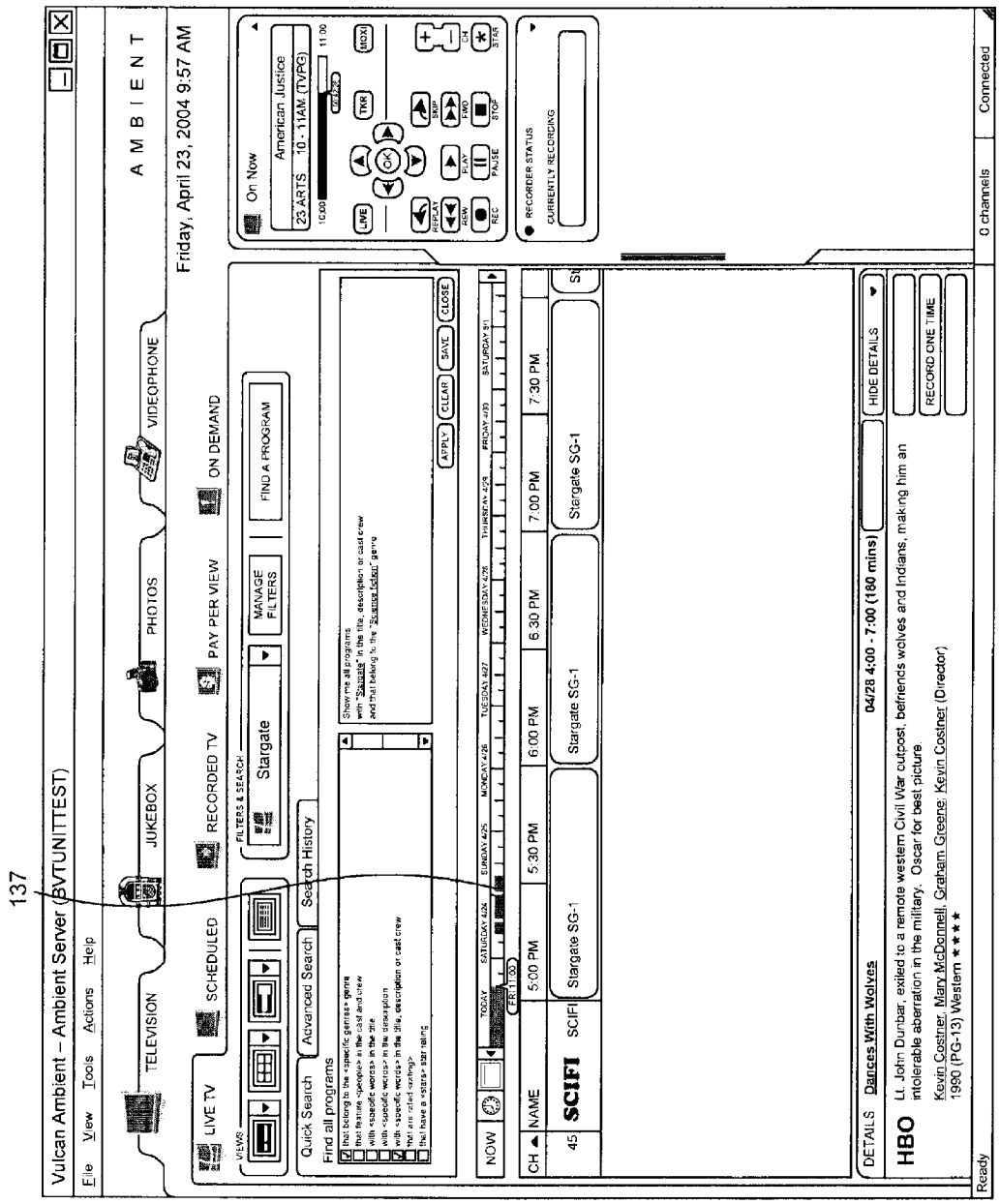

After saving the previously specified search as a new custom filter, the user then selects the "Advanced Search" tab in the search area 135, and FIG. 11 displays the results of that selection. In particular, in the illustrated embodiment the search area is modified to allow the user to select one or more of a variety of search criteria in a manner similar to that previously discussed with respect to filter creation. In this example, the criteria selections in the search windows are initially set to correspond to the previously specified search, although those selections can be modified or removed by the user. The user can also select the "Search History" tab to display information about the previously applied searches (not shown), such as with a list of entries that are user-selectable such that the user can select one of the previous searches and then use the "Apply" control to again apply that search for the currently selected time. For example, in this illustrated embodiment the user has selected the previously specified search from the search history list corresponding to programs that include the term "Stargate" in the "Science Fiction" genre, with the results of the specified search being displayed in the view area 140 for the current second time period, and with the first timebar providing limited information for programs that match the current search during the first time period (e.g., graphical indicators to indicate presence of such programs). When the user is finished, he/she can next select the "Clear" control of FIG. 11 to clear the currently specified filter/search parameters, and then select the "Close" control to hide the search area 135.

Figure 12:
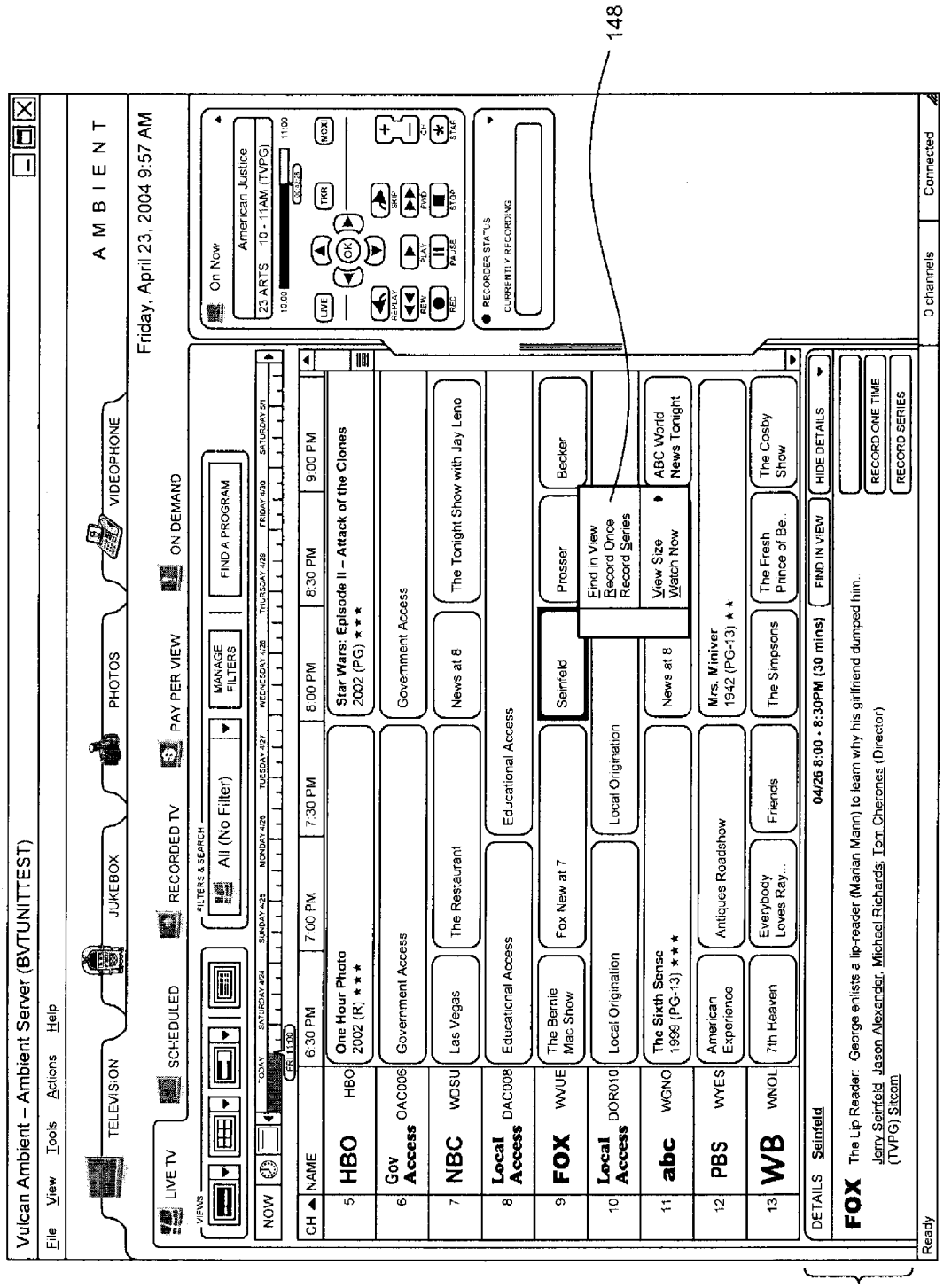

If the user selects a new current piece of content, which in the example of FIG. 12 is the "Seinfeld" program episode beginning at 8:00 PM on channel 9 FOX after the custom filter is no longer being applied, the detail area 150 is modified to reflect the newly selected program. In addition, in the illustrated embodiment, the user further selects the newly selected program in such a manner as to display a pop-up menu 148 that provides additional functionality with respect to the newly selected program (e.g., by right-clicking on the displayed listing for the program). In this example embodiment, the pop-up menu includes functionality to allow the user to record this episode ("Record Once"), to record multiple episodes of this program ("Record Series"), as well as to perform various other functions.

Figure 13:
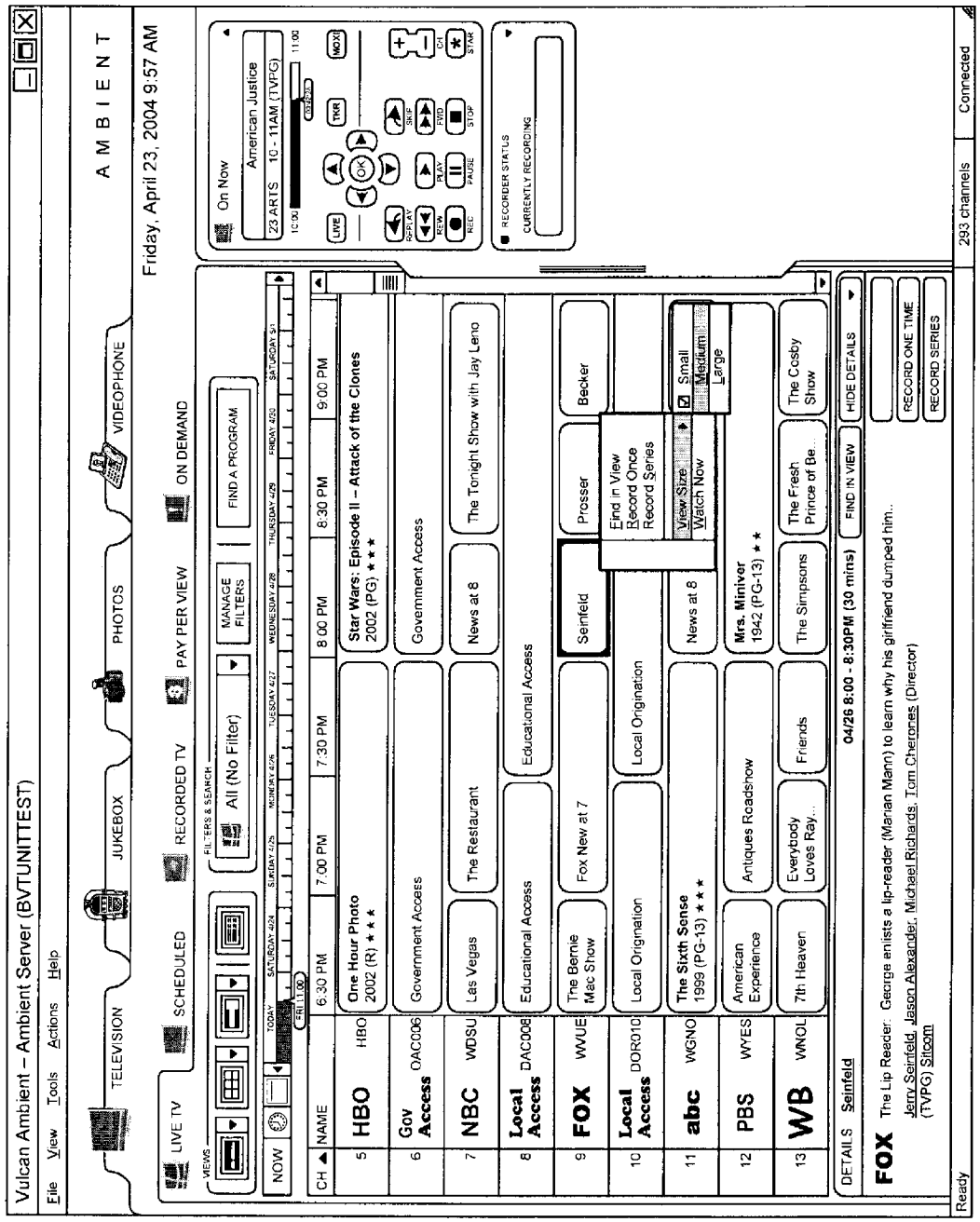
Figure 27:
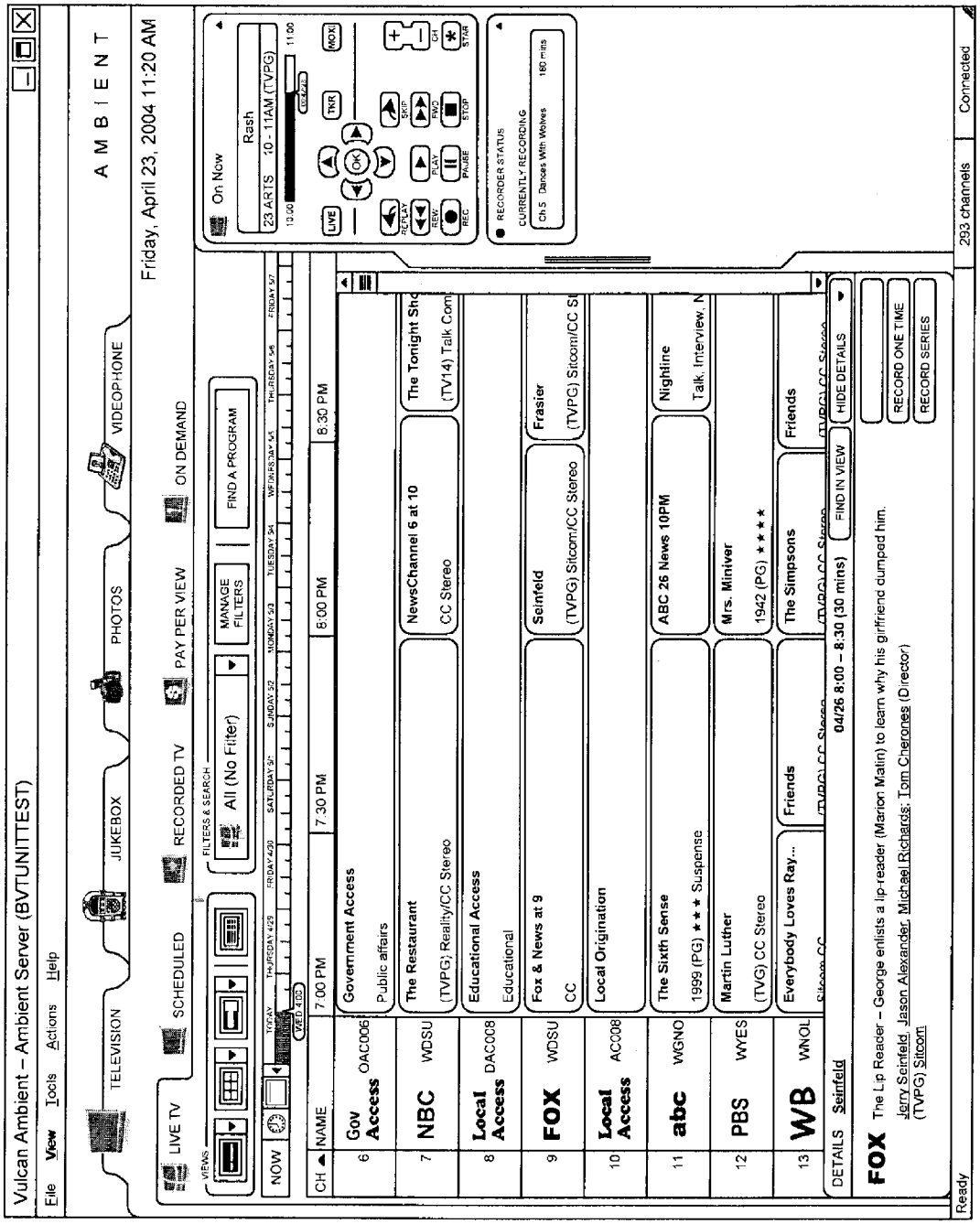

In particular, one of the additional types of functionality available via the pop-up menu 148 is to change the size at which the information in the view area 140 is displayed, and as is shown in FIG. 13, the user in this example is able to select to change the current display size from "Small" to "Medium" or to "Large." If the "Medium" or "Large" selections are made, the view area 140 would be modified to show additional details (e.g., an abbreviated narrative or episode title) about each of programs that are displayed (e.g., in larger "cells" containing the program information), resulting in less programs being shown due to the larger size of the display information. The resultant size of the cells due to the resizing may further in some embodiments result in the first and/or second time periods being automatically changed and/or the first and/or second time scales being changed. For example, FIG. 27 illustrates results after the view size has been changed to "Large." In the illustrated embodiment, the "Seinfeld" program continues to be the currently selected program, and the second time period and smaller group of television programs displayed in the view area have been selected in such a manner as to maintain a state of the GUI that reflects that selection, such as by continuing to show the "Seinfeld" program in the smaller group of television programs.

Figure 14:
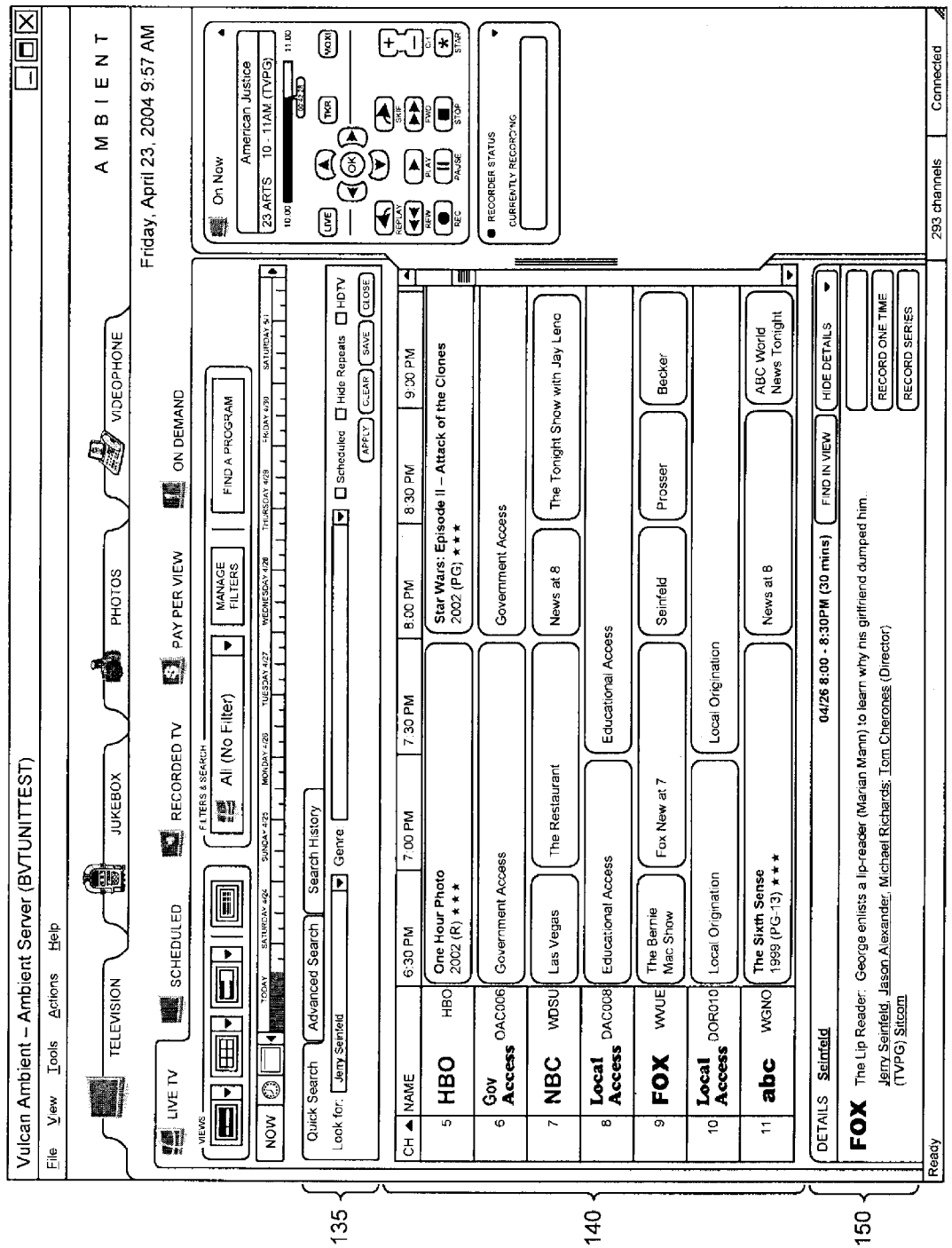

FIG. 14 shows results after the user has selected the user-selectable information of the name of the actor "Jerry Seinfeld" in the detail area 150. In particular, performing that selection in the example embodiment causes the search area 135 to be displayed and to have the user-selected information added to the portion of the search corresponding to search terms. After applying the new search (e.g., by selecting the "Apply" control in the search area), the results of the new search would be shown in the view area 140, and limited information for any matching programs would be added to the first timebar. Alternatively or additionally in FIG. 14, the user can select the user-selectable genre information of "Sitcom" in the detail area 150, causing the genre portion of the search area 135 to be populated with the data "Sitcom." The user in this example may further select the "Hide Repeats" search criteria in the search area 135 and then apply the new search, with results in the view area 140 (not shown) having repeated listings hidden. The user can also display the current search history after the prior search has been applied, such as based on a user subsequently selecting the "Search History" control tab of the search area 135. Regardless of the search or sorting mechanism used, the GUI can display information using an appropriate first time scale and appropriate second time scale that are correlated to results of the searching and sorting.

Figure 15:
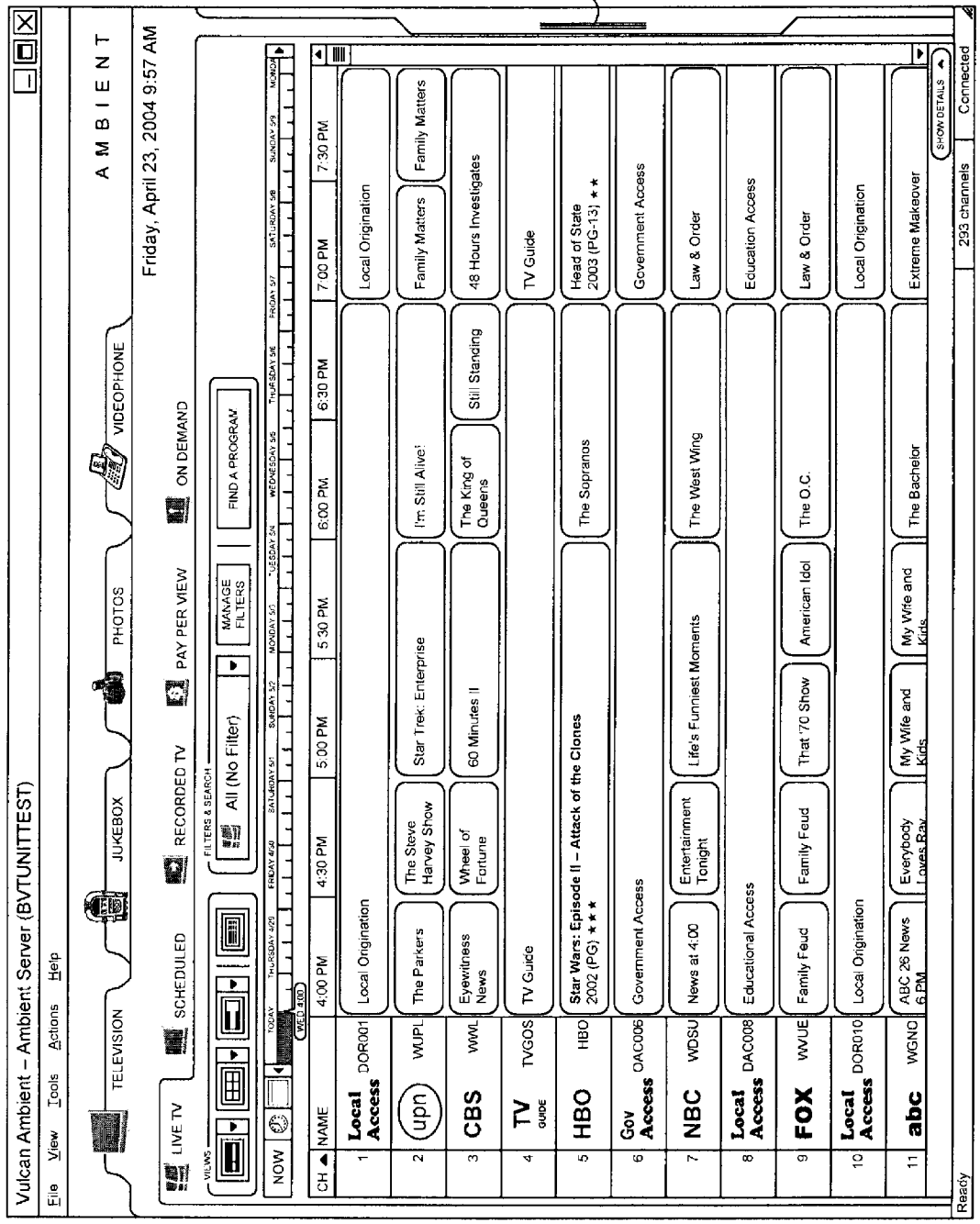

FIG. 15 shows an embodiment after the user has closed the search area 135 (e.g., by selecting the "Close" control in that area), has closed the sidebar status control area 170 (e.g., by using a vertical control bar 173 in the sidebar control area 170 that is just to the right of channels 8 and 9 in FIG. 15), and has closed the detail area 150 by selecting the "Hide Details" control in the detail area 150. Thus, after performing these closures, most of the GUI 100 is devoted to displaying program listings in the view area 140, with the first and second timebars rendered accordingly (e.g., by automatically selecting appropriate first and second time scales and first and second time periods).

Figure 16:
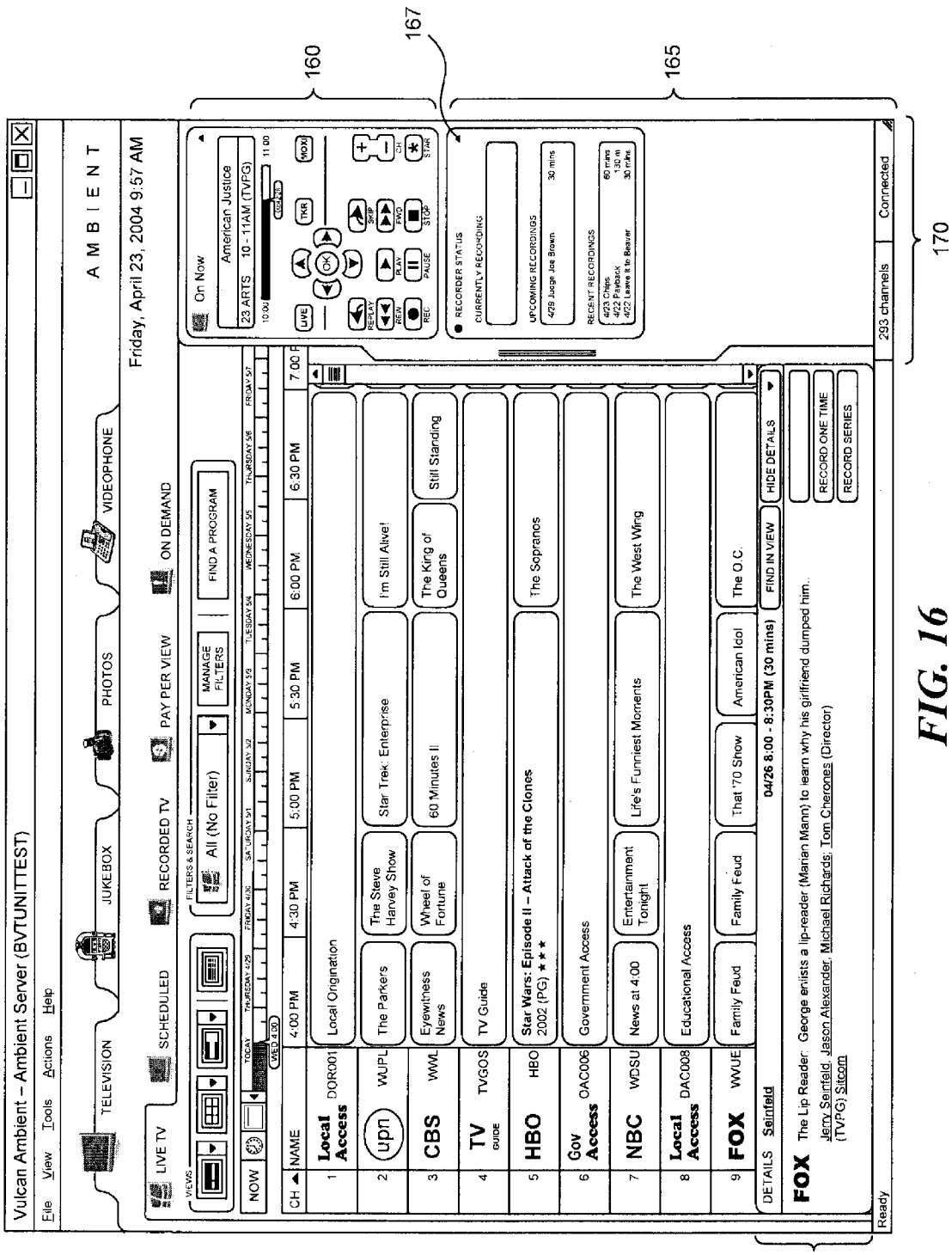

FIG. 16 then shows the results of re-displaying the detail area 150 and the sidebar status control area 170, with the lower information area 165 of the sidebar status control area 170 shown in expanded view (e.g., by selecting an expand/collapse control for that area 165, which in this example embodiment is an up/down triangle arrow icon 167 in the upper right corner of that area 165). In this example embodiment, the information area 165 includes information about the current status of selected content, including content being currently recorded (if any), recently recorded programs, and upcoming scheduled recordings. In some embodiments, some or all such content may be user-selectable from the area 165, such as to allow the user to specify to play previously recorded content. In addition, in some embodiments the area 165 may further contain additional information and/or user-selectable controls, such as controls to define and use one or more playlists that are further described with respect to FIG. 28. The upper area 160 and/or the lower area 165 of the sidebar status control area 170 may also be expanded or collapsed as desired by the user in the illustrated embodiment. In addition, in some embodiments the first timebar may be further modified to reflect information in the sidebar status control area 170 (not shown), such as to provide visual indicators of upcoming times at which some (e.g., a selected one) or all of scheduled recordings in the information area 165 will occur.

Figure 17:
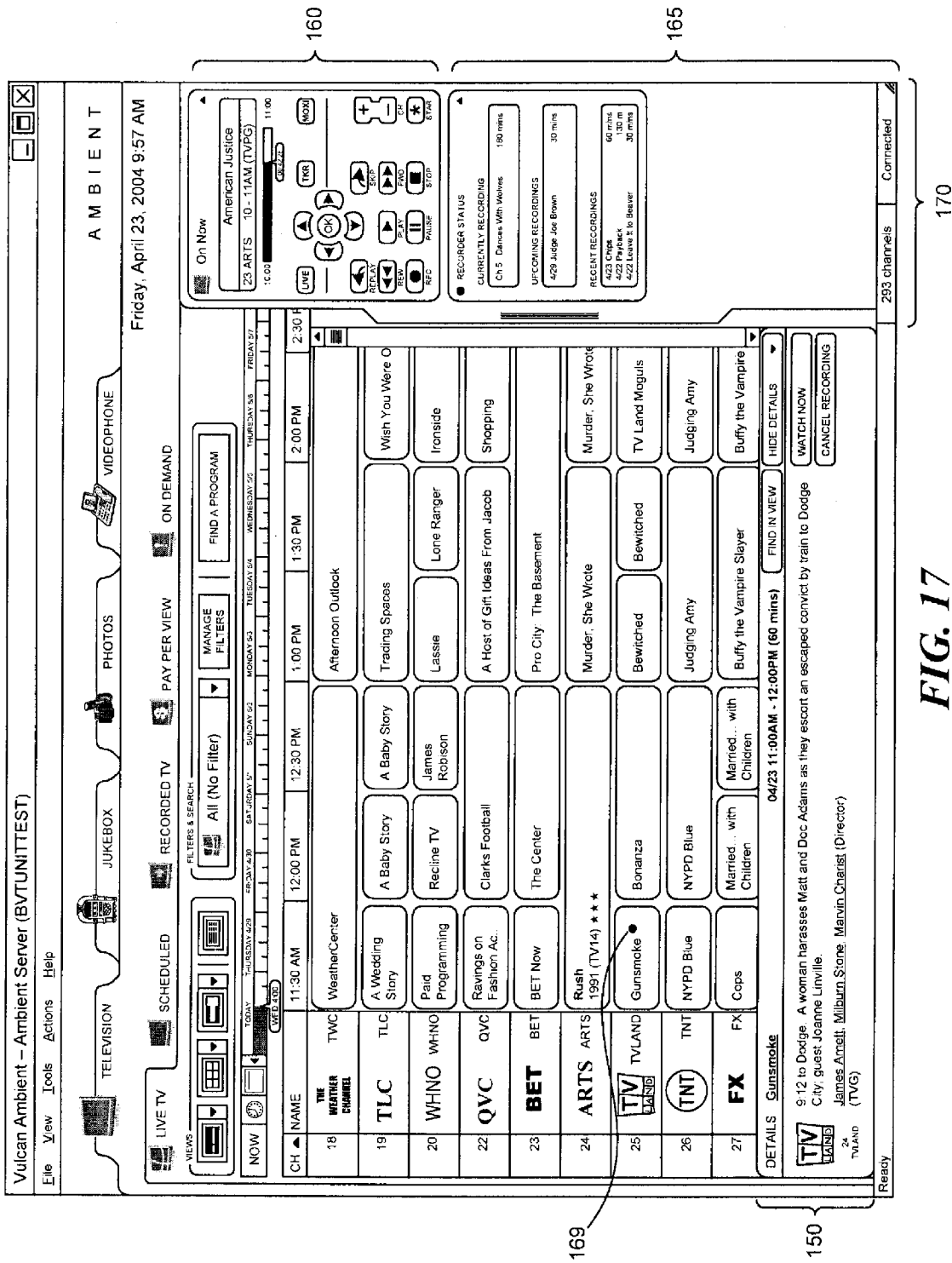

In FIG. 17, the currently selected piece of content is a program that is currently on channel 24 TVLAND entitled "Gunsmoke," and it has been selected to be currently recorded. The newly selected program has corresponding information displayed in the detail area 150, and a status icon is shown in various places to indicate the status of the program as being currently recorded, such as in this example embodiment being illustrated with an icon 169 (e.g., a red circle). In particular, the recording icon is shown in this example with the program listing information in the view area 140, in the detail area 150, and in the information section 165 of the sidebar status control area 170. In addition, the available controls in the detail area 150 have been modified to include a "Cancel Recording" control (since the selected program is being recorded) and a "Watch Now" control (since the currently selected program is currently available for presentation).

As previously discussed, FIGS. 2-17 have displayed various information about television program listing information in a variety of ways. However, while the program listing information display has been modified in various ways, all of the displayed information has corresponded to a single type of view for the program listing information in the view area 140. In particular, and as previously noted, the program listing information has been displayed in a 2-D grid format, which corresponds to the prior selection of the grid view control 121.

Figure 18:
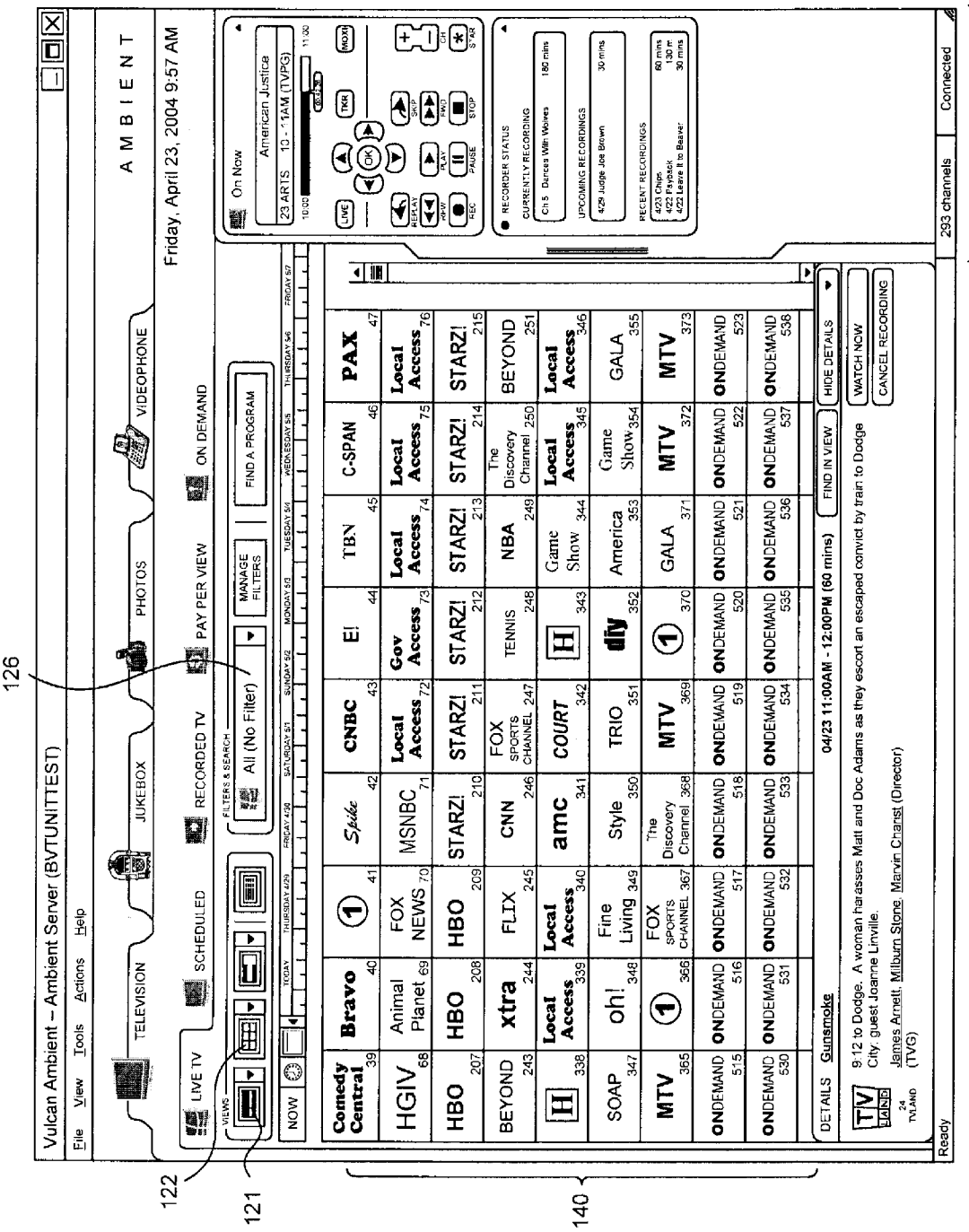

FIG. 18 corresponds to a change in the type of view used for the program listing information in the view area 140, and in particular corresponds to a view of the program listing information in iconic format after selection of an icon view control 122. In this example, the program listing information in the view area 140 is shown in a small size, such as based on the prior grid-based view being in the small size or instead based on the small size being the initial default size for the icon view. In this example icon view, information about the channel numbers, names, and station names is displayed, but information about specific programs available at the currently selected time is not shown. The iconic view of program listing information can also be displayed at a medium or large size (not shown) to show more detail information, such as the name of the program at the currently selected time, the time period during which the program is displayed, rating, genre, and so forth. This change in size can be performed in a variety of ways, such as via a selection from a pop-up menu (not shown) in the view area similar to that previously discussed with respect to FIGS. 12 and 13, selection of a dropdown menu (not shown) using the triangle arrow control on the right side of the icon view control 122, etc. Since the displayed information in the view area 140 in the illustrated embodiment corresponds only to the currently selected time (or alternatively to no time in some embodiments), in this embodiment the second timebar is not shown, although in other embodiments the second timebar may be shown (e.g., if different iconic information is shown for different time segments, such as to reflect particular programs).

If a particular program listing is selected as the current piece of content, the detail area 150 will be populated with information about the newly selected current program in a manner similar to that previously discussed. In addition, a pop-up menu (not shown) corresponding to the selected program can be displayed, such as based on the user performing a right-click action on the selected program, with the pop-up menu allowing various actions to be taken with respect to the selected program (e.g., to record the program, to select the program to be watched on an associated television or other video output device if the currently selected program is currently being shown, etc.). In other embodiments, other types of functionality could similarly be provided in such a pop-up menu.

Figure 19:
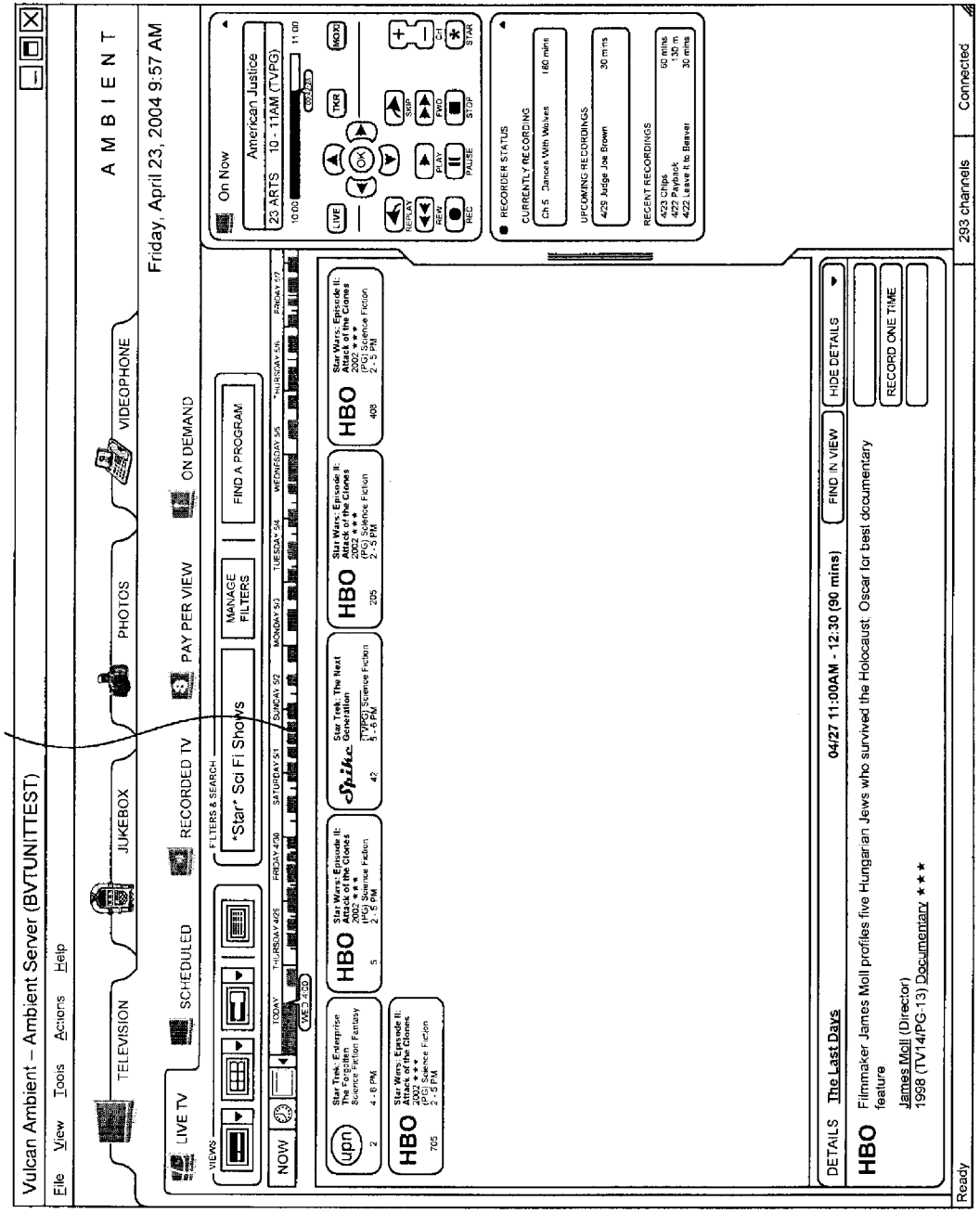

As with embodiments in which the program listings are shown in grid format, the user can use the filter control 126 to filter the information displayed in the view area 140 (whether for predefined or custom filters), and the first timebar may display visual indications corresponding to matching programs. For instance, FIG. 19 shows results of applying a custom filter for programs in the "Science Fiction" genre and with the word "Star" in the title, and of selecting a current time from the first timebar that has at least one matching program (e.g., based on selecting a point along the timebar having an indicator 137 to indicate the presence of matching programs). In this example, the newly selected time is Wednesday at 5:00 PM, and six channels are shown in the view area as having matching programs at that time. In addition, in this example embodiment the size of the iconic view information has been changed to "Large," whether automatically or based on a user selection, and with the icons displayed in the view area further including information about the individual programs to which the icons correspond (e.g., the name of the program at the currently selected time, the time period during which the program is displayed, information about genre and rating, etc.).

Figure 20:
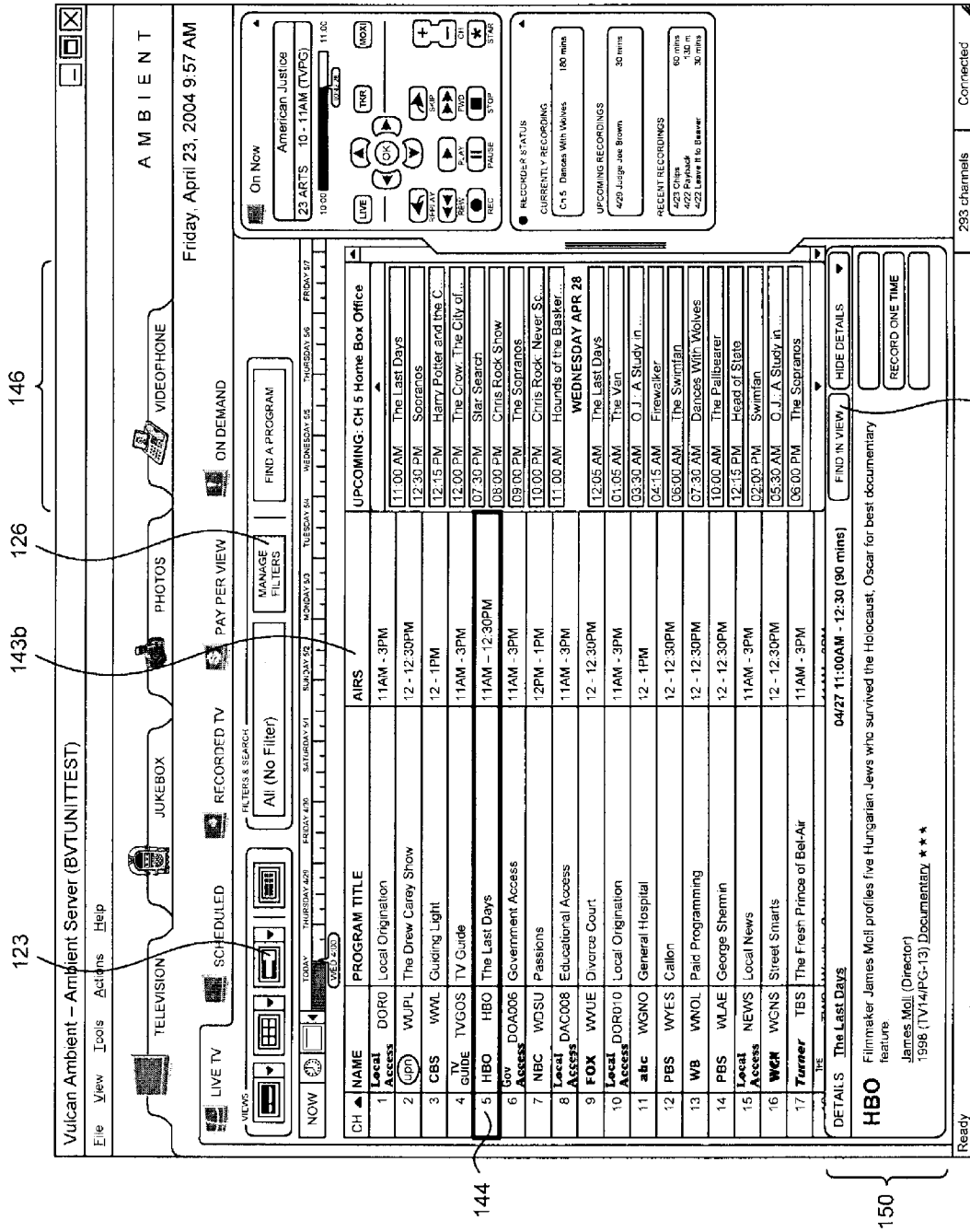

FIG. 20 then illustrates a change in the current type of view based on selection of the channel view control 123, as well as based on clearing the previously selected filter, and with the information displayed at a "Small" size (such as based on a prior type of view being in the small size or instead based on the small size being the initial default size for the channel view). In this view, channel and program information for a variety of channels is shown in the main left portion of the view area 140 under column headings "CH", "NAME", "PROGRAM TITLE" and "AIRS," while an additional right portion 146 of the view area 140 is displayed containing additional channel-specific information for a currently selected channel under an "UPCOMING" column heading. In particular, in the current example channel number 5 for the currently selected program "The Last Days" is selected as the current channel 144 in the left portion of the view area 140, and the channel-specific portion 146 contains information about a number of different programs that are available on that currently selected channel over a third period of time that in this example corresponds to approximately the next day and a half. While the times along the left side of the right portion 146 are not illustrated as a distinct timebar in the illustrated embodiment, in other embodiments a third timebar may be displayed along that left side. In addition, while the second timebar is not displayed in the illustrated embodiment, in other embodiments the second timebar may additionally be displayed, such as to show program information for multiple channels in a grid format in the left portion of the view area while continuing to show the additional channel-specific information for a single channel in the right portion 146 for the current third time period. Therefore in this embodiment, the first time scale corresponds to several days, a third time scale for the third time period represented in the channel-specific portion 146 corresponds to hours over a period of approximately 1½ days, and a second time scale for a second timebar (not shown) may correspond to a shorter second period of time (e.g., 1 hour or 4 hours, such as in a manner similar to times displayed in the "AIRS" column 143b). The detail area 150 also displays information pertaining to the currently selected piece of content that is the selected program from the channel-specific portion 146, such as information pertaining to an upcoming program listed that airs after the program on the currently selected channel 144.

The user may also select "Find In View" functionality for a currently selected program or other piece of content while using the channel view, such as via the button 158 in the detail area 150 or instead based on a pop-up menu (not shown) for the currently selected program listing in the channel-specific area 146. For example, if a new program has been selected from the channel-specific portion that is not displayed in the current program listing information in the left portion of the view area (e.g., to select the "Chris Rock Show" at 7:30 pm on Tuesday) and the "Find In View" functionality is selected, the view area 140 information will be updated to show program information corresponding to the time of that currently selected program. If a different channel is selected in the view area 140 as the currently selected channel 144, the program on that channel at the currently selected time becomes the currently selected program in the illustrated embodiment, and the detail area 150 is updated to provide information about that program. Similarly, the channel-specific area 146 of the view area will be updated in the illustrated embodiment to include information about the newly selected channel.

As with embodiments in which the program listings are shown in grid and icon views, the filter control 126 can be used with the channel view to filter the information to be displayed in the view area 140 (whether for predefined or custom filters), and the first timebar may display visual indications corresponding to matching programs. Moreover, the size of the view can switched to a medium size or a large size (or in some embodiments to any desired size for this and/or the other views), such as based on selection of an appropriate control on a pop-up menu in the view area (not shown) or instead based on use of a dropdown menu via the triangle arrow in the right portion of the channel view control 123. The program listings at the medium size, for example, may contain additional detail information relative to those listings at the small size, and use of a large size can display further detail information about the program listings being shown.

Figure 21:
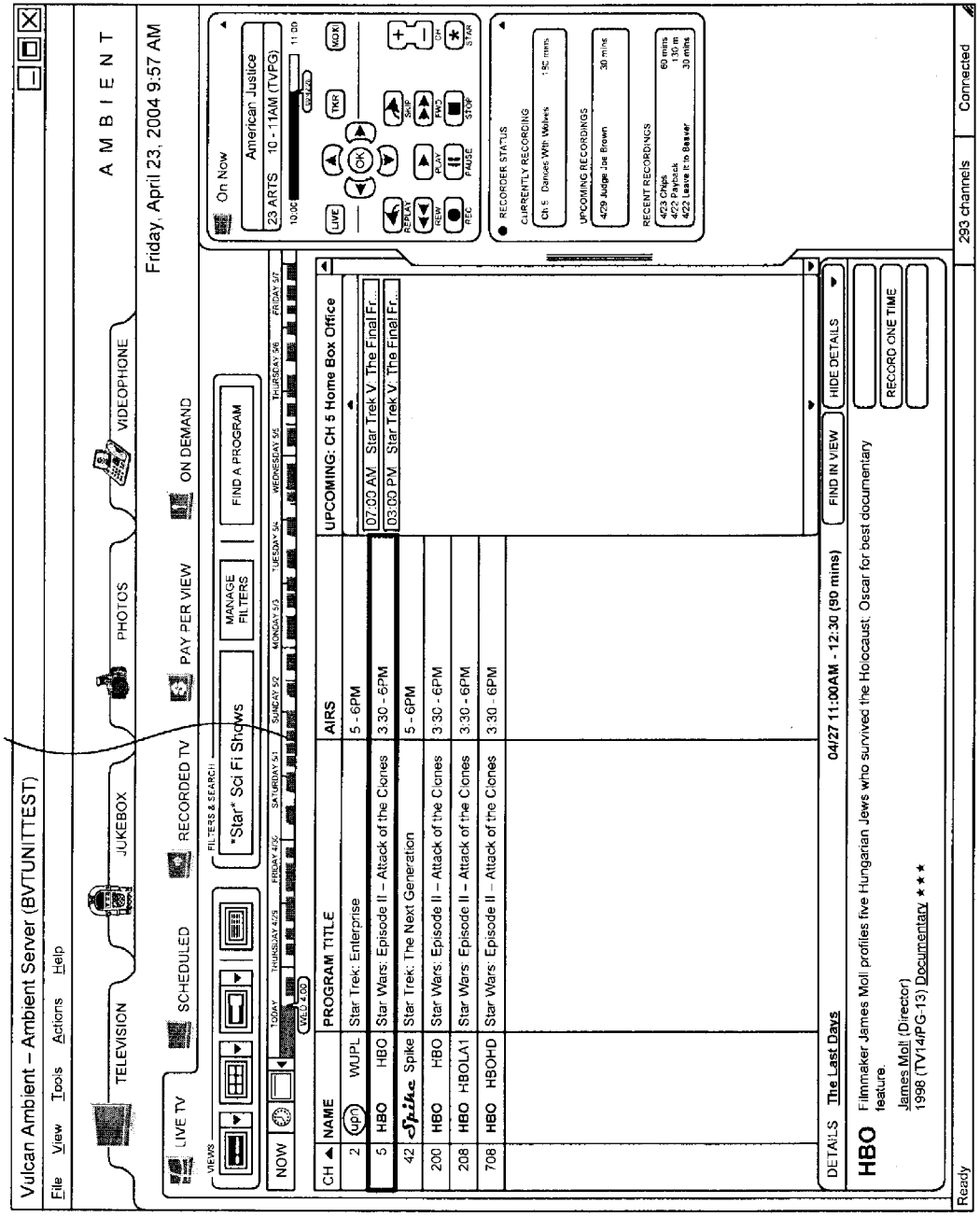

FIG. 21 displays example results of selecting a custom filter for programs in the "Science Fiction" genre and with the word "Star" in the title, and of selecting a new currently selected time of 5:00 PM on Wednesday (such as by clicking a corresponding indicator 137 in the first timebar) that has six program listings matching the filter. Channel number 5 continues to be the currently selected channel based on the currently selected program "The Last Days," despite that currently selected program not being currently displayed (e.g., based on the current filter and/or currently selected time). Additionally, in some embodiments the channel listings may be sorted in various ways, such as in ascending order or descending order based on the channel numbers, based on channel names, based on air times of currently displayed programs (e.g., by default or instead based on selection of the "AIRS" column heading 143b), based on names of currently displayed programs, etc.

Figure 22:
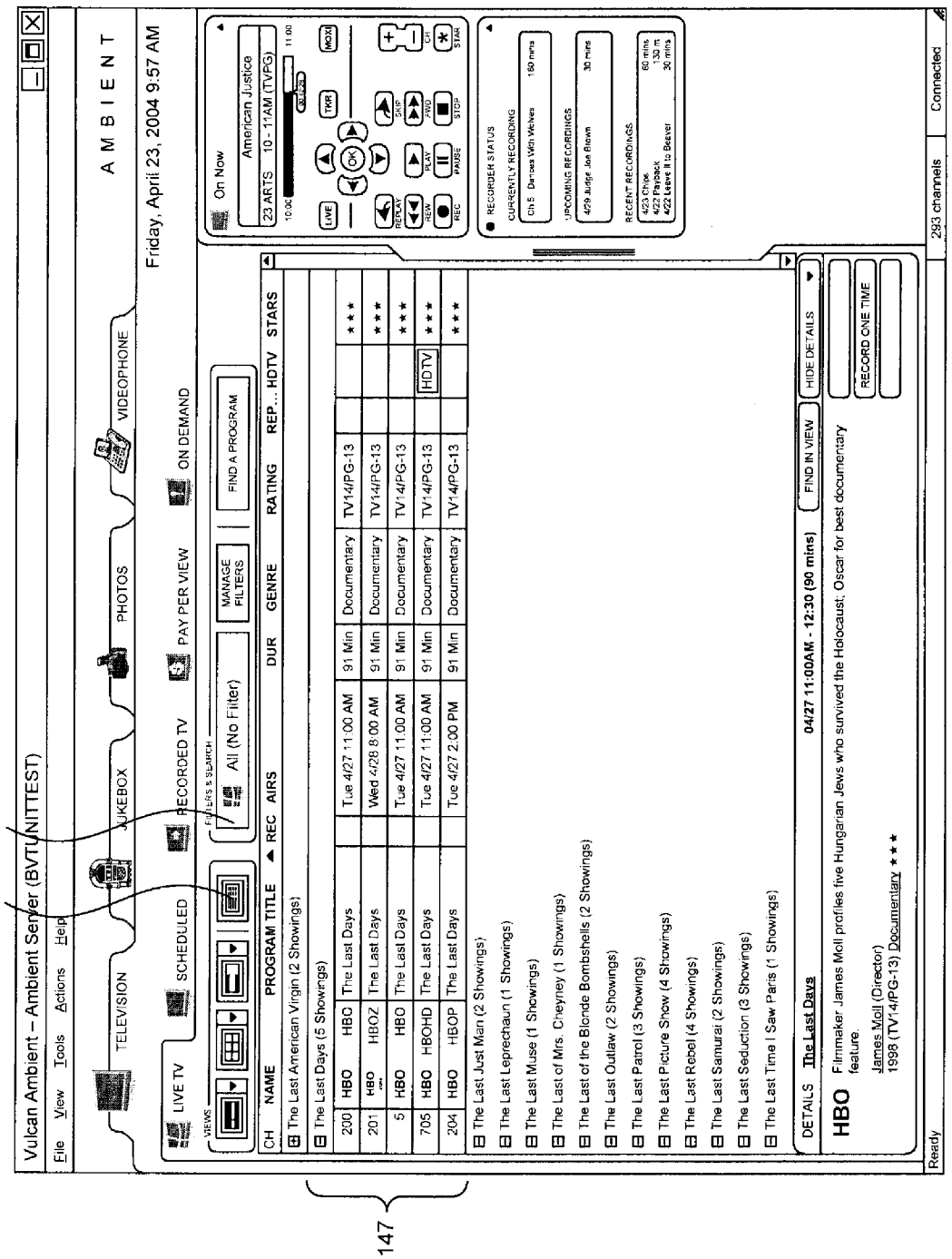

FIG. 22 then displays results of switching to a list view of the program listings, such as based on selection of the list view control 124. In the current example, the program listings are shown sorted in ascending order based on the title of the programs, such as by default or instead based on user selection of the "PROGRAM TITLE" column heading 143a. In this example embodiment, at least some of the program listings may have multiple showings at different times, and some or all of the program titles can be expanded to show details of each of the showings for that program title. For example, with respect to the currently selected program "The Last Days," that program listing is currently shown in an expanded view 147 so as to provide information about each of the five showings of that program that are currently available over an upcoming period of time (e.g., the next 2 weeks).

In this example embodiment, a program title listing can be expanded in various ways, such as by selecting a small icon to the left of each of the program listings in order to expand or collapse that program listing, or instead using a pop-up menu (not shown) for that program listing, such as based on a right-click selection of the program listing. In addition or in the alternative, a pop-up menu (not shown) in the view area 140 can allow all program listings to be collapsed or expanded, as well as to change the sorting for program listings. If the user selects an "Expand All" control functionality or other similar functionality from a pop-up menu, the resulting listing will include all program information in expanded form in the view area 140.

As with embodiments in which the program listings are shown in other types of views, the filter control 126 may in at least some embodiments be used with the program listing view to filter the information to be displayed in the view area 140 (whether for predefined or custom filters). Also, while the times in the "AIRS" column for an expanded program listing are not illustrated as a distinct timebar in the illustrated embodiment, in other embodiments one or more fourth timebars may be displayed with expanded program listing information (e.g., a distinct fourth timebar for each expanded program listing) to correspond to such times. In addition, while the first timebar is not displayed in the illustrated embodiment, in other embodiments the first timebar may additionally be displayed and may include visual indications corresponding to appropriate programs (e.g., programs matching one or more specified filters and/or searches, or to illustrate upcoming showings of one or more programs, such as for a currently selected program and/or for one or more programs shown with expanded program listing information). Similarly, while the second timebar is not displayed in the illustrated embodiment, in other embodiments the second timebar may additionally be displayed, such as to display information about upcoming showings for one or more of the current programs in a grid format in the view area 140.

In addition, the program listings may be sorted in a variety of manners, with FIGS. 1BT-1CC from the parent provisional patent application showing examples of sorting and grouping the program listing information in a variety of ways. For instance, all of the program listing information may be shown in collapsed form and in a manner grouped and sorted by channel number in an ascending or descending manner, such as based on user selection of the "CH" column heading. Examples of sorting and grouping of program listing information may include non-exclusive examples as follows: in ascending or descending order based on channel name; in a manner grouped and sorted based on the recording status of the program listings; in ascending or descending order based on the air time of the program listings; in ascending or descending order based on duration of the program listing; in ascending or descending order based on the genre of the program listings; in ascending or descending order based on the rating of the program listings; in ascending or descending order based on whether the program listings are repeat showings; in ascending or descending order based on whether the program listing information is displayed in HDTV format; in ascending or descending order based on the stars assigned to the program listings; and so forth. Further details of such grouping and sorting are provided in the parent provisional patent application. Also, while not illustrated here, the sorting of program listings in some embodiments may also in at least some embodiments be performed using multiple sort specifications (whether in a manner specific to a particular program listing or instead for all program listings)—for example, some or all of the program listings and/or program listing showings may be sorted first based on program title, then secondarily based on air time, and then tertiarily based on whether they are shown in HDTV format.

Figure 23:
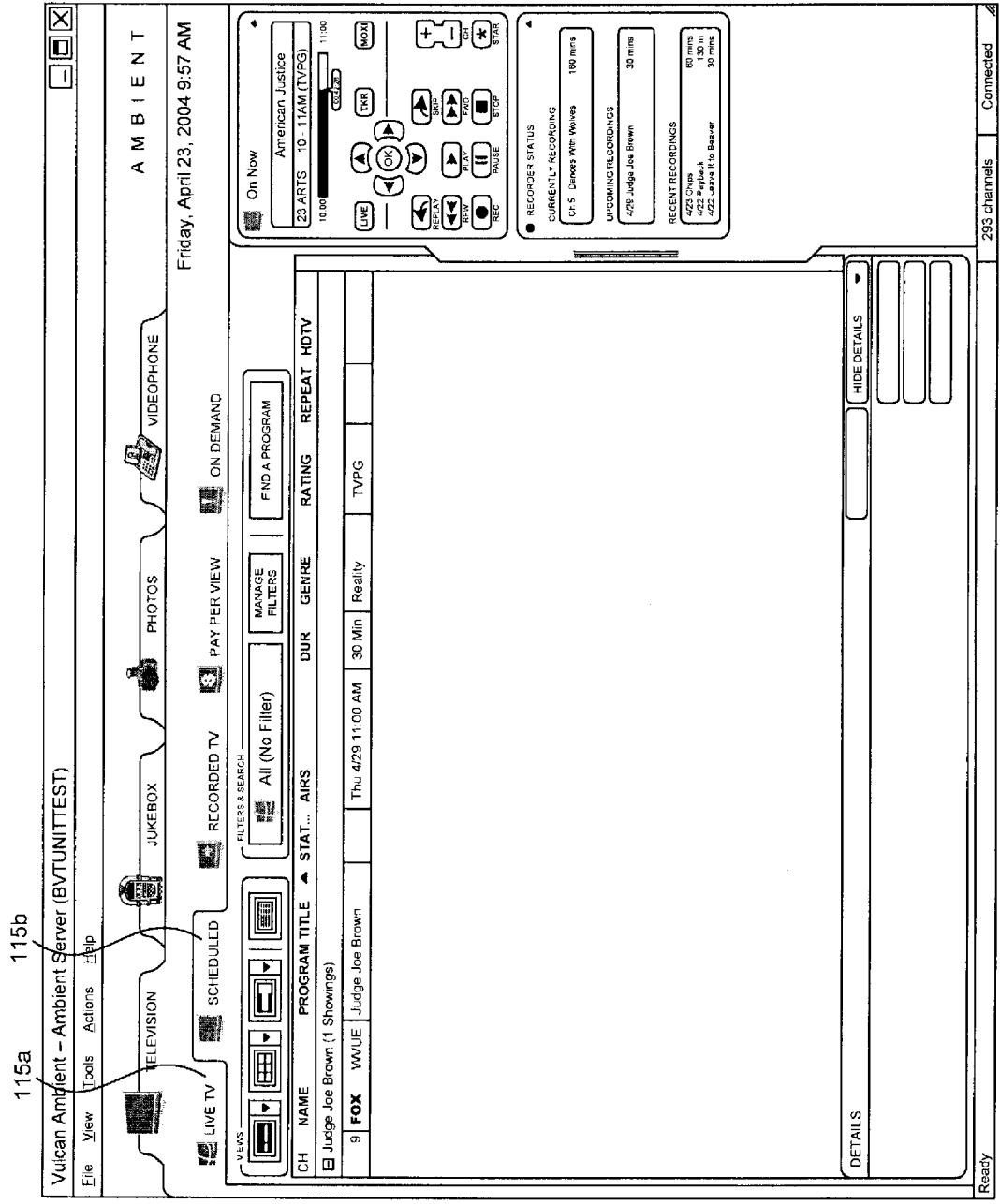

Much of the previously discussed program listing information has corresponded to content categorized as being available via live television, such as based on a prior or default selection of a "LIVE TV" control 115a. FIG. 23 corresponds to selection of an alternative type of television-related content, which in this example includes TV program listings that are scheduled to be recorded, such as based on selection of the "SCHEDULED" control 115b. In this example, only a single program listing is scheduled to be recorded, which is the "Judge Joe Brown" program on channel 9 FOX at 11:30 am on Thursday, as illustrated in the view area 140 and in the "UPCOMING RECORDINGS" section of the status control sidebar area. In addition, the scheduled TV program listing information may be manipulated in a manner similar to that of the live TV program listing information, such as to select one or more upcoming programs that are scheduled to be recorded as currently selected pieces of content, to be sorted in various ways and to have various filters applied, and to be displayed using other views in at least some embodiments. For example, the scheduled recording information can be sorted in an ascending manner based on the air time of the programs, rating, genre, and so forth.

Programs may be scheduled for recording in various ways, such as via a pop-up menu (not shown) or other control that is provided regarding one or more upcoming programs (e.g., as displayed using one or more of the views for LIVE TV content) to give the user the option to record (or cancel recording of) a selected program. Information about a currently selected program may include a recording icon such as a small red circle status icon or other icon (not shown), as previously described above, to indicate that the program is to be recorded, with the icon shown in information displayed for the program listing in the view area 140 and/or in the detail area 150. In addition, the information about the upcoming recordings may be shown and updated in the sidebar status control area 170 to reflect a newly scheduled recording, and the view area 140 may similarly be updated to present information about such a newly scheduled program to be recorded.

Figure 24:
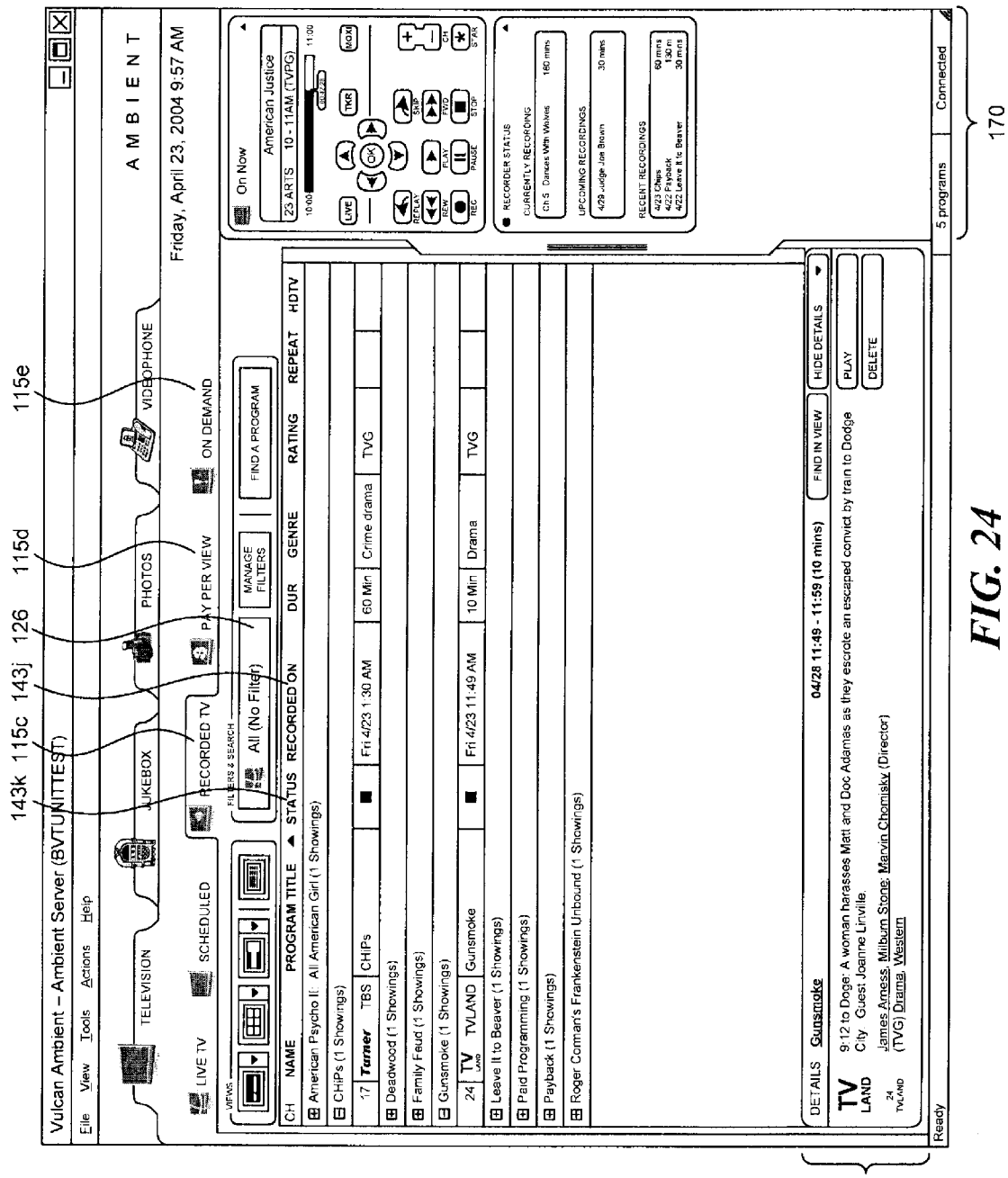

FIG. 24 displays results of selecting the type of television-related content corresponding to previously recorded TV program listings, such as based on selection of the "RECORDED TV" control 115c. While not illustrated here, information for other groups of television-related content may similarly be displayed in other embodiments, such as information corresponding to pay-per-view television (e.g., by selection of the control 115d), on-demand television programs (e.g., by selection of the control 115e), or various other types of television-related programming via appropriate controls (not shown), such as for interactive television. A pop-up menu (not shown) or other control may also be used to provide various functionality for one or more of the previously recorded content listings, such as to delete the recording, play the recording on an appropriate video output presentation device (e.g., a TV), and to find the program information for a currently selected program in the current view. The detail area 150 in the illustrated embodiment also includes a "PLAY" control button for the currently selected program, and the status control sidebar 170 provides information about the program being currently played.

The recorded TV program listings and/or other content may also be manipulated in a manner similar to that for the other program listing information, such as to select one or more recorded programs as currently selected pieces of content, to be sorted in various ways and to have various filters applied, as well as to in some embodiments be displayed using or more other views. For example, the program listing information may be sorted based on the record time of the program listings (e.g., based on user selection of the "RECORDED ON" column heading 143j), or could similarly be sorted based on a current status of the program listing, such as by user selection of the "STATUS" column heading 143k. In the illustrated embodiment, program listings may be given a status of recorded, scheduled to be recorded, and not scheduled to be recorded, although in other embodiments a variety of additional types of status information could be similarly assigned and used (e.g., currently recording, scheduled to record once, scheduled to record the series or multiple episodes, live and not recording, future and not scheduled, past shows that were not recorded, scheduled to record but did not, scheduled to record but not going to, recorded as a recommendation, locked to prevent deletion, subject to deletion, imminent deletion, previously viewed (for recorded and/or live programs), partially viewed, has additional associated content, has additional associated functionality, has a user-specified annotation, etc.).

In some embodiments, the content listings shown in the view area 140 for one or more of the content-type-specific navigation tabs 115 (e.g., "LIVE TV," "SCHEDULED," "RECORDED TV," "PAY PER VIEW," and/or "ON DEMAND") may further be bifurcated or otherwise organized (not shown) based on one or more devices connected to or otherwise associated with the CM system, such as one or more media centers 350, one or more computing systems 390, or other input/output devices. For example, if there are multiple STBs, DVRs, or other input/output devices (e.g., televisions) available to the CM system, the view area 140 may present listing information corresponding to multiple of the devices (e.g., for two devices or for all devices), such as simultaneously in different portions of the view area. Thus, for instance, if two DVRs are connected to the CM system and each is able to record content and/or has recorded content, then the view area 140 may separately or concurrently present the information for each DVR. Program listings for multiple STBs may similarly also be presented in the view area 140 separately or concurrently, such as if these STBs receive different EPG metadata. Furthermore, information may be coordinated in multiple display areas of the GUI to correspond to current selections specific to one or more such devices, and such a focus of the presented information may further be maintained as information in the GUI changes.

Various types of functionality may also be provided in at least some embodiments upon some form of user selection of displayed indicator in the first timebar. For example, as previously indicated, selection of a displayed indicator for a time point may cause that time point to become the currently selected time, with the second time period of the second timebar adjusted to display that currently selected time. In some embodiments, other types of functionality may be provided for selection of a displayed indicator, whether in addition to (e.g., using a different type of selection than for specifying the currently selected time) or instead of specifying the currently selected time. For example, selection of an indicator may cause one or more corresponding pieces of content to become the currently selected content (e.g., the currently selected television program, such as to cause information about that program to be displayed in the detail area 150), or may instead allow various types of capabilities to be provided for one or more such corresponding pieces of content (e.g., to schedule a recording, to initiate a current recording, to watch or manipulate a previously recorded piece of content, etc.).

Figure 25:
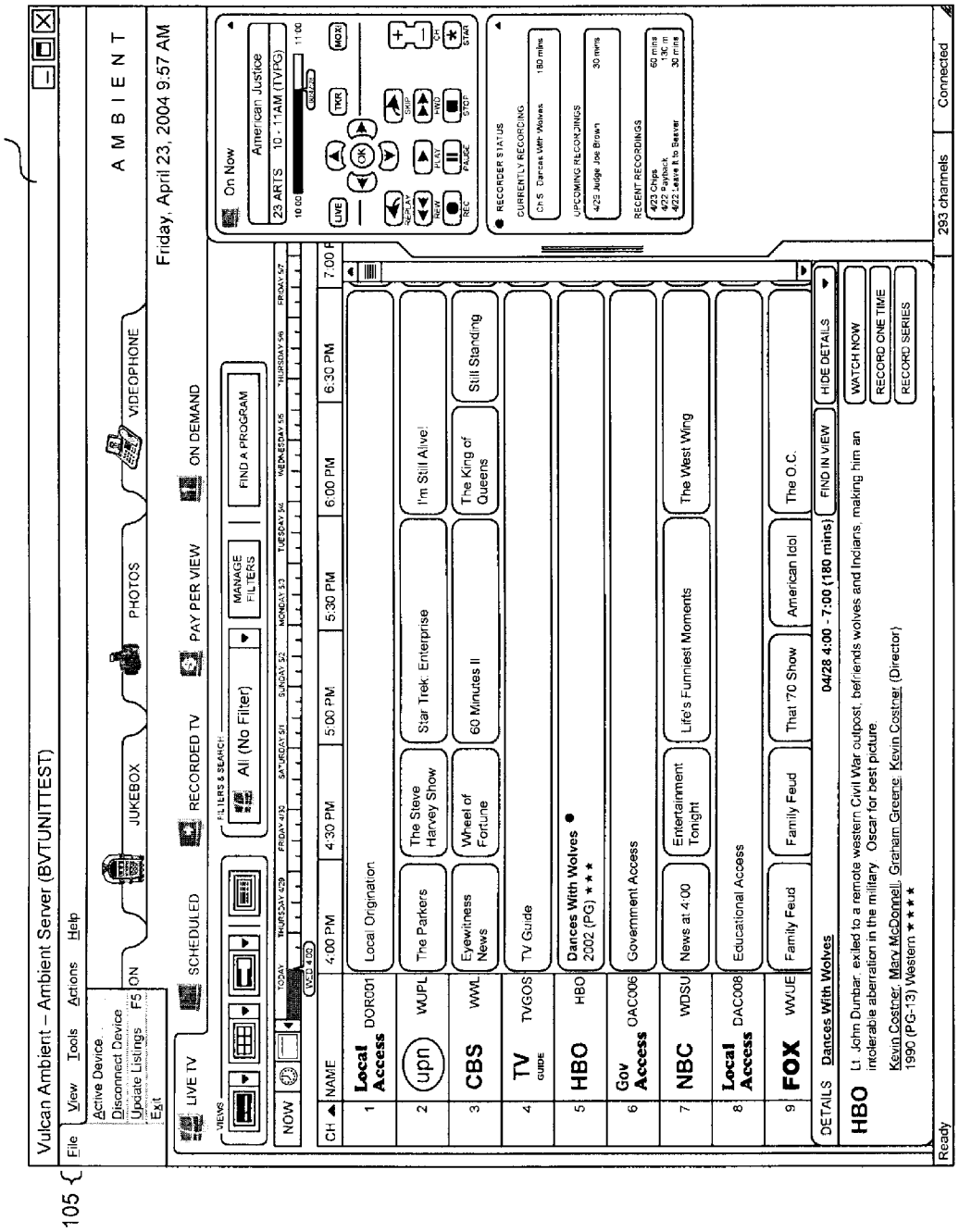
Figure 26:
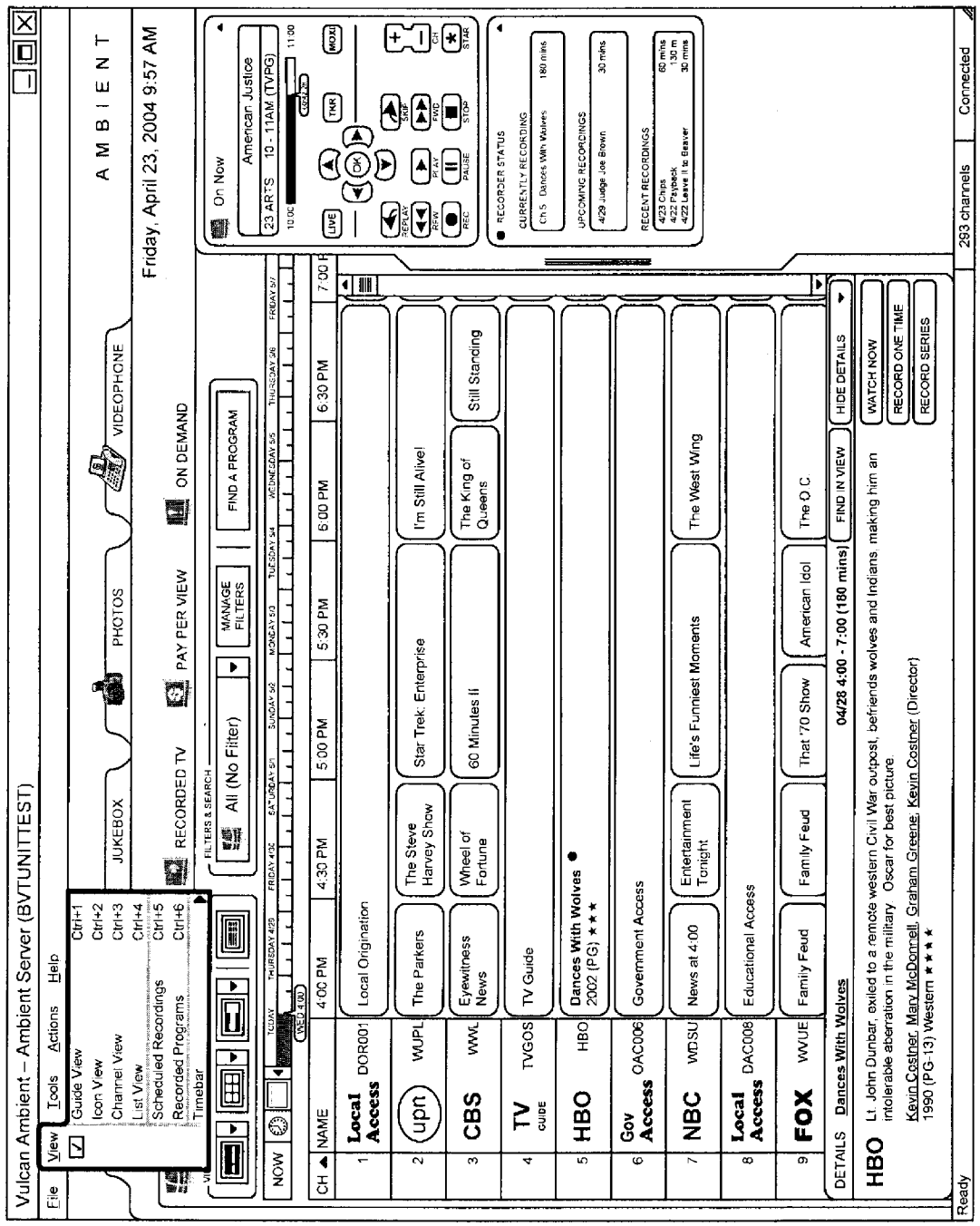

FIGS. 25-26 illustrate examples of additional capabilities available via the GUI 100 by using dropdown menus from the menu bar 105. In particular, FIG. 25 illustrates the dropdown menu available by selecting the "File" menu control, which includes the ability to connect or otherwise associate the GUI with one or more particular STBs, DVRs or other devices with which to interact (e.g., from which to receive program listing information and to which to send content manipulation instructions). For example, choosing the "Active Device" selection from the File dropdown menu may result in a list of one or more available devices (not shown) from which to select, while choosing the "Disconnect Device" selection from the File dropdown menu may result in a pop-up window (not shown) asking whether the user desires to connect to another device, although such a pop-up window may also be provided in other embodiments and situations (e.g., if a connected device or the connection to that device becomes unavailable). Choosing the "Update Listings" selection from the File dropdown menu may result in retrieving updating program listing information (e.g., if needed), and may further result in display of a pop-up window (not shown) indicating that the updated program listing information has been retrieved. Choosing the "Exit" selection from the File dropdown menu would cause the CM application to end.

FIG. 26 illustrates the dropdown menu available by selecting a "View" menu control, which includes the ability to select a current view to apply, as well as to select particular groups of the current content type for display. In addition, while not illustrated here, various additional functionality may be available from other dropdown menus. For example, an additional dropdown submenu (not shown) may be available by selecting the "Timebar" selection control from the View dropdown menu, such as to allow the user to select various first time scales for the first timebar (e.g., multi-hour or multi-day), as well as to make the current time the currently selected time. In addition, a dropdown menu (not shown) available by selecting the "Tools" menu control may include the ability to search for a program, to define a custom filter, to change a current color scheme, and to specify various options (e.g., via a pop-up window, not shown). Options may include controls, for example, to allow the user to select the style of the time line in the guide view (such as to select a condensed style); to show a visual vertical line or other indication in the view pane through the channel listings to indicate a currently selected time; to specify a default master font for use in the GUI (e.g., with the user receiving an additional pop-up menu to allow specification of the default master font); to limit the number of days of program data to be displayed; to allow the status control sidebar to be automatically hidden when not in use; to specify various information about connections to other devices at startup and periodically afterwards, and to specify various information about software and program listing update functionality. In addition, a dropdown menu (not shown) available by selecting the "Actions" menu control may include the ability to control the recording and viewing of content, as well as to select functionality to scan channels, and a dropdown menu (not shown) available by selecting the "Help" menu control may include the ability to check for updates for the CM system and to receive additional information and other help. Examples of at least some such additional functionality are illustrated in the parent provisional patent application, such as with respect to FIGS. 4G-4N.

Figure 28:
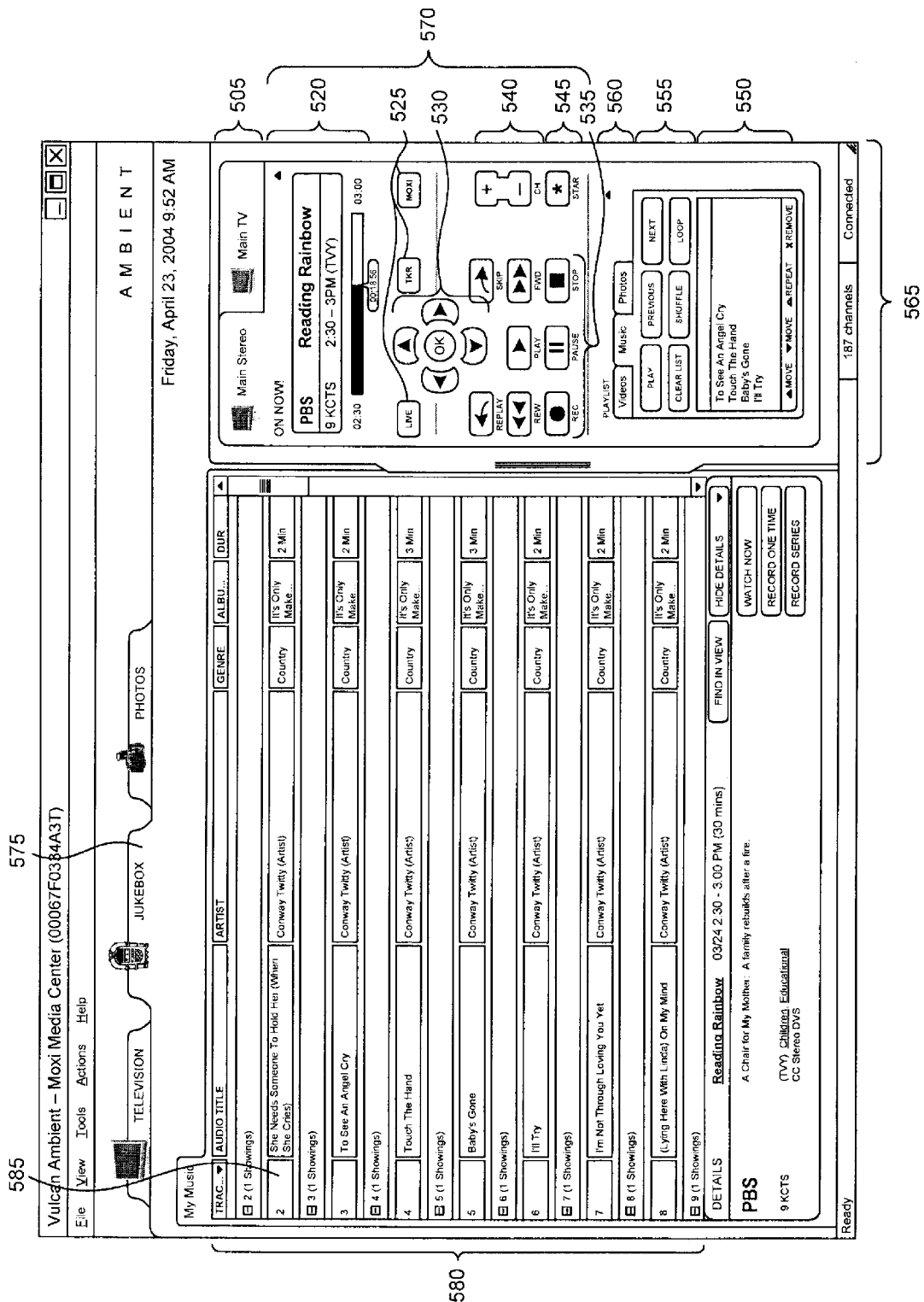
Figure 29A:
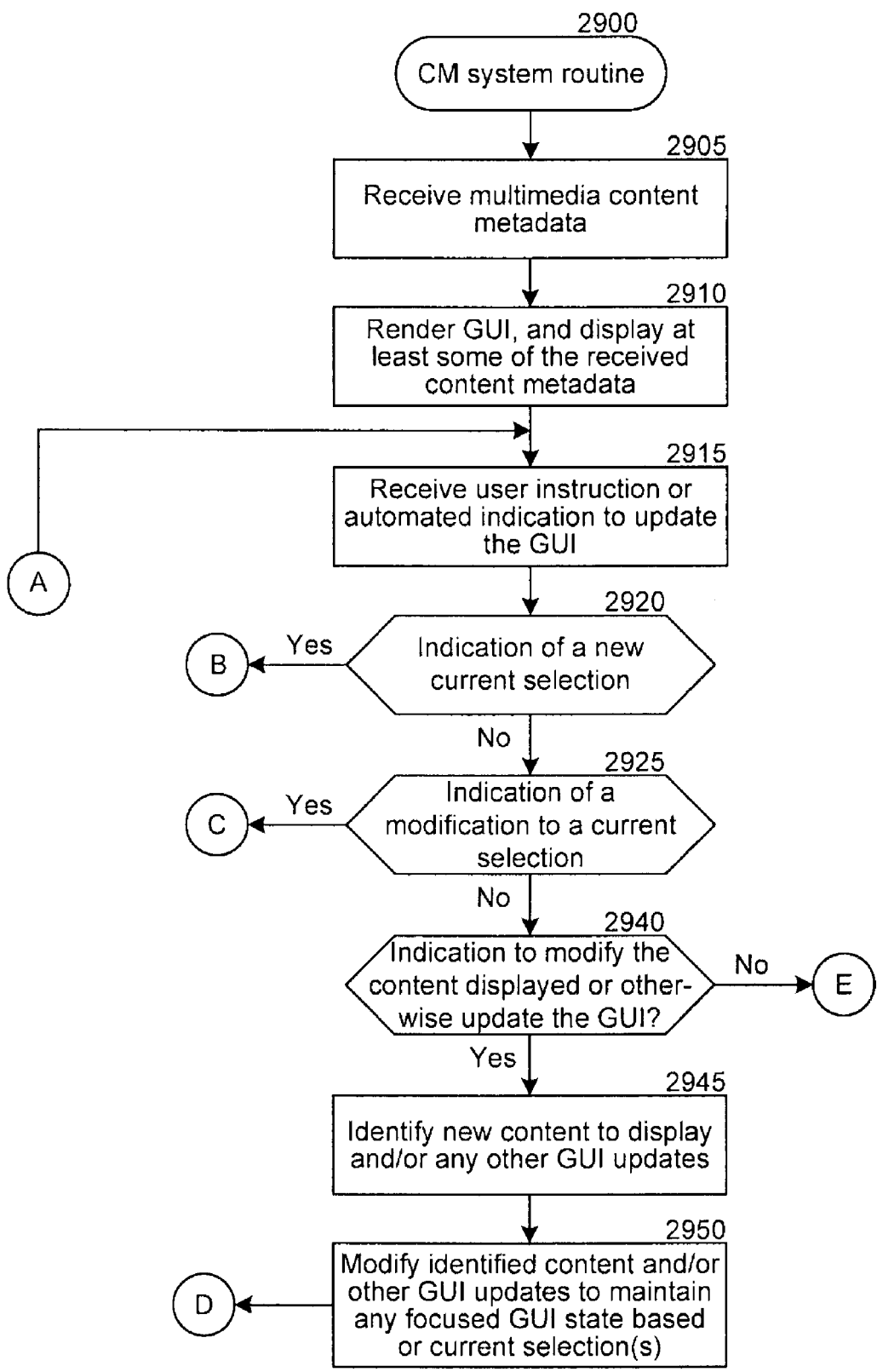
FIGS. 29A and 29B are a flowchart of an embodiment of a routine for an embodiment of a GUI for a content management system.
Figure 29B:
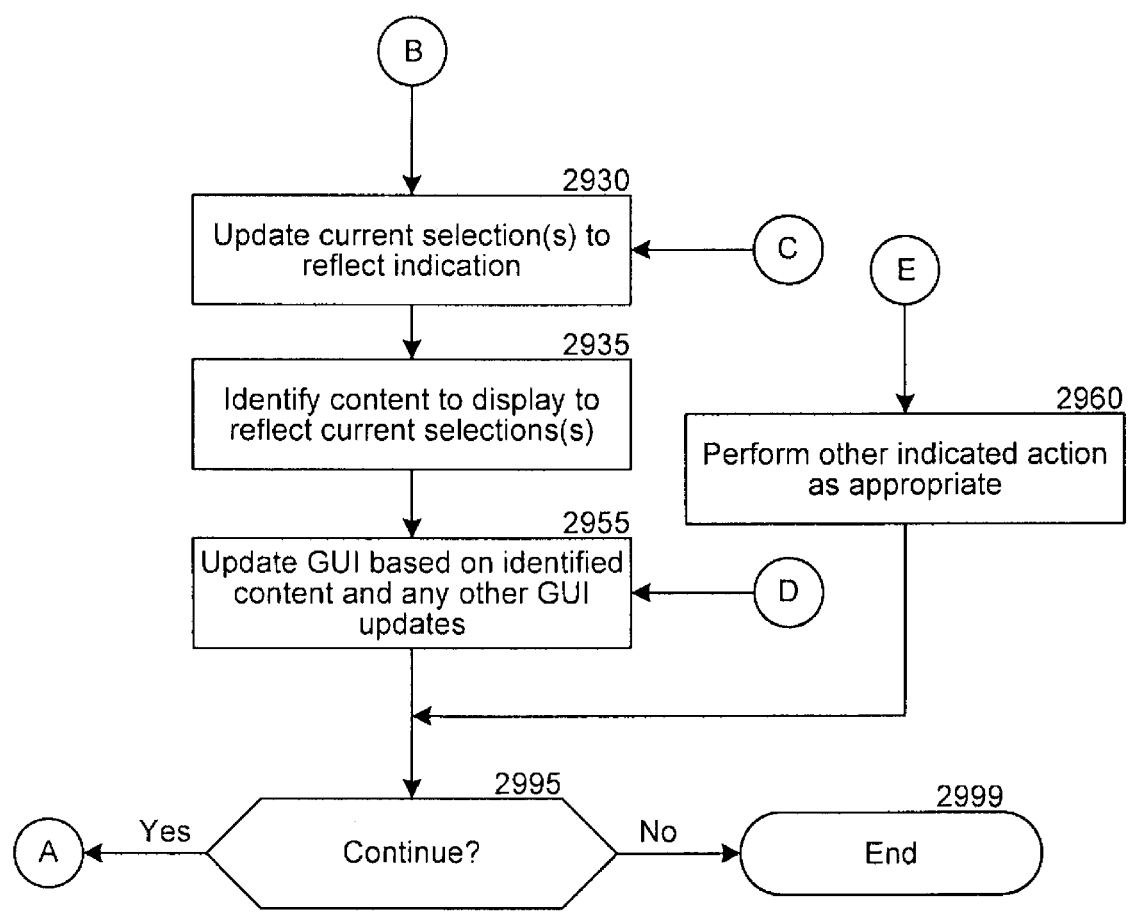

FIGS. 29A and 29B are a flowchart of an embodiment of an example routine 2900 for operating a GUI in such a manner as to maintain a state of the GUI that is focused to reflect one or more current selections, such as for GUI 100 discussed with respect to FIGS. 2-28 and/or the GUI discussed with respect to FIGS. 30A-30S. In some embodiments and situations, the content displayed in the time-based GUI may correspond to television programming, such as to use EPG data, while in other embodiments and situations various other types of content may be displayed. In addition, the types of current selections on which the GUI state may be focused may vary in various embodiments, such as to include one or more selected pieces of content, one or more selected types of content, and/or one or more selected times.

The routine begins at step 2905, where multimedia content metadata is received, such as if the computing system 300 receives EPG metadata information (i.e., as part of television programming-related content 360a) from a head-end and stores the information as content metadata 322 in the storage unit 320. At step 2910, the GUI is rendered on a suitable display device, such as to render the GUI 100 on the display 311, and an initial set of information about multiple programs is displayed in the GUI, such as based on the received metadata. In at least some embodiments, the initial set of information may reflect default or user-specified information, such as content corresponding to an initial second time period based on a current time.

In the illustrated embodiment, the content listings and other information remain rendered in the GUI until an indication is received to update the GUI, such as based on a timeout occurring (e.g., to refresh the program contents, such as every few seconds or when a ½ hour or other time segment of the second time period has passed), on receiving updated metadata or other information (not shown) to be displayed, or on the user selecting functionality to cause a change. As previously discussed, a user may make or modify a current selection in a variety of ways, such as by selecting an indication of a program displayed in a view area or other display area of the GUI, or by selecting a new current time via a timebar or other mechanism. Thus, the routine waits at step 2915 until such a GUI change is initiated, and then continues to step 2920 to determine whether a user has indicated a new current selection. If not, the routine continues to step 2925 to determine whether a user has indicated a modification to an existing current selection, such as to deselect or otherwise modify the current selection. If so, or if it was instead determined in step 2920 that a user has indicated a new current selection, the routine continues to step 2930 to update information about one or more current selections for the GUI based on the user indication, and then continues to step 2935 to identify content to be displayed in the GUI to reflect the one or more current selections, such as to maintain or initiate a state of the GUI that is focused on the one or more current selections.

If it was instead determined in step 2925 that the user did not indicate a modification to a prior current selection, the routine continues to step 2940 to determine whether an indication was received to modify the content that is displayed or to otherwise update the GUI, such as an indication from a user to perform sorting, searching, filtering, to display information about a current selection (e.g., based on selecting a "Find In View" control), etc., or instead an automated indication to update the GUI (e.g., based on a timeout or receipt of new metadata or other information to be displayed). If not, the routine continues to step 2960 to perform another indicated action as appropriate (e.g., to specify user preference information for later use), but otherwise continues to step 2945 to identify new content to be displayed and/or other GUI updates based on the modification indication. After step 2945, the routine continues to step 2950 to modify the identified content and/or GUI updates from step 2945 in such a manner as to maintain a state of the GUI that is focused to reflect one or more current selections (if such a focused state currently exists), such as to include information in the identified content that corresponds to one or more current selections (e.g., for a currently selected piece of content and/or for a currently selected time). After steps 2950 or 2935, the routine continues to step 2955 to update the GUI based on the identified content and any other GUI updates from steps 2950 or 2935. After steps 2955 or 2960, the routine then continues to step 2995 to determine whether to continue. If so, the routine returns to step 2915, and if not continues to step 2999 and ends.

In some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, in other embodiments the operations may be performed in other orders and in other manners. In addition, in some embodiments certain operations may be embodied in software or other computer-readable instructions stored on a computer-readable medium, such as software stored in the memory 330 of the CM system 335 of FIG. 1. The data structures discussed above may also be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

In some embodiments a variety of other types of content can similarly be reviewed, manipulated, and controlled via a GUI, such as via the example GUI 100, and a state of the GUI that is focused to reflect one or more current selections for the other types of content may be maintained in manners similar to those previously discussed. For example, in one example embodiment, the primary content-type navigation tabs 110 of FIG. 2 are available to allow the user to select music content (via selection of the displayed user-selectable "JUKEBOX" control), photos, images and/or video content (via selection of the displayed user-selectable "PHOTOS" control), and to obtain videophone functionality (via selection of the displayed user-selectable "VIDEO" control), with selection of one of the controls causing information about corresponding content to be displayed in the GUI. If so, the view area 140 (or a similar area of the GUI) may be updated to include content listings for the corresponding content (e.g., to display various metadata about the content), the detail area 150 may provide various additional details about a selected piece of content, the first timebar 128 may include graphical indicators corresponding to selected pieces of the content, and various other controls and areas of the GUI may similarly be updated (e.g., the secondary content-type-specific navigation tabs 115, the menu bar 105, the view control area 125, the status bar 155, the status control sidebar area 170, etc.). A variety of other types of content may similarly be available, including advertisements, news clips, excerpts from articles, Internet content, presentations, videogames, etc.

These other types of content may be manipulated in a manner similar to that described above for television programming-related content. In particular, various techniques have been described to organize and manipulate content based on one or more times associated with the content, such as based on the start time at which a piece of television programming-related content may be available for presentation. Other types of content may similarly have one or more of various types of associated times with which the content may be accordingly manipulated. For example, music content may be associated with a record date and time-of-day, a release date and time-of-day, a broadcast date and time-of-day, a receipt/download date and time-of-day, and various other time-related characteristic(s), and one or more of such associated times may be used to select pieces of music content to display in the view area 140 (e.g., based on those pieces of content each having an associated time within a second time period associated with the second timebar) and to select pieces of music content for which graphical indicators will be displayed in the first timebar (e.g., based at least in part on those pieces of content each having an associated time within a first time period associated with the first timebar). Photos and video can similarly have one or more associated times, such as creation date and time-of-day, revision date and time-of-day, download date and time-of-day, etc., and may similarly be displayed based on one or more of such associated times. Other types of multimedia content may have similar time-related characteristics.

Thus, in at least some embodiments the GUI 100 includes first and second timebars that can be used to organize and manipulate listings and other information for content of such other content types based on associated time information. For example, if a user downloads music on a regular basis and/or music is broadcast according to a timed schedule (e.g., on one or more digital music channels provided by a cable-based or satellite-based content provider), the view area 140 can display song titles based on the download times in a manner corresponding to the second timebar. Moreover, the user can sort, group, filter, view, or otherwise manipulate the listings and other information using similar techniques as previously described above for television program listings.

Moreover, while time-based organization and manipulation is useful for many types of content, in some embodiments at least some types of content may be organized and manipulated based on other types of associated information, whether in addition to or instead of based on time. For example, content with associated textual information (e.g., a title or name, names of one or more associated people, etc.) may be grouped in the GUI alphabetically or otherwise based on that textual information, such as by modifying the first and/or second timebars to correspond to portions of the alphabet rather than periods of time (e.g., to display multiple segments in the second timebar that each correspond to a distinct letter within a subset of letters from the alphabet, such as letters "C" to "H", the vowel letters, etc.). Various other types of metadata for content may similarly be used to group the content in other manners for organization and manipulation in the GUI, such as to group content hierarchically or based on other relationships between pieces of content if such relationships exist (e.g., based on a set of related photos from a single event or shoot, which may be one of many sets that are each associated with a higher-level organization or event), to group content based on genre or other categorization (e.g., for photos, images or video content, based on the device used to create the content, on the person who created the content, on a source from which the content was acquired, on subject matter of the content, on file size, on black-and-white versus color, on number of pixels or frames-per-second or other measure of resolution, on display size of the content, on use restrictions on the content, etc.), or to more generally group the content based on any other parameter or combination of types of parameters.

In a similar manner, but while not illustrated here, in some embodiments the GUI may be used to control a variety of devices, such as one or more STBs, one or more DVRs, one or more TVs, one or more of a variety of types of non-TV content presentation devices (e.g., speakers), etc. Thus, in at least some such embodiments, the GUI may be used to concurrently play a first specified program on a first TV, play a second specified program on a second TV, play first specified music content on a first set of one or more speakers, play second specified music content on a second set of one or more speakers, present photos or video on a computing system display or other TV, etc. When multiple such devices are being controlled, they may further be grouped and organized in a variety of ways, such as by location and/or by type of device (or type of content that can be presented on the device). In addition, the virtual remote control buttons displayed in the GUI may change based on a current context, such as on the device that is currently being controlled and/or based on content that is currently selected. In addition, extended controls of a variety of types beyond those discussed in the example embodiment (e.g., channel up and down, volume, a keyboard, device-specific controls, etc.) may additionally be provided via the GUI in at least some embodiments. Moreover, in at least some embodiments all of the controls of the GUI may be selectable by one or more of a variety of input device types, such as all being selectable by keyboard, by voice command, by mouse, etc.

In addition, in some embodiments multiple pieces of content may be simultaneously selected and acted on in various ways, such as to schedule multiple selected TV programs to be recorded or deleted, to group the pieces of content together for future manipulation, etc., as is discussed in greater detail for one specific example with respect to FIG. 28. Moreover, in some embodiments multiple users may interact with the same copy of the CM system, and if so various user-specific information (e.g., preferences, custom filters, prior searches, prior recordings or viewings of programs, information for user-specific recommendations, etc.) may be stored and used to personalize the GUI and its information and functionality for specific users. In addition, in embodiments in which the CM system is interacting with an external program, such as via an STB or DVR that has its own user GUI (e.g., one that is displayed to users on a television), additional integration between the CM system and the STB or DVR may be possible, such as to include user-selectable links or other references in the GUI of one of the systems to the other system (e.g., to allow a user to select the CM system from a menu or other information displayed to a user by an STB or DVR). A variety of other types of related functionality could similarly be added.

FIG. 28 illustrates an additional example of capabilities provided in at least some embodiments, such as with additional controls and capabilities in a status control sidebar area of an example GUI to allow a user to define and use one or more "playlists" that each may have one or more pieces of content to be recorded and/or are available for playback or other presentation on a specified presentation device. As with other example GUI embodiments, a state of the GUI that is focused to reflect one or more current selections may be maintained in various ways in at least some embodiments. In this illustrated embodiment, the GUI includes a current playlist selection section 550 that includes various user-selectable music selections in a current playlist. The illustrated embodiment of the playlist also includes various user-selectable playlist type control tabs 560, with a "Music" type control tab being currently selected—in other embodiments, playlists may be organized in other manners, such as to have a single playlist that includes content of various types, such as video information (e.g., television programming), digital music, photos and other images, etc. In addition, the illustrated embodiment includes a variety of user-selectable controls that are specific to playlists, such as controls 555 for controlling how content within the currently selected playlist is presented (e.g., to move to a previous or next piece of content in the list, to clear the list, to play a current selected piece of content, to play the content in the currently selected playlist in shuffle mode, to repeatedly loop through presentation of the content in the currently selected playlist, etc.), and controls 565 for altering the arrangement and contents in the currently selected playlist (e.g., to move contents items up or down in the current playlist, to remove content items from the current playlist, etc.), as well as to cause presentation of a currently selected piece of content to repeat.

In this illustrated embodiment, the GUI status control sidebar area also includes multiple user-selectable device control tabs 505, with each tab representing a device that can be controlled (although in other embodiments other configurations may be used, such as for some or all tabs to represent multiple devices of a type, multiple devices in a location, or multiple devices that are otherwise associated), such as with respect to presenting content and/or recording or otherwise obtaining content for later presentation. In this example, two device tabs are illustrated for devices to which live or previously recorded content can be directed, with a "Main Stereo" stereo device tab being currently selected and a "Main TV" television device tab also available, although in other embodiments multiple devices of a single type (e.g., multiple stereos and/or speakers) may simultaneously be available. In addition, the current content information section 520 indicates that "Reading Rainbow" programming audio is currently being directed to the "Main Stereo" device for presentation, while other content (not shown) may be being directed to the "Main TV" television device. In some embodiments, control instructions may be sent directly to the device being controlled (e.g., by directing the "Main TV" television device to change channels), while in other embodiments one or more intermediate devices may be involved in the control instructions (e.g., by directing an STB, not shown, to control live television content sent to a television device and/or by directing a DVR, not shown, to direct recorded music or television audio content to a currently selected stereo device). Moreover, in some embodiments one or more such intermediate devices may each be able to interact with and/or control multiple presentation devices, such as to have a single STB and/or DVR device control content being provided to two television devices (e.g., by using a MOXI device that provides such functionality). In addition, in some embodiments the device that is currently selected for control may affect the information in the playlist section in various ways, such as to select a current playlist based on a current device being controlled (e.g., based on the type of device, such as to select a playlist having video information when the device being controlled is a television device) and/or to enable content for current selection only if appropriate for the currently selected device (e.g., to disable video or image information if the currently selected device is a speaker, but to allow video, images and music to be presented on at least some types of television devices, such as based on capabilities of the device).

Content may be selected for inclusion in a playlist in various ways, and playlists may be created and maintained in various ways (e.g., maintained indefinitely until the user otherwise modifies or removes the playlist, or instead in a temporary manner, such as for a specified period of time and/or until storage space is needed for other purposes). In the illustrated embodiment, the view area includes a listing of various music content that is scheduled to be presented at various current and/or future times, such as based on the "Jukebox" primary content-type navigation tab 575 being currently selected. In some embodiments, a piece of content may be selected from the view area and added to a current playlist and/or a user-specified playlist, such as via a pop-up menu (not shown). For example, a currently selected "She Needs Someone To Hold Her" song may have been just added to the current playlist based on a user instruction, and in other embodiments music may be presented and selectable in other manners and/or other types of content (e.g., other types of audio information, television programming and other video, photos and other images, etc.) may similarly be presented and selectable in various manners. In addition, while not illustrated in the current example, in some embodiments one or more user-selectable controls may be provided in the detail area, such as to allow a currently selected item to be selected to a current playlist and/or a user-selectable playlist (e.g., from a list of playlists).

In some embodiments, only currently presented content may be available to be added to a playlist (e.g., to allow recording concurrent with its presentation), while in other embodiments content that is scheduled for later presentation may be added to a playlist and automatically recorded at that time—in such latter embodiments, content in a playlist that is not currently being presented and is not yet recorded may be treated differently than other content in the playlist, such as to prevent the content from being selected for current presentation on a currently selected device being controlled. In addition, content may be able to be selected for playlists in other manners in other embodiments, such as by downloading content from a remote computing shown (not shown) via the Internet or other mechanism. Moreover, in some embodiments an "auto-tune" playlist functionality may be provided that, rather than playing recorded programs one after the other, instead tunes a device (e.g., a television or stereo) at appointed times and/or intervals. While not illustrated here, content may further be organized in various manners, such as in manners selected by the user (e.g., by allowing the user to specify names for playlists, to organize the playlists in various ways, to associate playlists with each other and/or with devices available to be controlled (e.g., specific devices and/or types of devices).

Content in a playlist may also be controlled in various ways in various embodiments, including by selecting and manipulating individual pieces of content within a playlist and/or by treating some or all of the content in a playlist as a group. As previously noted, the illustrated embodiment includes various playlist-specific controls 555 and 565 that may be used to control playlists and content in playlists. In addition, in at least some embodiments some or all of various user-selectable controls in section 570 may be used to control presentation of a current playlist and/or of a currently selected piece of content in the current playlist, or alternatively to control other types of content (e.g., television programming). Such additional controls may include the following: channel controls 540 for manipulating a current channel, and in other embodiments other controls (e.g., user-selectable numeric buttons, not shown) may be available for specifying a particular channel; various controls 535 for controlling the presentation of content, such as to pause presentation, skip backward, skip forward (when available, such as with other than live content) and rewind or fast forward, as well as to provide an instruction to record content that is currently being presented; various user-selectable controls 525 for affecting the type of content being presented from among various sources, such as live television programming (e.g., from a cable company or satellite provider), a menu or other functionality from a STB and/or DVR (e.g., a MOXI device), and a ticker on at least a portion of the display of the currently selected television device (e.g., with headline news, such as from a cable company or from a provider associated with the DVR); various interactivity controls 530 for further allowing the user to make various selections, such as from a menu or from among multiple options; and one or more specialized controls 545, such as to correspond to functionality that may be available on only certain devices, such as on certain types of STBs and/or DVRs.

While not illustrated here, in some embodiments the sidebar may also include a user-focused content summary area related to upcoming recordings and previously recorded programs, such as to allow a displayed previously recorded program to be selected for current presentation on a currently selected presentation device (e.g., via instructions sent to a DVR or other storage device on which that program is stored)—examples of such a display of previously recorded programs are illustrated in various other figures, such as in the user-focused content summary area 165 of FIG. 2.

As previously noted, FIGS. 30A-30S provide examples of a GUI and related capabilities that may be used in some embodiments with a cellphone or other device with a limited display screen and/or limited input device capabilities (e.g., a device without an alphanumeric keyboard). As discussed in greater detail below, in some embodiments all of the various GUI capabilities discussed previously (e.g., with respect to FIGS. 2-28) may be provided as part of the GUI on the cellphone or other device (whether in the same or different manners from those capabilities as previously discussed, such as by using pop-up menus), while in other embodiments only a subset of the capabilities may be available (e.g., to limit at least some displays of information to only a single size or level of detail, such as due to limited available display area). In addition, the cellphone or other device may include one or more of various capabilities to enable local and/or remote communication, including wireless communications (e.g., via Bluetooth, Wi-Fi, direct infrared, etc.) one or more ports to allow a wired or cabled connection (e.g., a docking station port), GPRS or other data communication services (e.g., to allow exchange of packet-based information via HTTP or WAP), a standard telecommunications link for exchanging voice and other audio information, etc. Also, as with other example GUI embodiments, a state of the GUI that is focused to reflect one or more current selections may be maintained in various ways in at least some embodiments.

In particular, FIG. 30A illustrates an embodiment of a smartphone cellphone device 600 that includes a display area 605 and various controls, although in other embodiments a corresponding device may have other controls and/or a different form factor. In the illustrated embodiment, the cellphone includes various user-selectable numeric controls 610, various controls 615 to control voice-based communications and to allow selection and other movement through a displayed list of items or other menu (not shown), various controls 617 to alter content presentation (e.g., to control volume), various controls 616 to correspond to dynamically modifiable controls displayed to the user (not shown), and an area 619 to indicate when recording is to occur and/or is occurring and to optionally in some embodiments allow user control of such recording.

Figure 30B:
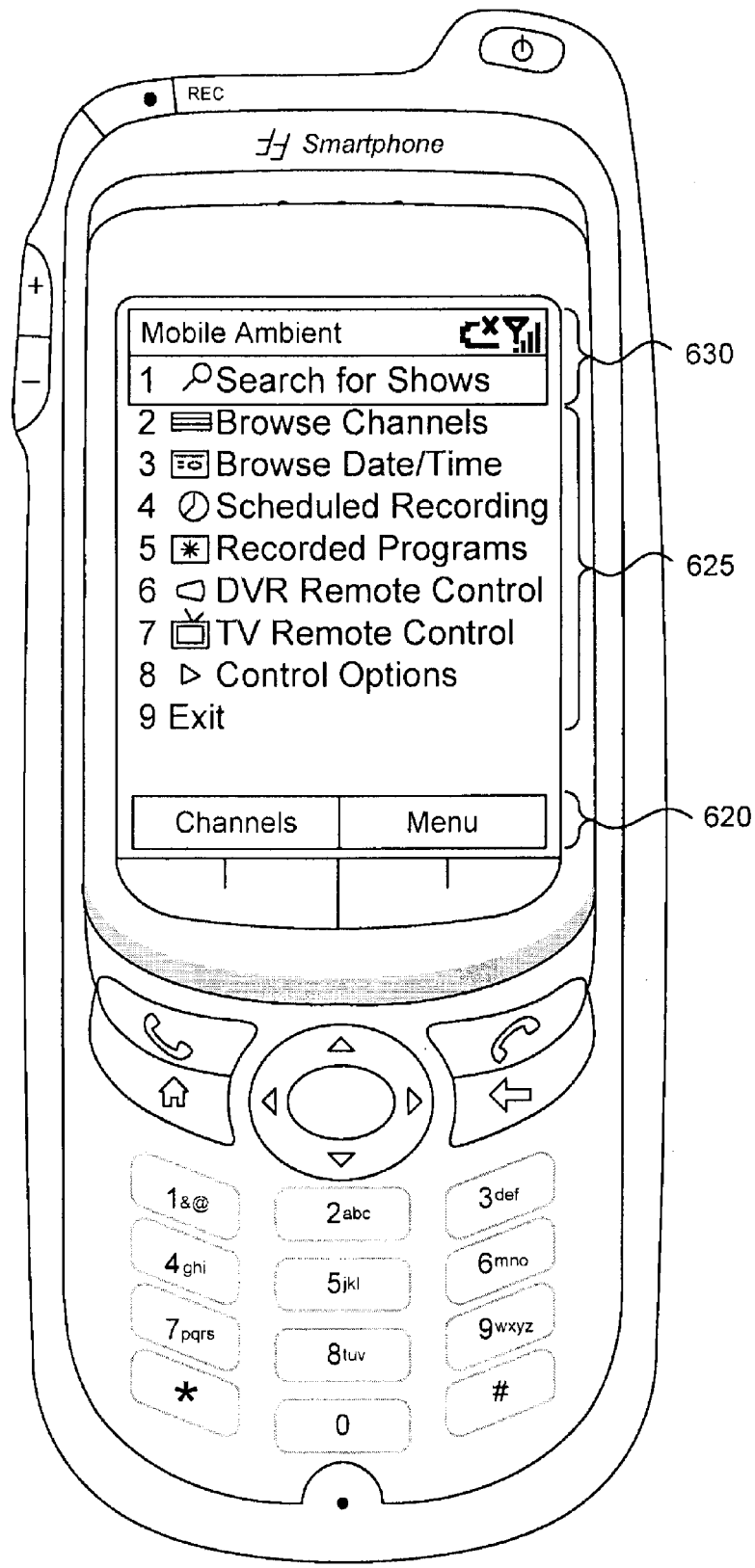

FIG. 30B illustrates various information in the display area of the cellphone, which in this example includes a current status area 630, a current selection area 625, and one or more user-selectable controls 620—in the illustrated embodiment, each of the user-selectable controls 620 may be selected by activation of a corresponding hardware control on the cellphone immediately below the control 620, although in other embodiments such controls may be activated in other manners (e.g., by direct selection if the display area is touch-sensitive). In the illustrated embodiment, the current selection area illustrates a menu of 9 options that are selectable by the user to obtain various types of functionality and content, and the current status area includes a title for software that is executing on the cellphone to provide the illustrated capabilities (which in this example is "Mobile Ambient") and information about a current status of the cellphone's battery and connection signal strength. In this example embodiment, the functionality and content correspond to television programming, although in other embodiments various other types of content may be controlled in a manner previously discussed.

Figure 30C:
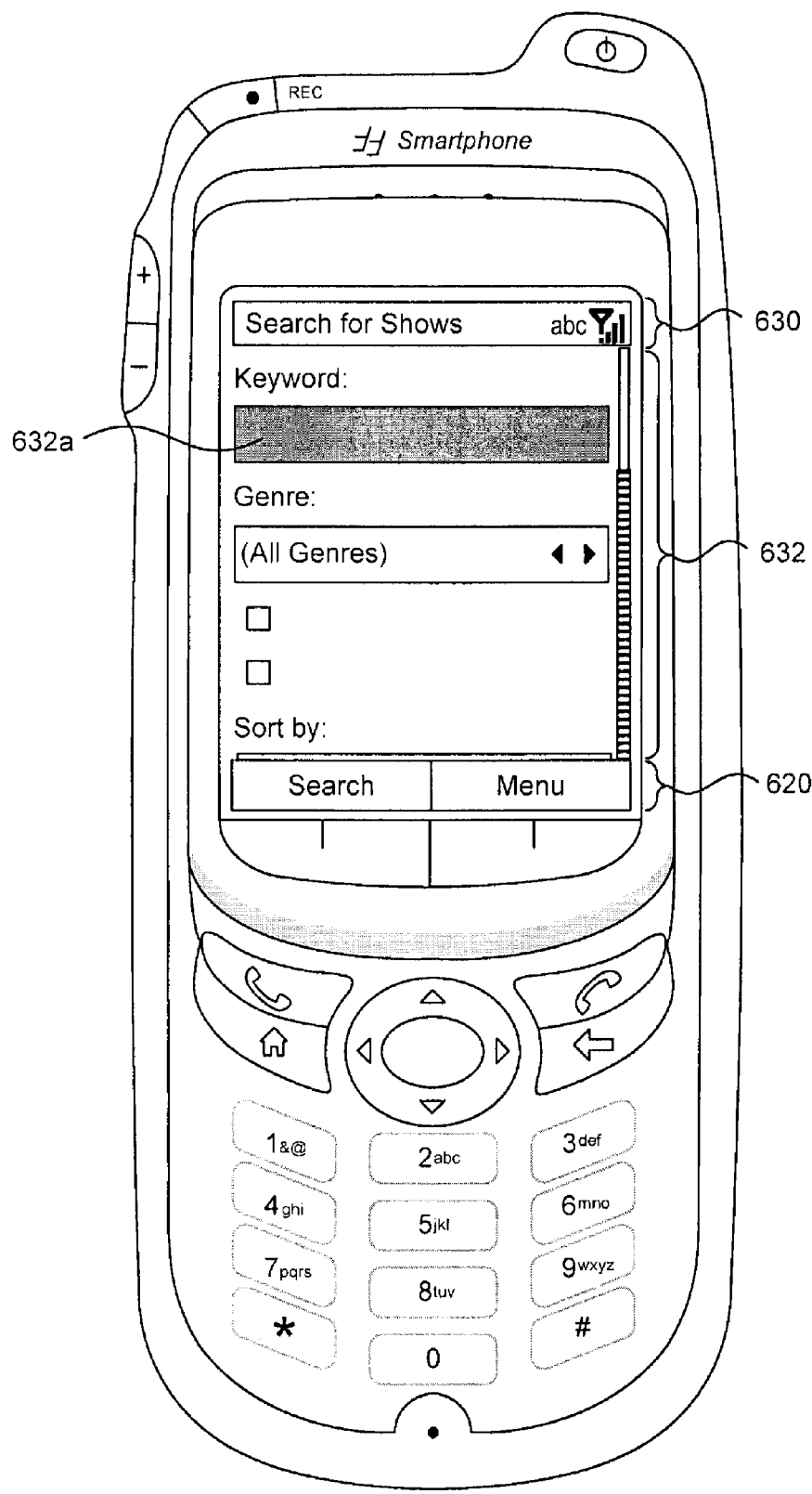
Figure 30D:
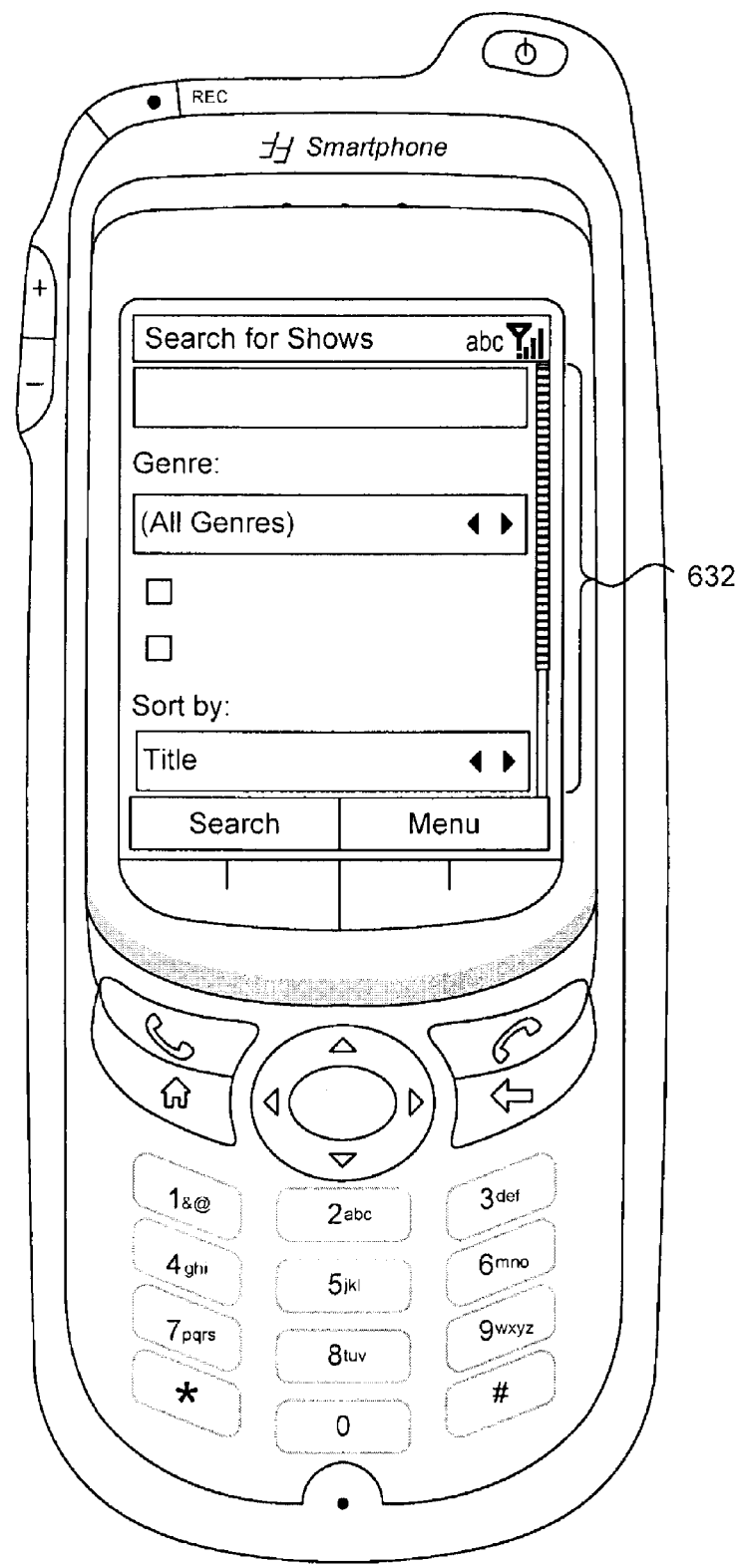

After selection by the user of the first "Search for Shows" option in the current selection area 625 (such as via controls 615 and/or 610), the display area of the cellphone changes to show search information 632, as shown in FIG. 30C. The current status area is also modified to indicate that "Search for Shows" functionality is being provided, and the battery status indication may be replaced with various other information (e.g., an indication of a currently selected channel). In the illustrated embodiment, the search information includes a user-specifiable text input field 632a in which the user can specify one or more keywords to use in the search (e.g., using the numeric controls 610, or using a virtual keyboard displayed in the display area, not shown), as well as a list of genre from which the user can select. Various other types of search options can additionally be specified in other embodiments. In addition, the controls 620 are modified so that the user can initiate a search by using the "Search" control, or can use the "Menu" control to return to the options menu displayed in FIG. 30B (whether due to the "Menu" control always returning to that options menu regardless of the menu level, or due to the control causing the next-higher display level to be shown). FIG. 30D shows additional information in the search information 632 area, such as due to the visual display being scrolled down by the user (e.g., via controls 615 and/or 617), which in this example includes a list of sorting options that the user can select for the search results. Various additional details related to searching and sorting are described previously, and in some embodiments some or all of those capabilities may similarly be provided here. After the user performs a search, the results of the search will be displayed to the user (not shown), such as in a user-selectable list format from which the user can select a television show to be manipulated, such as to be recorded and/or to be presented on the cellphone or on a television device being controlled. Moreover, in at least some embodiments a user may further select one or more search results for other purposes, such as to cause additional information about the to be displayed. Furthermore, metadata values and/or other attributes of a program may be directly selected, such as to cause search criteria to be populated with those values or other attributes to enable searching for programs with similar or matching information to that selected.

Figure 30E:
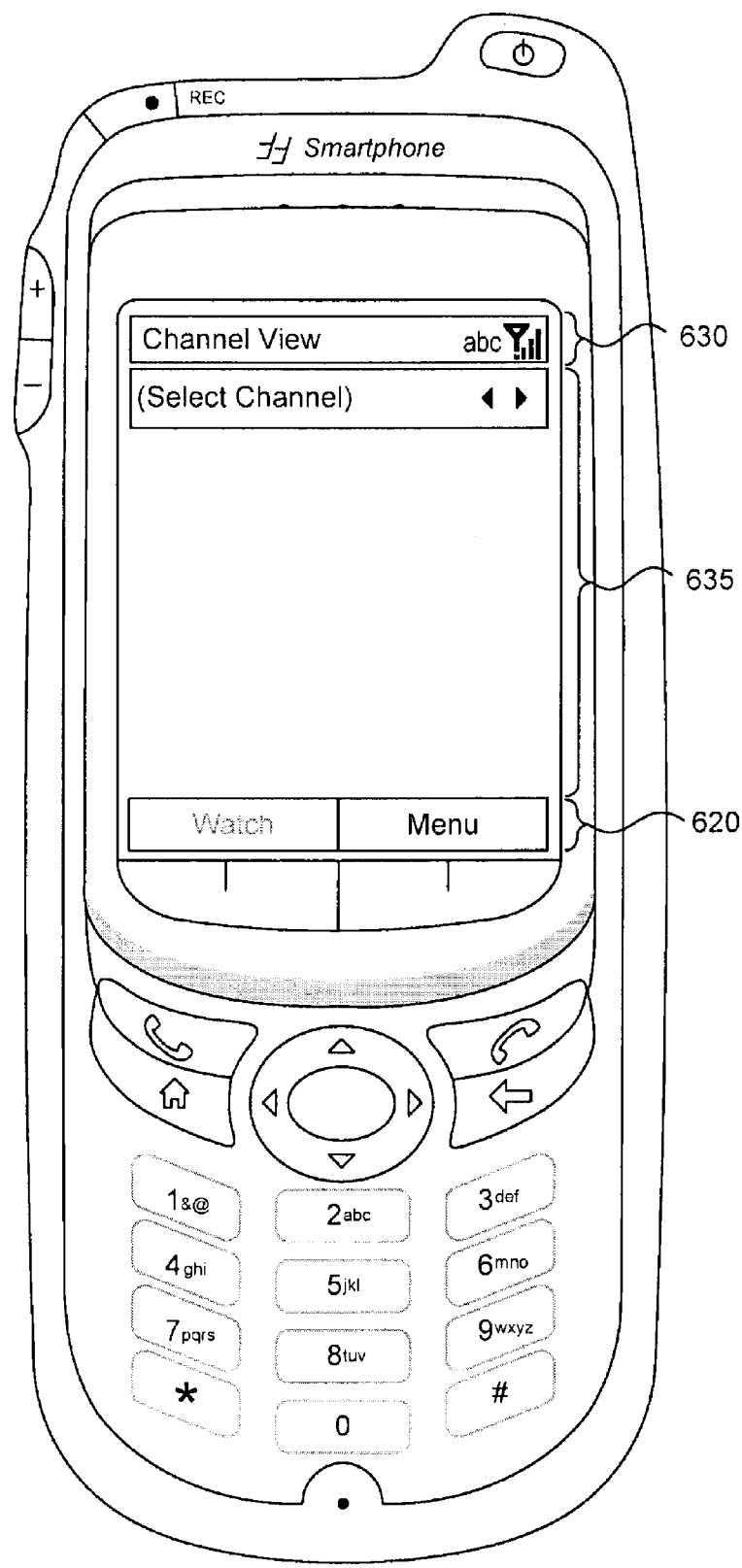
Figure 30F:
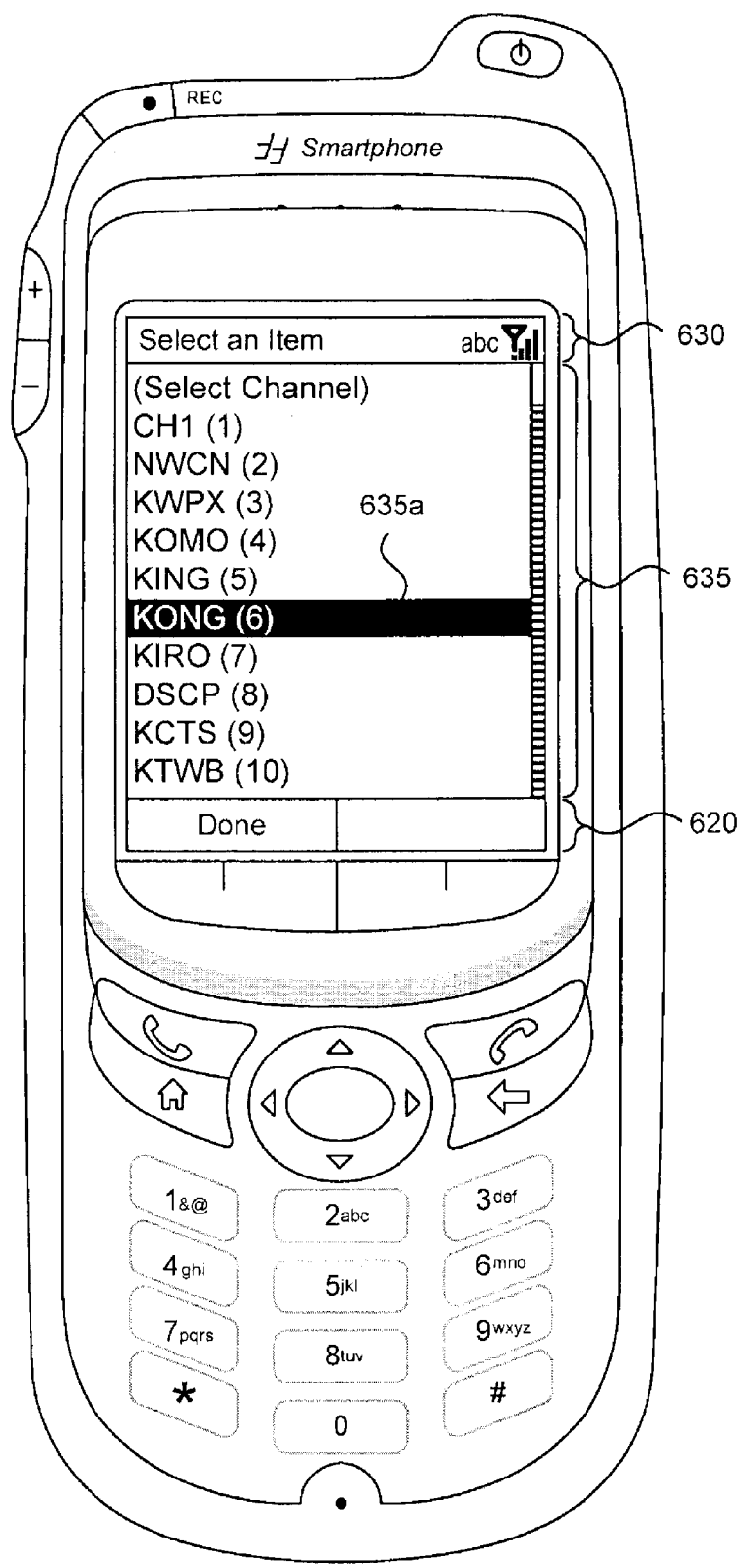
Figure 30G:
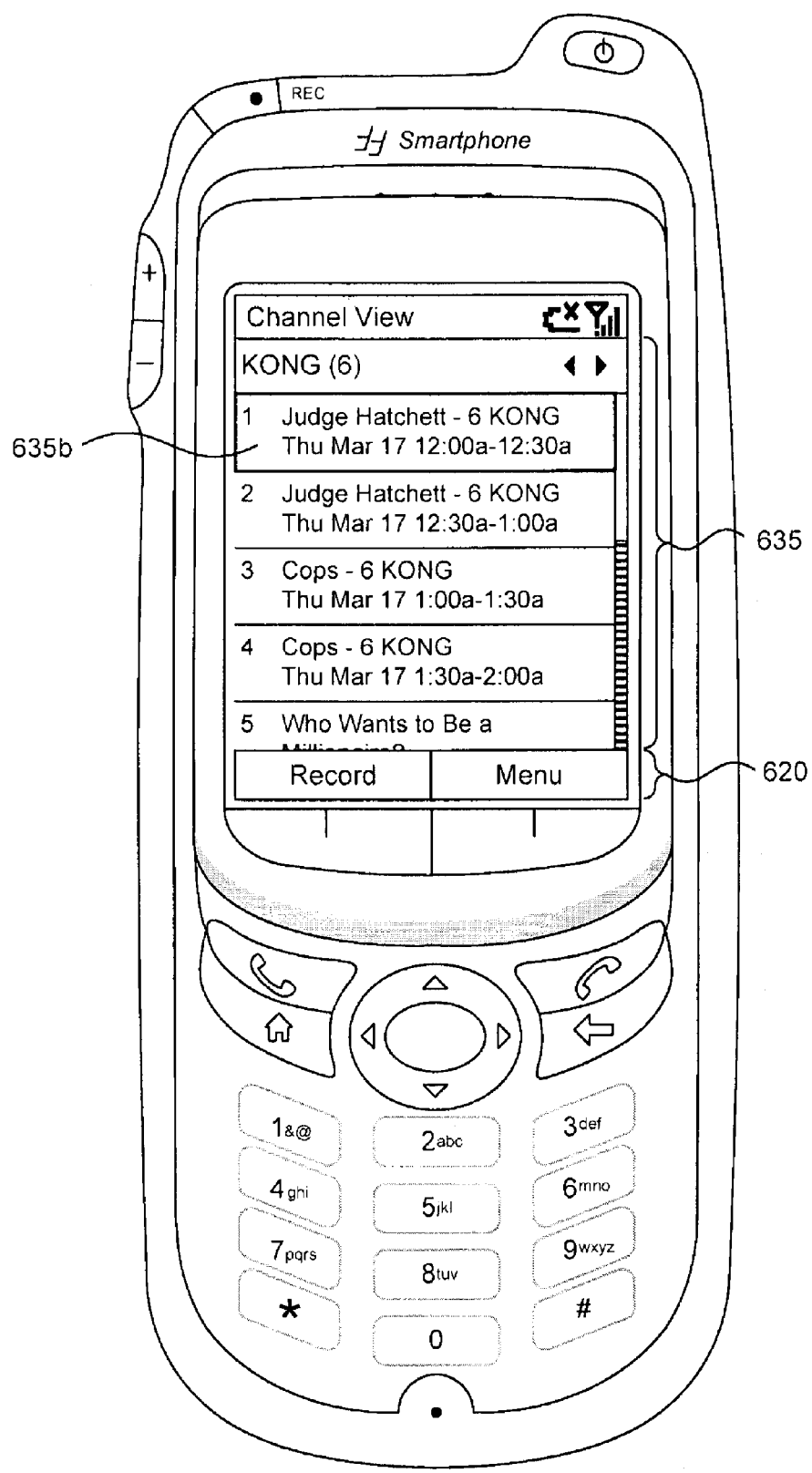
Figure 30H:
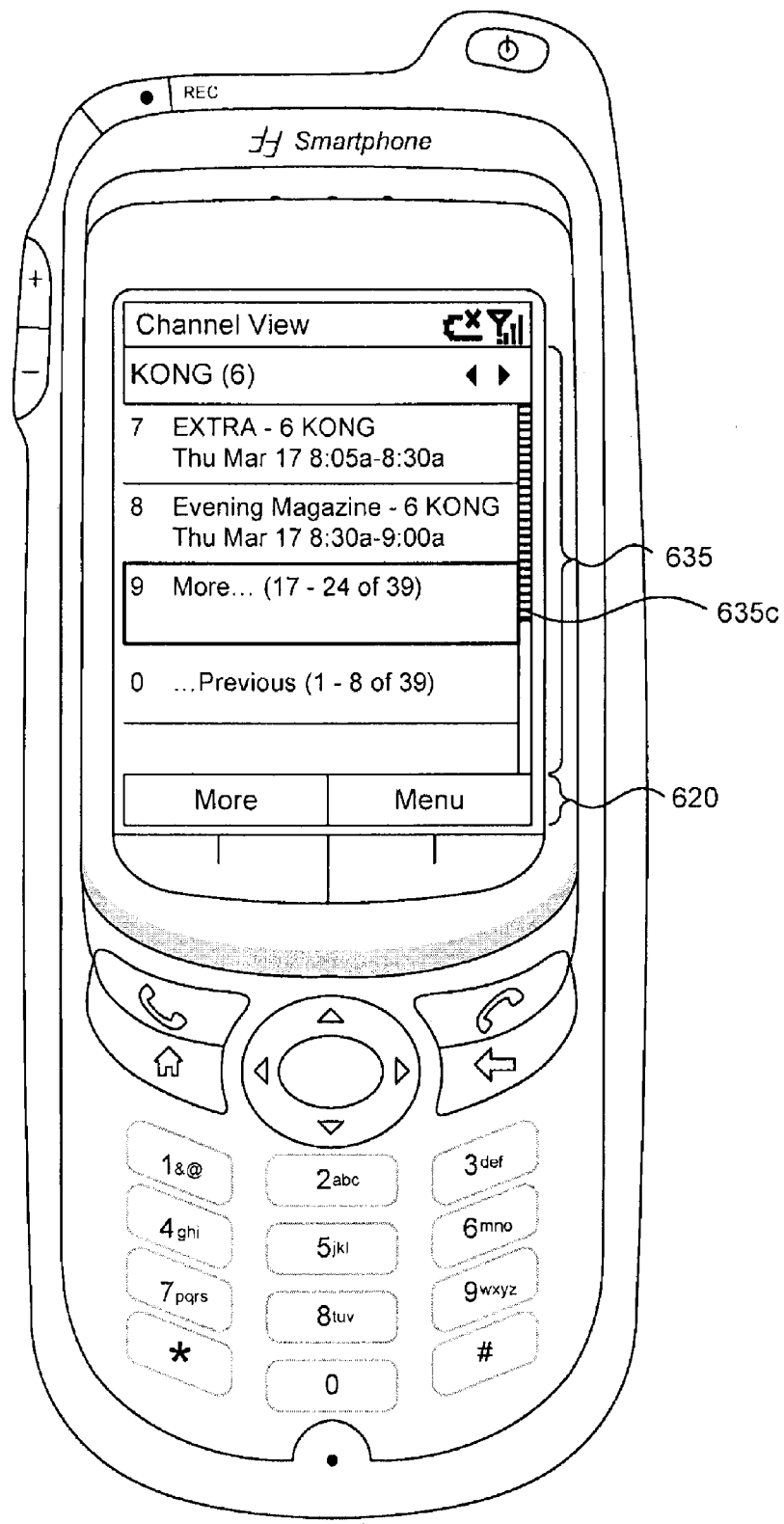

If the user instead selects the second option "Browse Channels" in the current selection area 625 of FIG. 30B, the display area of the cellphone changes to show channel-related information 635, as shown in FIGS. 30E and 30F. The current status area is also modified to indicate that "Channel View" functionality is being provided in FIG. 30E, and the controls 620 are modified in FIG. 30E to allow the user to specify a television program to be presented via the "Watch" control (e.g., a television program from a currently selected channel, although in the current example no television programs are currently illustrated). In this example, the user can select a displayed option to list the available channels, and the information 635 of FIG. 30F illustrates an example of a listing of channels that may result from such a selection (or instead by default after selection of the "Browse Channels" option from FIG. 30B). As is shown, the user has currently selected the "KONG (6)" option 635a from the list of channels, and subsequent selection of the "Done" control 620 may cause information to be listed for that channel (e.g., to show programs to be shown on that channel at various times, such as in a list) or may cause the current program on that channel to be selected for current presentation. FIG. 30G illustrates example information 635 that corresponds to a list of programs on the currently selected "KONG (6)" channel, with the first television program "Judge Hatchett" 635b currently selected (e.g., due to that program being the current program being displayed and/or the next program to be displayed). In this example, the user is also provided with a control 620 to "Record" the currently selected program. After the user scrolls down, FIG. 30H illustrates additional programs, as well as option 9 to see more programs for the channel (e.g., such as based on selection of the "More" control 620 and/or the "9" numeric control 610). Various additional details related to displaying information about channels and television programs are described previously, and in some embodiments some or all of those capabilities may similarly be provided here.

Figure 30I:
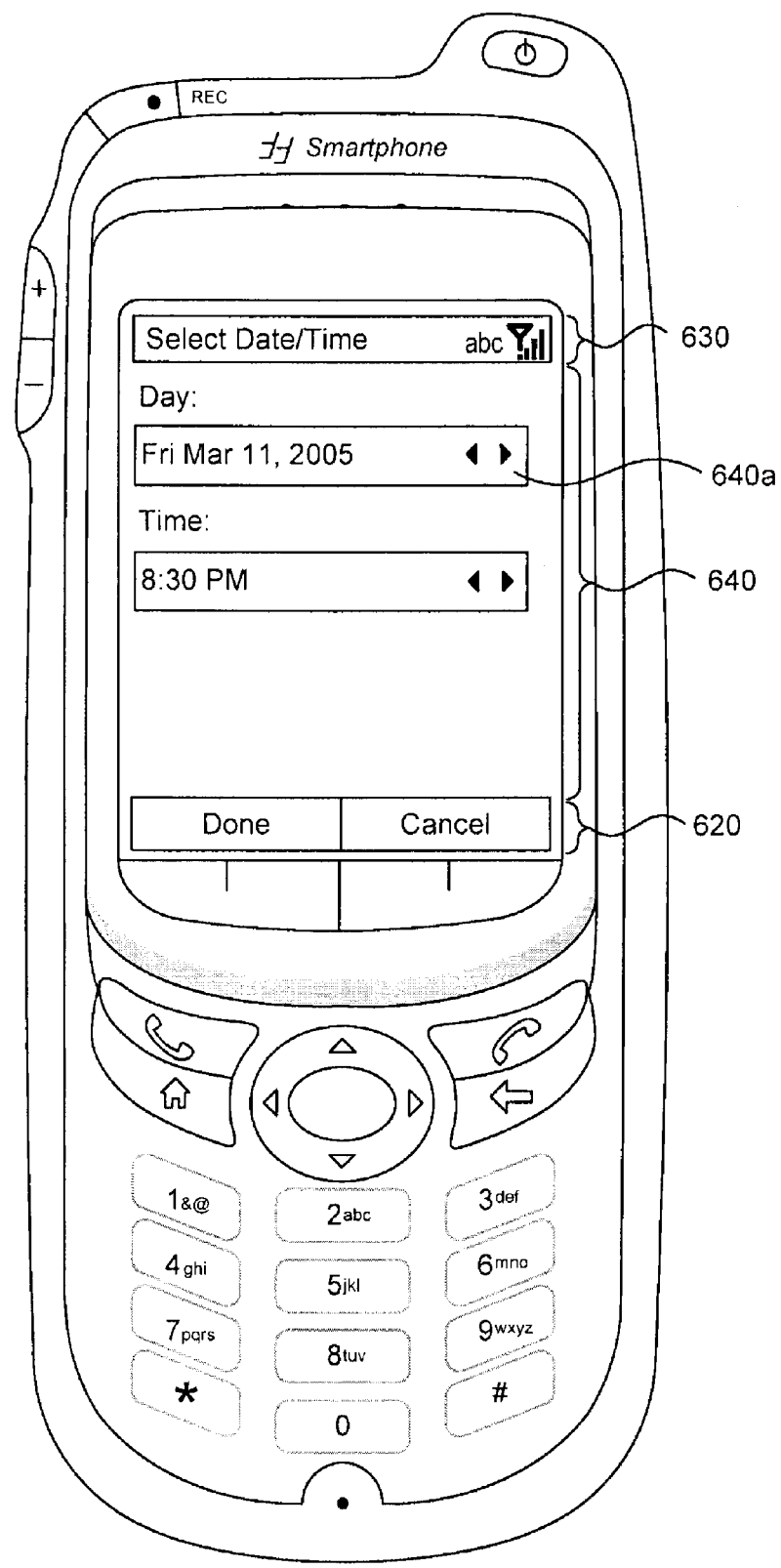
Figure 30J:
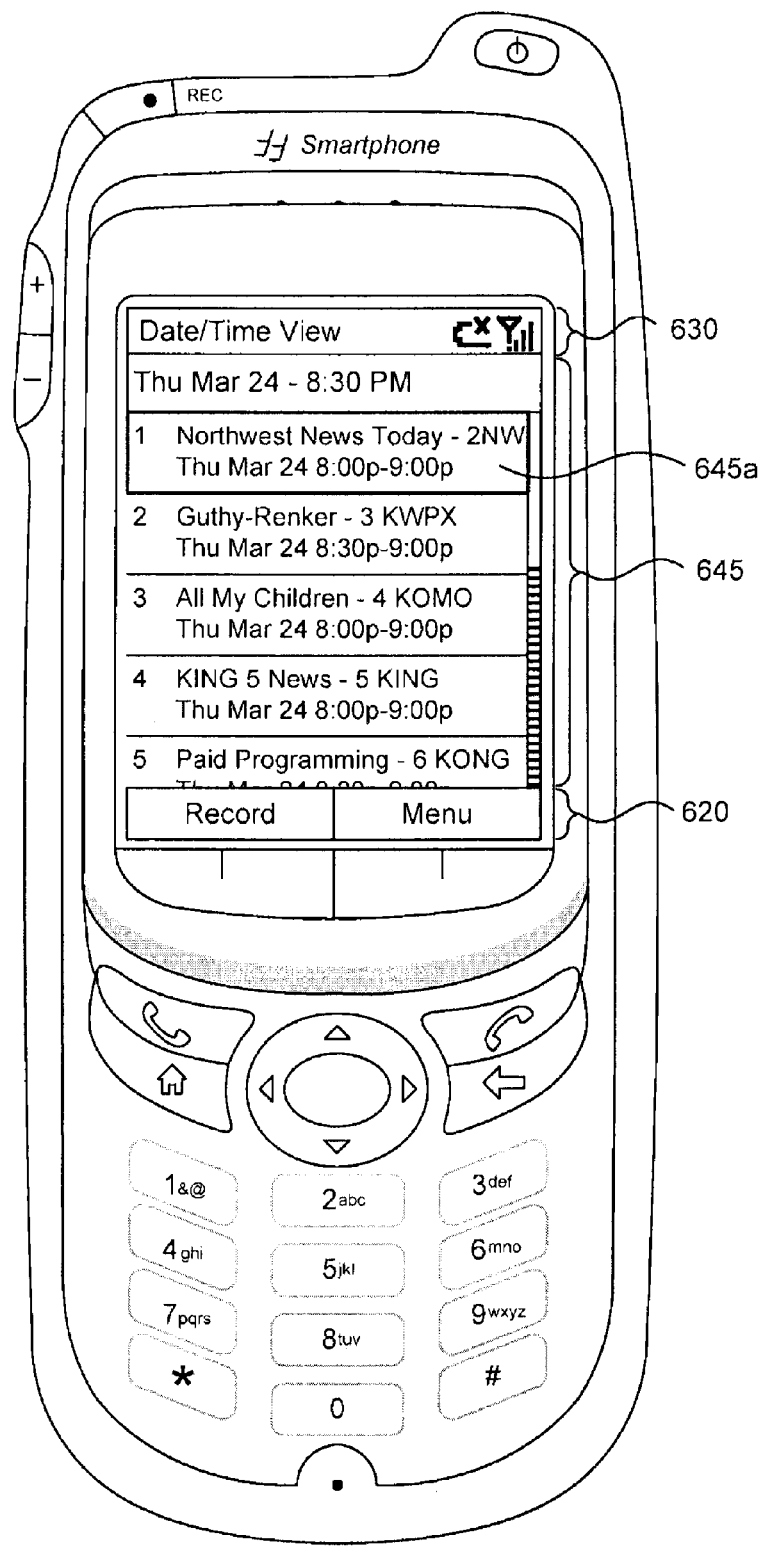

If the user instead selects the third option "Browse Date/Time" in the current selection area 625 of FIG. 30B, the display area of the cellphone changes to show information 640 to allow a date and time to be specified by the user, as shown in FIG. 30I. The current status area is also modified to indicate that "Select Date/Time" functionality is being provided, and the controls 620 are modified to allow the user to indicate that they are "Done" or to cancel the date/time selection. In this example, the user can select a displayed option 640a to list and select a day, and may similarly list and select a time on that day. FIG. 30J shows the results for a selected date and time (in this example "Thursday March 24" at "8:30 pm"), with a list 645 displayed of programs that are being presented at that day and time. The current status-area is also modified to indicate that the "Date/Time-View" view is being provided, and the controls 620 are modified to allow the user to indicate to "Record" a currently selected program such as the "Northwest News Today" program 645a on channel 2. Various additional details related to displaying information about television programs at selected times are described previously, and in some embodiments some or all of those capabilities may similarly be provided here.

Figure 30K:
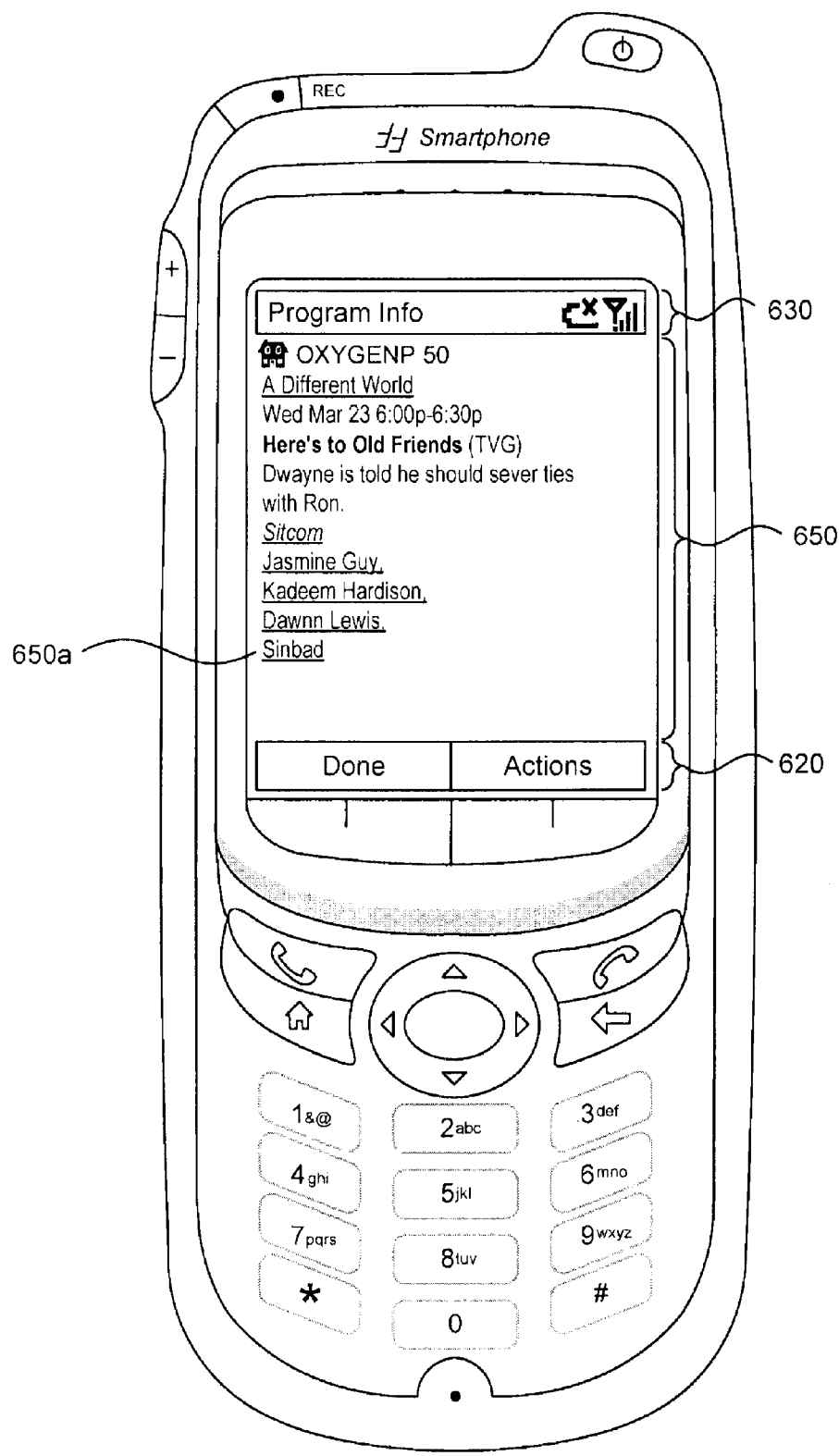
Figure 30L:
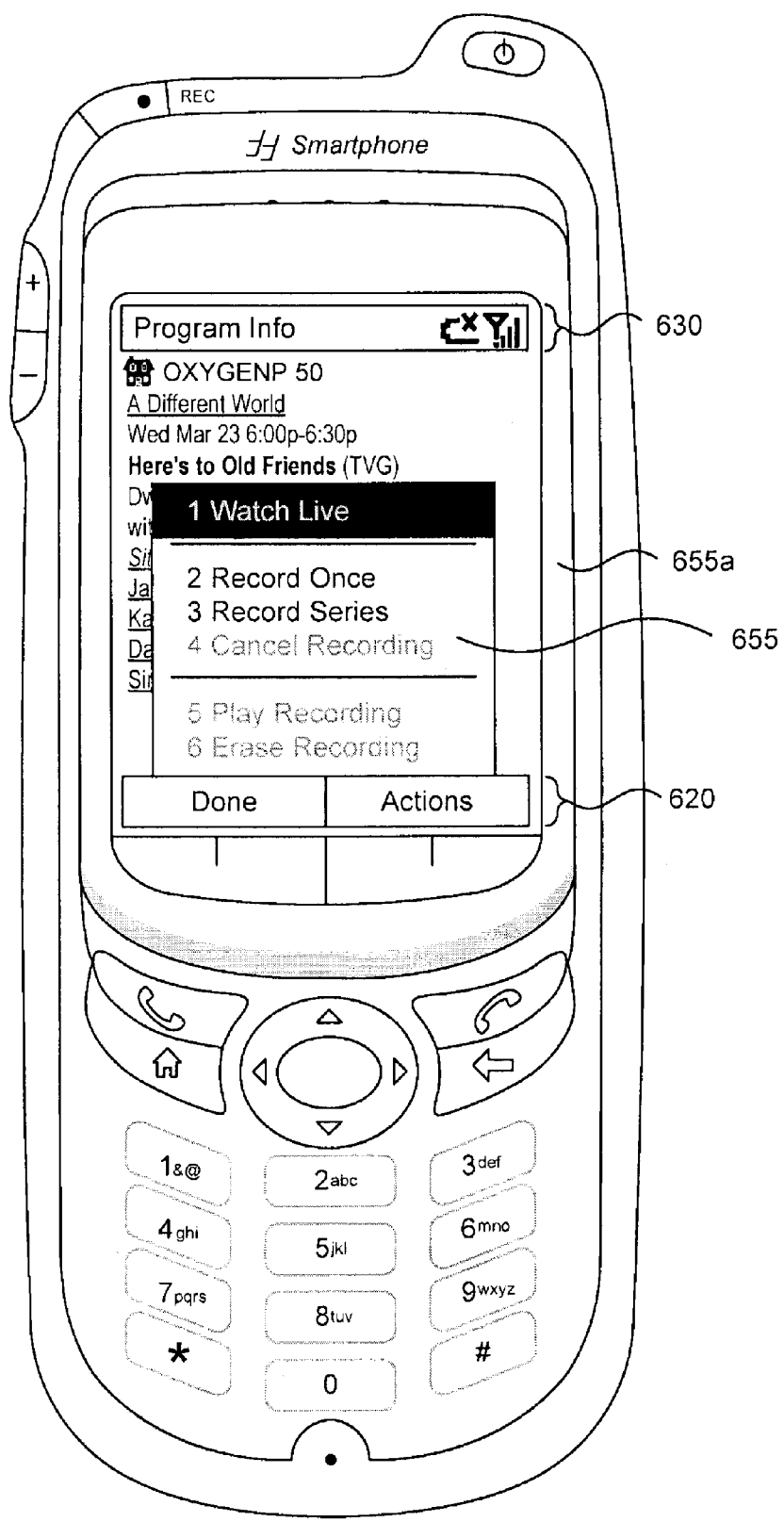

As previously noted, a particular television program may be selected in various ways, such as by searching for shows, browsing channels, and browsing at a specified date and time. FIG. 30K illustrates example program information 650 that may be displayed for a particular program that is selected by the user, with the current status area modified to indicate that "Program Info" functionality is being provided, and the controls 620 are modified to allow the user to indicate that they are "Done" or to indicate that one or one or more additional actions may be taken with regard to the current program (e.g., to record the program, cause the program to be currently presented on the cellphone or a specified other output device, etc.). In addition, in this example the program information includes additional user-selectable controls, such as for the user to select control "Sinbad" 650a to in some embodiments cause search criteria to be populated with that value (e.g., to find other programs with which Sinbad is affiliated), or to instead in other embodiments obtain additional information about the actor "Sinbad" (e.g., biographical information, information about other programs with which Sinbad is associated, etc.). FIG. 30L then displays a control menu 655 that may be displayed to the user to allow the user to take additional action with respect to the currently selected program 655a (e.g., in response to selection of the "Actions" control 620 in FIG. 30K), such as to record this showing, record multiple programs from this series, cancel a previously scheduled recording, play an existing recording, erase an existing recording, etc. Various additional details related to obtaining and manipulating information about programs are described previously, and in some embodiments some or all of those capabilities may similarly be provided here.

Figure 30M:
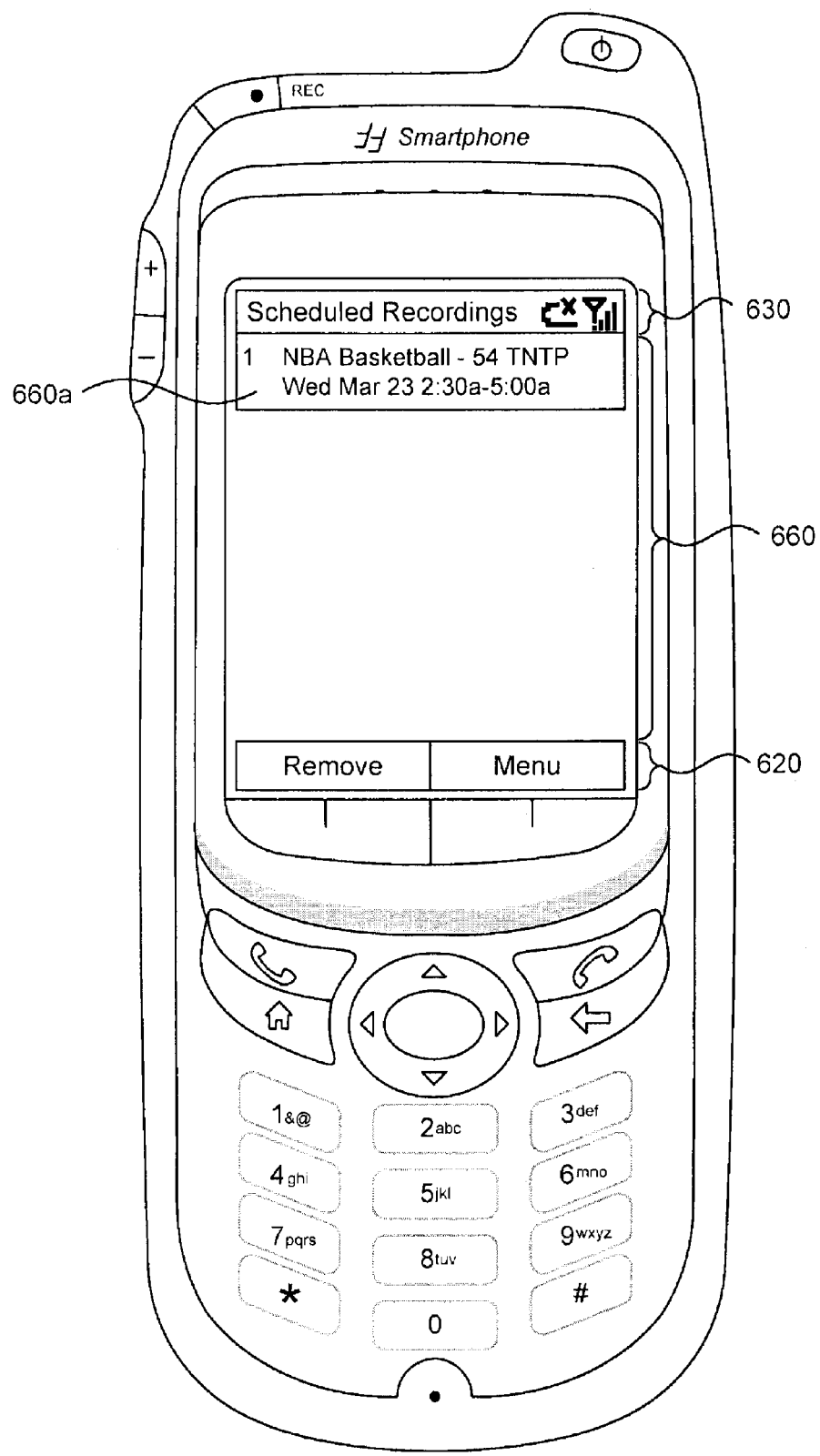
Figure 30N:
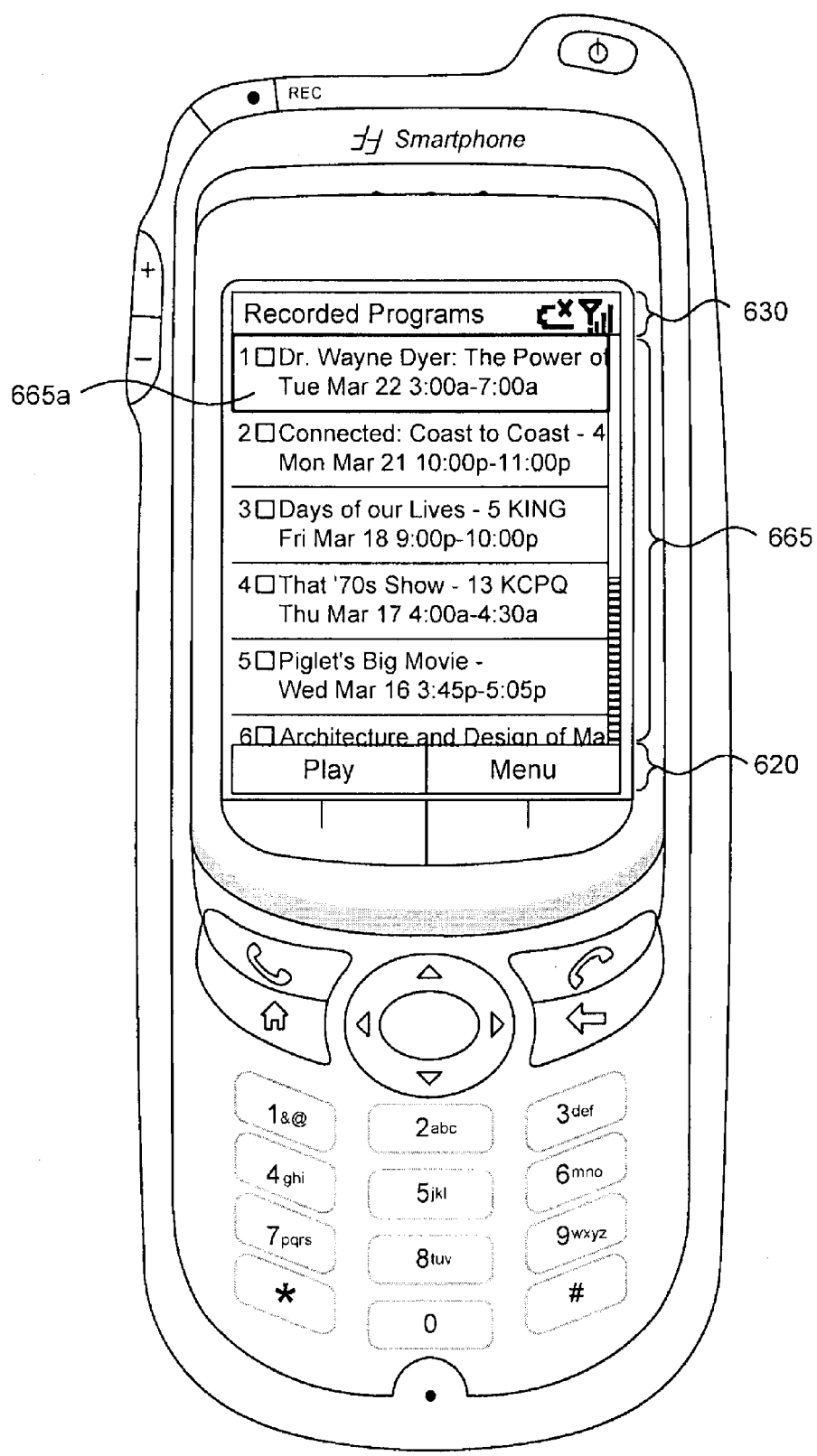

If the user instead selects the fourth option "Scheduled Recording" in the current selection area 625 of FIG. 30B, the display area of the cellphone changes to show information 660 regarding scheduled programs, as shown in FIG. 30M. The current status area is also modified to indicate that "Scheduled Recordings" functionality is being provided, and the controls 620 are modified to allow the user to indicate to "Remove" a scheduled recording, such as currently selected scheduled recording 660a. Alternatively, if the user instead selects the fifth option "Recorded Programs" in the current selection area 625 of FIG. 30B, the display area of the cellphone changes to show information 665 regarding previously recorded programs, as shown in FIG. 30N. The current status area is also modified to indicate that "Recorded Programs" functionality is being provided, and the controls 620 are modified to allow the user to indicate to "Play" a program, such as currently selected recorded program 665a. Various additional details related to recording programs and manipulating recorded programs are described previously, and in some embodiments some or all of those capabilities may similarly be provided here.

Figure 30O:
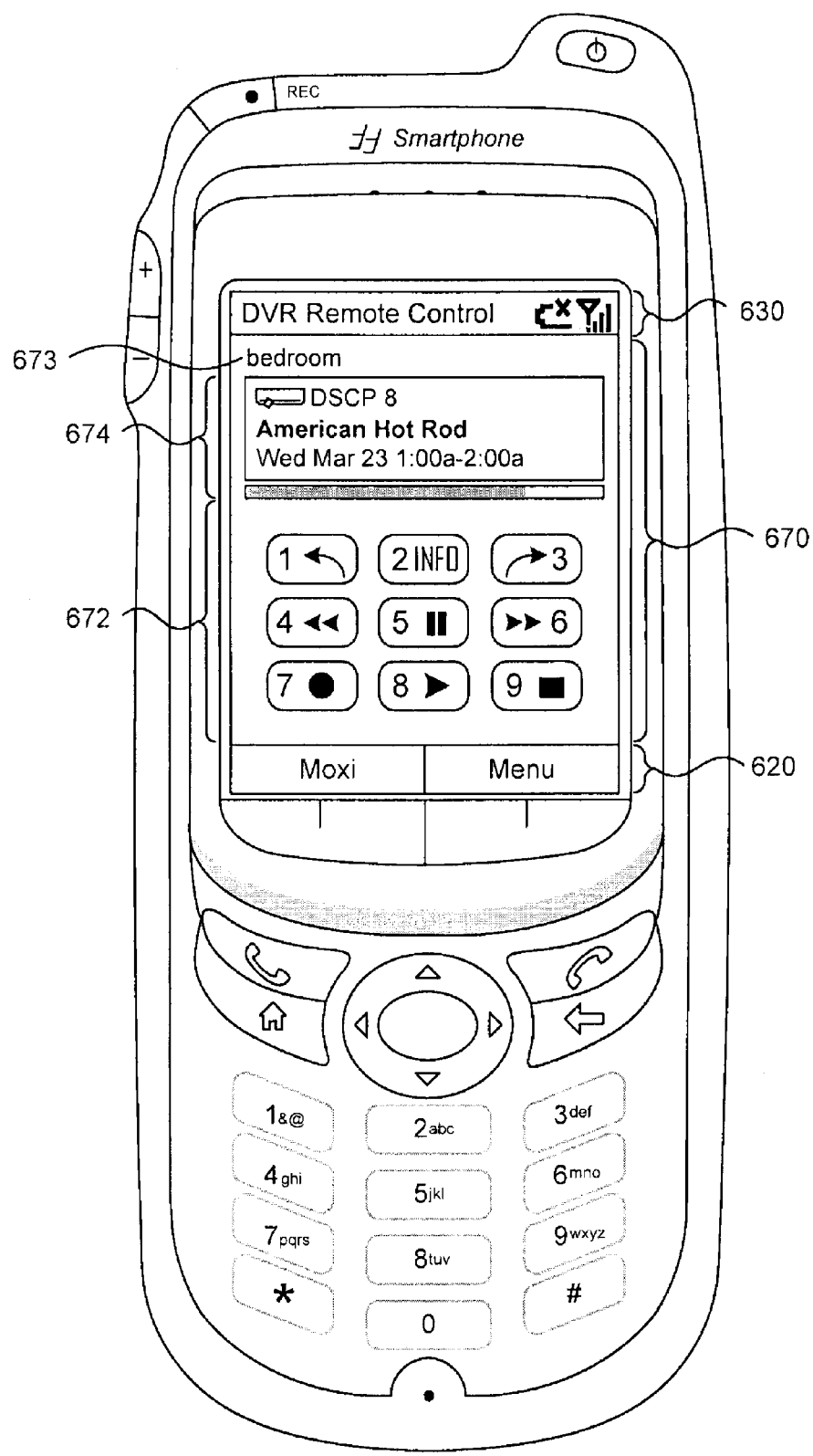
Figure 30P:
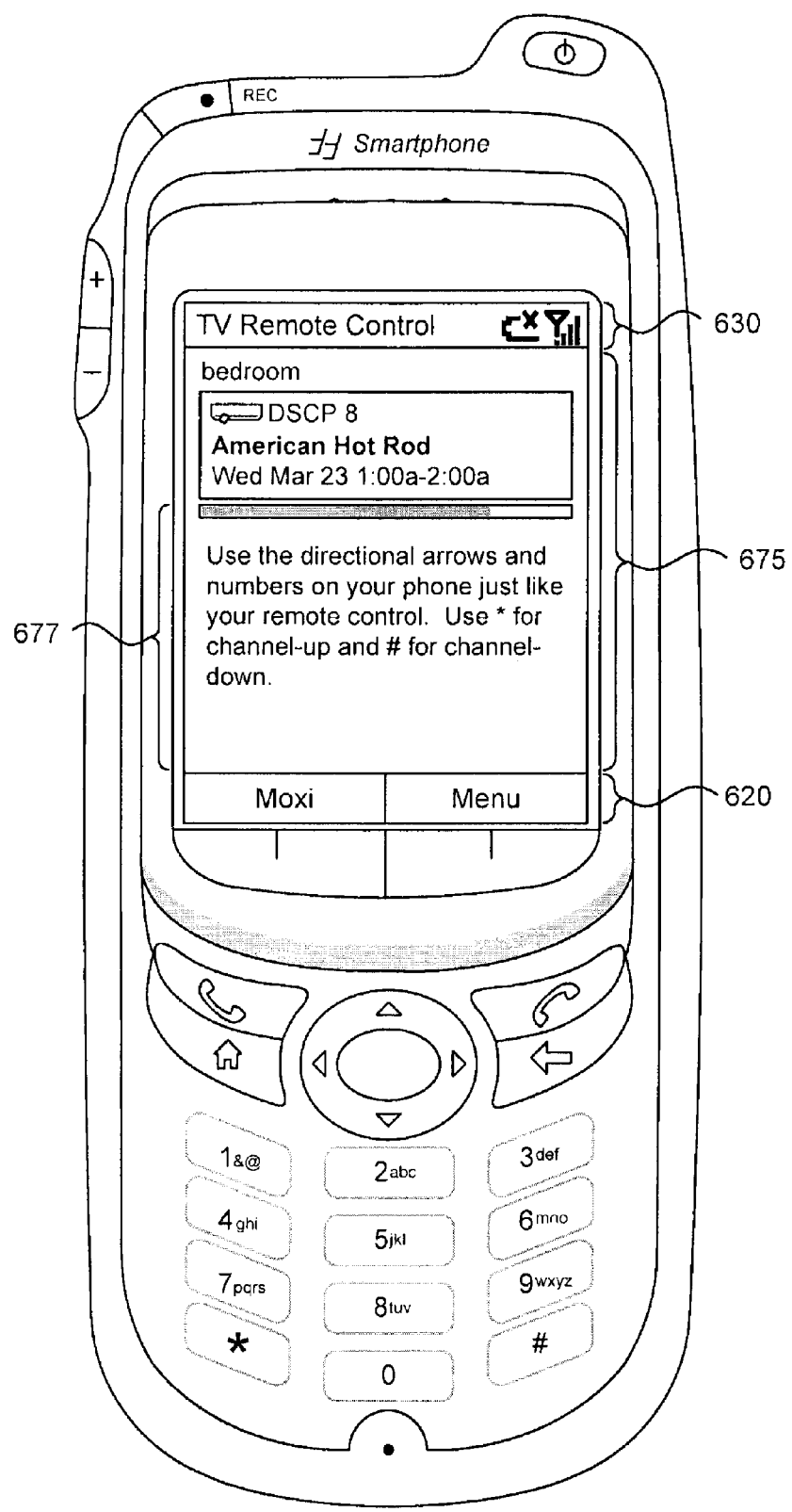

If the user instead selects the sixth option "DVR Remote Control" or the seventh option "TV Remote Control" in the current selection area 625 of FIG. 30B, the display area of the cellphone changes to show information 670 of FIG. 30O or information 675 of FIG. 30P, respectively, and the current status areas and controls 620 are modified accordingly. The information 670 of FIG. 30O allows the user to specify various controls 672 to control an indicated DVR 673 (e.g., that is presenting content on an associated television device), and further provides information 674 regarding current content being presented by the DVR. Similarly, the information 675 of FIG. 30P allows the user to specify various controls to control a television device in a manner akin to a remote control, such as based on instructions 677 displayed to the user to use corresponding phone controls. Various additional details related to providing remote control functionality are described previously, and in some embodiments some or all of those capabilities may similarly be provided here.

Figure 30Q:
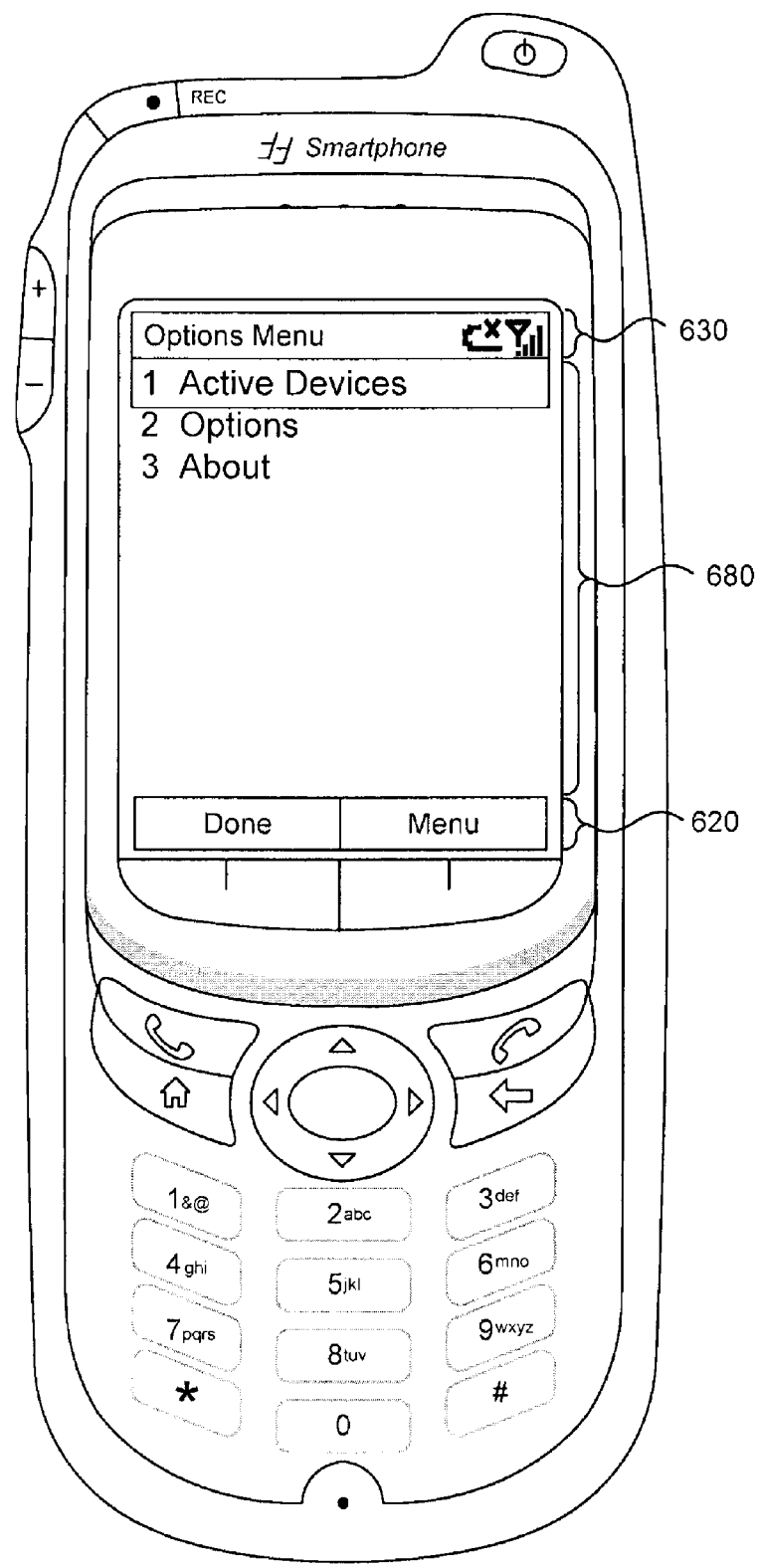
Figure 30R:
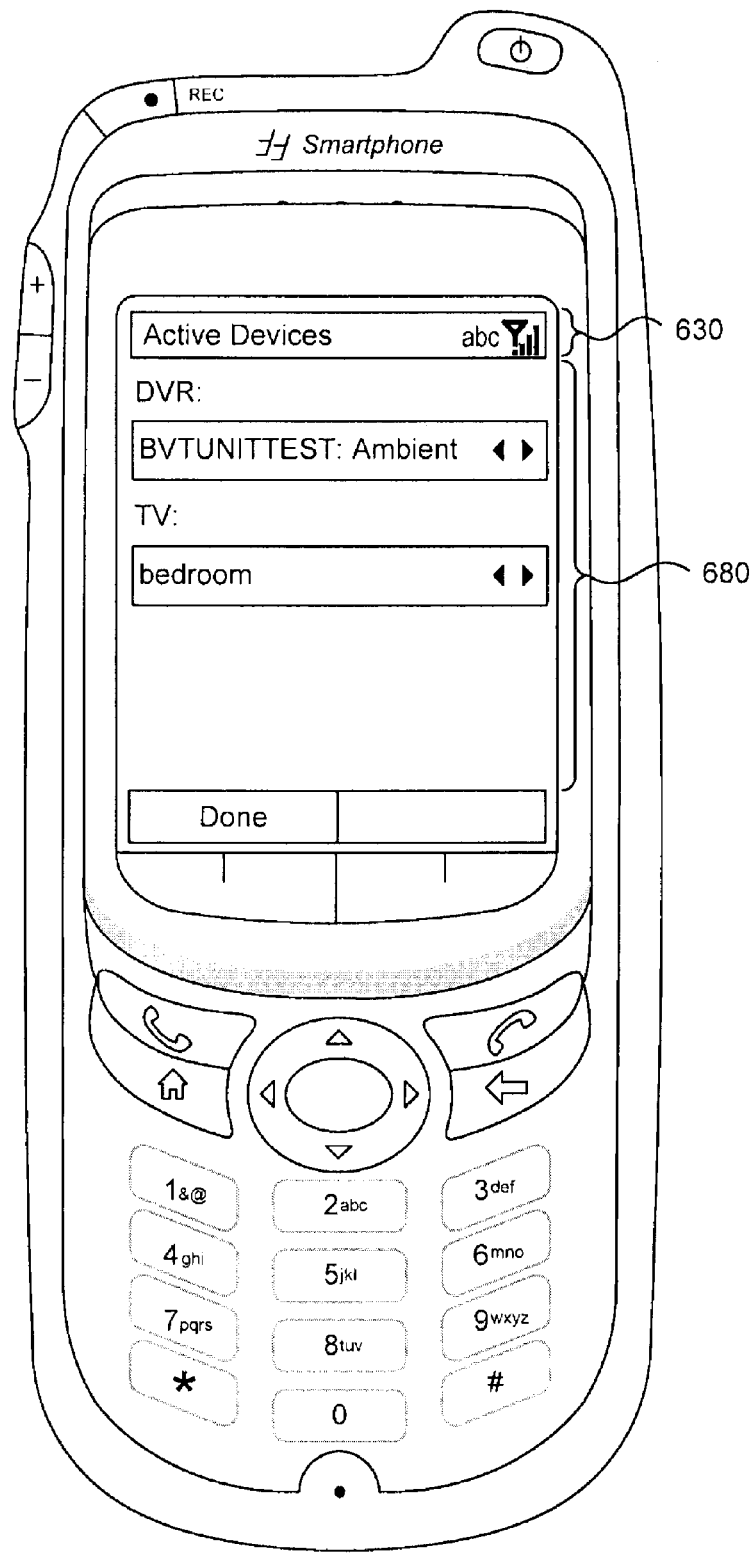
Figure 30S:
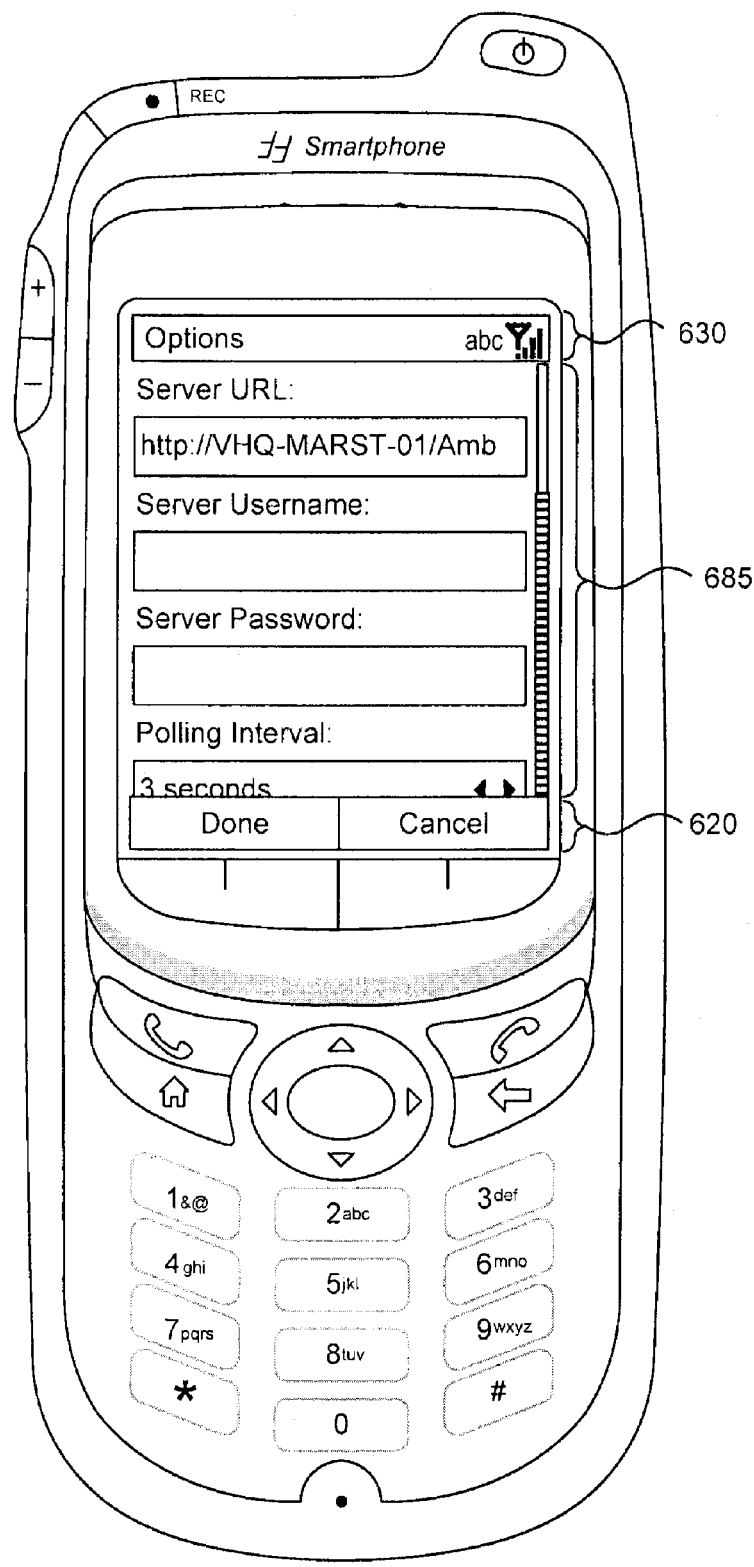

If the user instead selects the eighth option "Control Options" in the current selection area 625 of FIG. 30B, the display area of the cellphone changes to show information 680 of FIG. 30Q to show a list of options. If the user selects the first option "Active-Devices", corresponding functionality is provided-to-the-user to select one or more active devices being controlled or for which information is presented when using other options, as illustrated in FIG. 30R. If the user selects the second option "Options", corresponding functionality is provided to the user to select one or more of various other types of options, as illustrated in information 685 of FIG. 30S. Various additional details related to other types of configuration options are described previously, and in some embodiments some or all of those capabilities may similarly be provided here.

In addition, while some capabilities have been illustrated via the GUI and associated controls for the cellphone, a variety of other types of functionality have been previously discussed and may be provided via such a GUI in a similar manner.

Thus, as discussed below, the previously described example GUI of an embodiment of the CM system provides a variety of types of content information and content manipulation functionality. The following is a summary of the capabilities of an example embodiment of the GUI, which in this example embodiment provides various types of information and functionality for television-related content.

A. The View Control Area
  a. Available Views For TV Programming Content
    Guide (provides a guide-based experience with the channels listed at left and time on the horizontal axis)
    Icon (provides an icon-based view that displays as many Channel Icons as possible for quick visual recognition and selection)
    Channel (provides a look ahead for a selected channel, and maintains the "time a head" state while moving across channels)
    List (as a grouped, ordered list, and does not use the Navigation/Timebar as it displays information from the entire 2 week period, and not just at a specific point in time)
  When switching between views, typically maintain any filter or search criteria.
  b. Filters
  May allow a filter to be applied to any view of TV Programming
    May provide some default filters, such as to associate a first color with Sports and another with Movies
      May allow a user to associate or disassociate a highlight color with a default filter
    Create, edit or delete a number (e.g., up to 20) of custom filters, such as based on the following attributes
    Example metadata attributes for use as types of criteria:
      Keyword
      Title
      Cast/Crew
      Genre
      Channel (Name or Number)

Star Rating
MPAA or TV Rating
First run
HDTV
Audio
  CC
  DVS
  SAP/ESP
  Surround sound
Previously recorded (On disk, Watched, deleted)
  Pay Per View
  On Demand
c. Quick Search
May provide a Quick Search capability that allows searches on basic criteria
Example criteria:
  Keyword
  Cast/Crew
  Genre
  Hide Repeats
  HDTV
    Pay Per View
    On Demand
If a filter or previous search is applied when the user invokes the Quick Search interface, may auto-populate the fields with any attributes from the filter that match the fields available in the Quick Search.
If an applied filter contains attributes that are not covered by the Quick Search, such as MPAA rating, then when the Quick Search is populated, they are not included. Likewise, if the user changes the criteria (by adding, editing, or removing attributes in the Quick Search interface) and then saves this group of criteria as a new Filter, it will only include Quick Search fields.
Save search criteria as a custom filter
d. Advanced Search
May provide an Advanced search that allows searches on any Criteria
Example criteria:
  Keyword
  Title
  Cast/Crew
  Genre
  Channel (Name or Number)
  Star Rating
  MPAA or TV Rating
  Hide repeats
  HDTV
  Audio
    CC
    DVS
    SAP/ESP
    Surround sound
  Previously recorded (On disk, Watched, deleted)
    Pay Per View
    On Demand
Allow search criteria to be saved as a custom filter
If a filter or previous search is applied when the user invokes the Advanced Search interface, may auto-populate the fields with any attributes from the filter that match the fields available in the Quick Search.
e. Search History
May provide a way to view past searches.
May provide a way to select a past search and to search using those search criteria.
May allow only one search to be selectable at a time.
Double click on a past search to run the selected search.
Press the "Apply Button" to run the selected search.
Press the "Save Button" to save the selected search as a custom filter
Press the "Clear Button" to display the complete dataset
Press the "Close" button to close the search interface and return to the complete dataset
f. First Timebar
May provide a way to navigate through time (For Guide, Icon, and Channel Views), such as to:
  Jump to a day
  Jump to a time
  Jump to the current date and time
  Change the displayed time scale between hours and days
  Visually present filter or search results over time (e.g., for highlighting recordings in the Scheduled Recordings area, or for photos)
  Visually present two weeks of program data.
  Enable navigation between a ½ hour block of programming that is "on now" and the end of two weeks of program data.
  Visually indicate where "on now" is in the context of two weeks of program data.
  Timebar UI Element behavior:
    Keep the date/time indicator (thumb) on the same date and time (i.e. the thumb moves with the selected date)
    The date/time indicator (thumb) actually disappears out of the visible bounds of the timebar—to preserve the selected date and time—since the selected date time is out of the visible bounds.
g. Other:
  if adding "on now" when the user is viewing the Guide, Channel, or Icon view, snapping back to "On Now" is appropriate and desirable.
2. The Scheduled Recordings Tab
The Scheduled Recordings Tab offers functionality similar to other tabs, except that it is filtered to only show those programs that are scheduled to record.
3. The Recorded Content Tab
The Recorded Content Tab is different in that it may only have a modified List view, although filtering and searching may remain the same.
B. The Detail Area
  1. Capabilities
  Display detailed information about a selected show, including (but not limited to) the title, description, rating information, and channel information.
  Display and enable actions that are appropriate for the state of a selected show.
  Use criteria of the selected show to find other shows with the same criteria
    Indicate which fields can be used
    Optionally allow only fields and values that are available in the Quick Search to be used
    Populate the Quick Search with the new criteria
    Display the Quick Search (if it is not already displayed)
    Replace all previous criteria with the new criteria
    Give focus to the Apply action but do not apply the search yet a. Data Elements
Below are examples of data fields.

| | |
|---|---|
| Channel Number | Station Icon/Logo |
| Callsign | Affiliate (if no affiliate, then Channel/Network name) |
| Title: SubTitle StarRating (ReleaseYear) EpisodeTitle: Description (IsRepeat) Actors (4 max), Director, CastCrew (1) AirTime - EndTime (Duration) Genre(s), SubGenre(s) MPAARating/ParentalRating/ExpandedParentalRating/ExpandedRating CountyOrigin IsStereo, IsJoinedInProgress, IsCableInTheClassroom, IsSap, IsEnhanced, IsThreeD, IsLetterbox, IsHdtv, IsDolby, IsDvs, IsClosedCaptioned, IsSubtitled IsRecorded/IsToBeRecorded | [action] [action] | b. Buttons & Actions
Below are examples of states of a program and buttons that are applicable for each state.

| Action | Previously Recorded | On Now, Not Recording | On Now, Recording | Future, Unscheduled | Future, Scheduled Program | Future, Scheduled as Series |
|---|---|---|---|---|---|---|
| Watch | | ✓ | ✓ | | | |
| Play | ✓ | | | | | |
| Record Once | | ✓ | | ✓ | | |
| Record Series | | ✓ | | ✓ | ✓ | |
| Cancel Recording | | | ✓ | | ✓ | ✓ |
| Delete | ✓ | | | | | |

C. The View Area
  1. Capabilities
  Can List Programs
  Over Time
    At a given date/time
    In a date/time range
  In a specific state
  With specific criteria
    That match search or filter criteria
  Can Differentiate between programs
  Highlight based on criteria (filter)
  Indicate state
    Recorded
    On Now (not recording)
    Currently recording
    In the future
    Scheduled to record (single/series)
  Denote selection
    Focus
    Selection
  Can Act on program
  Get more information (e.g., from a third-party)
  Watch/Play
  Schedule to Record
  Can Provide different views of programs
  Guide—programs on channels over time
  Icon—scan icons visually
  Channel—looking forward on a channel
  List—list/sort/group
  Can Change between Views
  Can Adjust the granularity of information
  Small—channel and title
  Medium—more info
  Large—detailed
  Can Associate a level of granularity on a per view basis
  2. Views
There are four views. The first three, Guide, Icon, and Channel, are dependant on a specific point in time and use that as a starting point. The List view is a list of programs that can be sorted and grouped, and is not dependant on a specific time—rather it lists all the live and upcoming programs. As a user transitions from one view to the next, the time in the first timebar remains constant (even when the user goes to and from the List View), as does the program in the detail area.
    a. Guide View
The guide view presents programs in the context of channel and time.
  If a filter or search is applied, only channels with programs that match the criteria in the viewable time range should display.
  Programs that are on a channel but do not meet the filter or search criteria should be de-saturated.
  If there are no programs in the viewable time range that match the criteria on any channel when a filter or search is applied, a message could be displayed to communicate this to prevent a blank screen from being shown.
    b. Icon View
The Icon view presents programs that are on at a specific (e.g., ½ hour) point in time. It allows users to recognize channels visually by their logos, and then to determine what program is associated with that channel.
  If a channel has more than one program on in the selected ½ hour, both programs may display.
  Only programs (and therefore channels) with a program on in the specific point of time will display.
  If there are no programs in the viewable time range that match the criteria when a filter or search is applied, a message could be displayed that communicates this.
    c. Channel View
The Channel view shows not only what programs are on at a specific time, but also what is coming up on a specific channel.
  The right hand column displays shows on the same channel as the selected program/channel in the left-hand column.
  The first show in the right hand column can be, by default, the show that's on right after the highlighted show in the left-hand column.
  When a filter or search is applied, only those channels for which there are results somewhere in the 2 weeks of program data may be listed.
  If, when a filter or search is applied, a channel with a result in the future doesn't have a program that matches the current date/time indicated in the time-bar, then it should still display the title of the program on at the indicated date/time, but it could be de-saturated.

When a filter or search is applied, the subset of channels could display even if the only programs that fit the criteria are chronologically before the place where the date/time indicator in the time-bar is.

d. List View

The List View allows users to quickly sort and group by a variety of criteria. It is not dependant on a specific time, and the First Timebar is not shown.

Default grouping can be by Title (ascending), and default sort can be chronological. If the user re-groups or re-sorts, the new sort/grouping may be maintained.

Users can ungroup the list, and regroup it.

User can select any column heading to group by that field. Each criteria has a default sort. The headings and default sorts are:
Channel Number—Program Name, Air Time
Channel Affiliate/Logo—Program Name, Air Time
Program Name—Air Time
Record Status (recording, scheduled, not scheduled)—Program Name, Air Time
Repeat—Program Name, Air Time
HDTV—Program Name, Air Time
Genre (ascending)—Program Name, Air Time
MPAA Rating—Program Name, Air Time
Star Rating—Program Name, Air Time
Air Time (ascending)—Program Name
Duration (ascending)—Program Name, Air Time User can change the secondary and subsequent sorts by Shift-clicking a column. Shift-clicking the column again will reverse the sort.

e. Changes to the List view for the Recordings Tab:
The "AIRS" column is replaced with "RECORDED ON"
The "REC" column is renamed "STATUS" so that it can show the icon for "scheduled to be deleted", but it will show a similar type of data
The default sort is by "RECORDED ON", and the increment will be the Day (e.g., Tues 3/20, Mon 3/19, etc.) in reverse chronological order, with the secondary sort (on the programs within a day group) of time (reverse chronological). Thus, the last thing recorded will be at the top of the first group.
A "VIEWED" column may also be provided.

3. Levels of Granularity

The Guide, Icon, and Channel views can be set to one of three size "resolutions". Small displays more individual listings, but the least amount of information about each. Large displays the most information about each, but displays fewer individual listings. It is preferable to show Episode Title for sports events in all resolutions.

| Data Element (included in Detail Area) | Guide | | | Icon | | | Channel (L Column) | | | Channel (R Column) | | |
|---|---|---|---|---|---|---|---|---|---|---|---|---|
| | S | M | L | S | M | L | S | M | L | S | M | L |
| Channel Number | ✓ | ✓ | ✓ | ✓ | ✓ | ✓ | ✓ | ✓ | ✓ | | | |
| Callsign | | ✓ | ✓ | | ✓ | ✓ | | ✓ | ✓ | | | |
| Station Icon/Logo | ✓ | ✓ | ✓ | ✓ | ✓ | ✓ | ✓ | ✓ | ✓ | | | |
| Affiliate (if no affiliate, then Channel/Network name) | | ✓ | ✓ | | ✓ | ✓ | | ✓ | ✓ | | | |
| IsRecorded/IsToBeRecorded | ✓ | ✓ | ✓ | ✓ | ✓ | ✓ | ✓ | ✓ | ✓ | ✓ | ✓ | ✓ |
| Title | ✓ | ✓ | ✓ | ✓ | ✓ | ✓ | ✓ | ✓ | ✓ | ✓ | ✓ | ✓ |
| SubTitle | | | ✓ | | | ✓ | | | ✓ | | | ✓ |
| StarRating | ✓ | ✓ | ✓ | ✓ | ✓ | ✓ | ✓ | ✓ | ✓ | ✓ | ✓ | ✓ |
| ReleaseYear | ✓ | ✓ | ✓ | ✓ | ✓ | ✓ | ✓ | ✓ | ✓ | ✓ | ✓ | ✓ |
| EpisodeTitle | | ✓ | ✓ | | ✓ | ✓ | | ✓ | ✓ | | ✓ | ✓ |
| Description | | | | | | | | | | | | |
| IsRepeat | | | | | | | | | | | | |
| Actors (4 max) | | | | | | | | | | | | |
| Director | | | | | | | | | | | | |
| Crew (1) | | | | | | | | | | | | |
| AirTime | | | | ✓ | ✓ | ✓ | ✓ | ✓ | ✓ | ✓ | ✓ | ✓ |
| EndTime | | | | | ✓ | ✓ | ✓ | ✓ | ✓ | | | |
| Duration | | | | | | | | | | | | |
| Genre (s) | | | | | | | | | | | | |
| MPAARating/ParentalRating | | | ✓ | | | ✓ | | | ✓ | | | ✓ |
| ExpandedParentalRating/ ExpandedRating | | | | | | | | | | | | |
| CountryOrigin | | | | | | | | | | | | |
| IsStereo | | | | | | | | | | | | |
| IsJoinedInProgress | | | | | | | | | | | | |
| IsCableInTheClassroom | | | | | | | | | | | | |
| IsSap | | | | | | | | | | | | |
| IsEnhanced | | | | | | | | | | | | |
| IsThreeD | | | | | | | | | | | | |
| IsLetterbox | | | | | | | | | | | | |
| IsHdtv | | | ✓ | | | ✓ | | | ✓ | | | ✓ |
| IsDolby | | | | | | | | | | | | |
| IsDvs | | | | | | | | | | | | |
| IsClosedCaptioned | | | ✓ | | | ✓ | | | ✓ | | | ✓ |
| IsSubtitled | | | | | | | | | | | | |

D. Sidebar Control Area
   1. Capabilities
Display Program Info
   Program on TV now
     (Tuned or Playback of a recorded program)
     (may be the program that corresponds to the current point in the buffer, as the live buffer can contain multiple programs)
     Title
     Channel
     Start time (or "presentation time") & Duration
Display the Buffer/Recording
   Buffer/Recording length
   Place in Buffer/Recording
     Time marker
   Current Transport Control
   Beginning/End of Buffer
Provide Remote Control Buttons
   Transport Controls
   D-pad
Status—List the following in chronological order (Channel, Title, Record Status & Start Time)
   Next three programs to be recorded
   Any programs that are currently recording
   Last three programs that were recorded
E. Input Devices
Left-click should select a program such that it would both have focus and be selected. Using the arrow keys would move the focus around (maintaining the previously made selection) and Enter would select it.

F. Table Of Functions

The following table of functions takes a top-down approach to the GUI. Starting at the top and working toward the bottom, this table lists the location on the GUI of various controls, names of the GUI element, and how they function.

| Location on GUI | Name of GUI element | Function |
| --- | --- | --- |
| Primary Navigation tabs | User interface appears for first time | When the GUI first appears, the default screen is Live TV, Guide View. |
| Primary Navigation tabs | TELEVISION tab | When the user clicks the TELEVISION tab, the default screen is Live TV, Guide View. |
| Secondary Navigation tabs | LIVE TV tab | When the user clicks the LIVE TV tab, the Guide View screen appears. |
| View Control area, on the Toolbar | Guide View button | Click the Guide View button to display a TV Guide-like grid of program bubbles. |
| View Control area, on the Toolbar | Guide View button drop-down menu | Click the arrow next to the Guide View button to display the menu. Menu selections are small, medium, or large. If you select Small, the program bubbles in the TV grid will show only the program title. By selecting Medium, the program bubbles expand to display information about the programs. By selecting Large, the program bubbles expand to display the maximum amount of information about the programs. |
| View Control area, on the Toolbar | Icon View button | Click the Icon View button to display a grid of channels by channel icon. |
| View Control area, on the Toolbar | Icon View button drop-down menu | Click the arrow next to the Icon View button to display the menu. Menu selections are small, medium, or large. If you select Small, the maximum number of channel icons will appear. By selecting Medium, fewer channel icons appear. However, the expanded channel icons display the name of the programs per channel. By selecting Large, the program bubbles expand to a size greater than medium. |
| View Control area, on the Toolbar | Channel View button | Click the Channel View button to display a list of programs by channel. On the right side is the Channel Paddle area which lists upcoming programs based on which channel is selected. Use the Channel Paddle buttons to scroll forward and backward in time. |
| View Control area, on the Toolbar | Channel View button drop-down menu | Click the arrow next to the Channel View button to display the menu. Menu selections are small, medium, or large. |
| View Control area, on the Toolbar | Browse button | Click the Browse button to display a list of channels. Each channel has an Expand button next to it that, when clicked, displays a list of upcoming programs. The First Timebar does not display when this view is active. |
| View Control area, on the | Filters drop-down menu | All is the default selection. See below for the other filters. |

-continued

| Location on GUI | Name of GUI element | Function |
|---|---|---|
| Toolbar | (see below) | |
| Filters drop-down menu | All (No Filter) | Click All to display all of the programs. |
| Filters drop-down menu | Movies | Click Movies to display programs that are categorized as movies. |
| Filters drop-down menu | Sports | Click Sports to display programs that are categorized as sports. |
| Filters drop-down menu | News | Click News to display programs that are categorized as news. |
| Filters drop-down menu | Music | Click Music to display programs that are categorized as music. |
| Filters drop-down menu | Kids | Click Kids to display programs that are categorized as child-oriented. |
| Filters drop-down menu | Custom Filters . . . | Click Custom Filters . . . to open the Filter Wizard. |
| View Control area, on the Toolbar | Manage Filters | Click Manage Filters to open the Filter Wizard. |
| View Control area, on the Toolbar, in the Search Control area | Find a Program button | Click Find a Program to open the Search Control area. |
| Search Control area | Quick Search tab | The Quick Search tab appears by default. To use Quick Search: In the Look for text box, type what you are looking for, for example, actor Tom Cruise. In the Genre text box, type a genre or select one from the drop-down menu. Click Apply. If any programs featuring Tom Cruise are on or upcoming, the listing will appear in the main content-area of the UI. List of Genres: Action Adults Only Adventure Animals Animated Anime Anthology Auto racing Basketball Biography Bus./financial Children Comedy Comedy-drama Computers Cooking Crime Crime drama Docudrama Documentary Drama Educational Entertainment Event . . . |
| Search Control area | Quick Search tab area buttons and boxes: | |
| Quick Search tab area buttons and boxes: | Hide Repeats box | Click the box next to Hide Repeats to block repeated programs from being displayed in the main content area. |
| Quick Search tab area buttons and boxes: | HDTV box | Click the box next to HDTV to include programs offered in HDTV. |
| Quick Search tab area buttons and boxes: | Apply button | Click Apply to display results in the main content area. |
| Quick Search tab area buttons and boxes: | Clear button | Click Clear to clear search criteria. |
| Quick Search tab area buttons and boxes: | Save button | Click Save to save search criteria. You will be prompted to name this as a new filter. |

| Location on GUI | Name of GUI element | Function |
|---|---|---|
| Quick Search tab area buttons and boxes: | Close button | Click Close to close the Search Control area. |
| Advanced Search boxes and buttons | Find all programs box, which contains multiple check boxes of search criteria rules. | Click one or many check boxes in the Find all programs: box. The selected search rule(s) will be added to the Search rules description: box. |
| Find all programs box in the Advanced Search tab | That belong to the <specific genres> genre | Click the That belong to the <specific genres> genre check box. The rule appears in the Search rules description box. Click <specific genres> in the Search rules description box to open the Genre Filter box. In the Genre Filter box, select one or many genres. Click the > arrow. Click OK. The genre(s) you selected become part of the search criteria. You can change the search criteria at any time by clicking the blue underlined text in the rule you want to change, then modifying the filter that opens. |
| Find all programs box in the Advanced Search tab | That feature <people> in the cast and crew | Click the That feature <people> in the cast and crew check box. The rule appears in the Search rules description box. Click <people> in the Search rules description box to open the Cast and Crew Filter box. In the Add new text box, type the name of the cast or crew member you want to search for. Click Add. Repeat steps three and four if you searching for more than one person. Click OK. Any names you add become part of the search criteria. You can change the search criteria at any time by clicking the blue underlined text in the rule you want to change, then modifying the filter that opens. |
| Find all programs box in the Advanced Search tab | That are rated <rating> | Click the That are rated <rating> check box. The rule appears in the Search rules description box. Click <rating> in the Search Rules description box to open the Parental Rating Filter box. In the Select all programs with a parental rating drop-down menu, select no higher than or no lower than. In the Movies drop-down menu, select G, PG, PG-13, R, or NC-17. In the Television drop-down menu, select TVY, TVY7, TVY7FV, TVG, TVPG, TV14, or TVMA. Click the check box next to Exclude unrated programs to prevent unrated programs from appearing in the guide. Click OK. The ratings you add become part of the search criteria. You can change the search criteria at any time by clicking the blue underlined text in the rule you want to change, then modifying the filter that opens. |
| | That have a <stars> star rating | Click the That have a <stars> star rating check box. The rule appears in the Search rules description box. Click <at least a 0.0> in the Search Rules description box to open the Star Rating Filter box. In the first All programs with a star rating drop-down menu, select equal to or at least. In the second All programs with a star rating drop-down menu, select 0 through 4. Click OK. The star rating you add becomes |

| Location on GUI | Name of GUI element | Function |
|---|---|---|
| | | part of the search criteria. You can change the search criteria at any time by clicking the blue underlined text in the rule you want to change, then modifying the filter that opens. |
| | Appearing on <channel> | Click the Appearing on <channel> check box. The rule appears in the Search rules description box. Click <channel> in the Search rules description box to open the Channel Filter box. In the Available Channels list, select one or more channels. Use Shift + click or CTRL + shift to select multiple channels. Click the > arrow to add channels to the Selected Channels list. Click OK. The channels you add become part of the search criteria. You can change the search criteria at any time by clicking the blue underlined text in the appropriate rule, then modifying the filter that opens. |
| | With <specific words> in the title | Click the With <specific words> in the title check box. The rule appears in the Search rules description box. Click <specific words> in the Search rules description box to open the Title Filter box. In the Add new text box, type the words or phrases you want to search for. Click Add. Repeat steps three and four if you searching for more than one term. Click OK. Any terms you add become part of the search criteria. You can change the search criteria at any time by clicking the blue underlined text in the rule you want to change, then modifying the filter that opens. |
| | With <specific words> in the description | Click the With <specific words> in the description check box. The rule appears in the Search rules description box. Click <specific words> in the Search rules description box to open the Description Filter box. In the Add new text box, type the words or phrases you want to search for. Click Add. Repeat steps three and four if you searching for more than one term. Click OK. Any terms you add become part of the search criteria. You can change the search criteria at any time by clicking the blue underlined text in the rule you want to change, then modifying the filter that opens. |
| | That are not repeats | Click the That are not repeats check box. The rule appears in the Search rules description box and becomes part of the search criteria. |
| | That are HDTV | Click the That are HDTV check box. The rule appears in the Search rules description box and becomes part of the search criteria. |
| | That have <audio-visual options> | Click the That have <audio-visual options> check box. The rule appears in the Search rules description box. Click <audio-visual options> in the Search rules description box to open the Audio-Video Filter box. Select Closed Captioned, DVS, SAP/ESP, Stereo, or Subtitled. Click OK. Any of the audio-visual options you add become part of the search criteria. You can change the search criteria at any time. Click the blue underlined text in the rule you want to change, then modify the filter that opens. |
| Advanced Search buttons | Apply button | Click Apply to display results in the main content area. |

-continued

| Location on GUI | Name of GUI element | Function |
|---|---|---|
| Advanced Search buttons | Clear button | Click Clear to clear search criteria. |
| Advanced Search buttons | Save button | Click Save to save search criteria. You will be prompted to name this as a new filter. |
| Advanced Search buttons | Close button | Click Close to close the Search Control area. |
| Search History tab boxes and buttons | Select a search and click Apply box | This box displays all of the prior search criteria. |
| Search History tab boxes and buttons | Apply button | Clicking Apply performs the selected search. |
| Search History tab boxes and buttons | Clear button | Clears search criteria. |
| Search History tab boxes and buttons | Save button | Clicking Save opens Save as Filter box. |
| Search History tab boxes and buttons | Close button | Click Close to close the Search Control area. |
| First Timebar | Now button | Click the Now button to display programs playing now. |
| First Timebar | Hour View button | Click the Hour View button to display the timebar in hour increments. |
| First Timebar | Day View button | Click the Day View button to display the timebar in day increments. |
| First Timebar | Scroll left arrow | Click the left scroll arrow to scroll back in time. The stopping point is the current time in this example embodiment. |
| First Timebar | Thumb | Click and hold the thumb to move back and forward in time. |
| First Timebar | Time span | Viewed either in hour or day increments. |
| First Timebar | Scroll right arrow | Click the right scroll arrow to move forward in time. The stopping point is two weeks from the current time in this example embodiment. |
| Details area | Default is for this area to be expanded | |
| Details area | Watch Now button | |
| Details area | Record One Time button | |
| Details area | Record Series button | |
| Details area | Hide Details arrow | |
| Main content area | Program info bubble | Left-click to select, right-click to open drop-down menu that displays "Watch Now," "Record Once," "Record Series," "Alert," and "View Size" shortcuts. |
| Sidebar | On Now window | |
| Sidebar | Buffer | |
| Sidebar/ Transport Controls | Live button | |
| | TKR button device-specific button Navigation buttons Replay button Skip button Rewind button Play button Forward button Rec button Pause button Stop button Channel up/down Star * Menu button | |

-continued

| Location on GUI | Name of GUI element | Function |
|---|---|---|
| Sidebar/Recorder Status area | Currently Recording Upcoming Recording Recent Recordings | Shows the last three programs that were recorded, date of recording and length of program. |
| Sidebar | | Display Program Info<br>Program on TV now<br>(Tuned or Playback of a recorded program)<br>(typically is the program that corresponds to the current point in the buffer, as the live buffer can contain multiple programs)<br>Title<br>Channel<br>Start time & Duration<br>Display the Buffer/Recording<br>Buffer/Recording length<br>Place in Buffer/Recording<br>Time marker<br>Current Transport Control<br>Beginning/End of Buffer<br>Provide Remote Control Buttons<br>Transport Controls<br>D-pad<br>Status - List the following in chronological order<br>(Channel, Title, Record Status & Start Time)<br>Next three programs to be recorded<br>Any programs that are currently recording<br>Last three programs that were recorded |

G. Table of Functions for Mouse/Touchpad/Eraserhead

| Mouse/Touchpad/Eraserhead | Function | Notes |
|---|---|---|
| Mouse-overs | Display tool tips and/or shortcut key combos | |
| Left-Click | Left-click should select the program, so it would both have focus and be selected. Using the arrow keys would move the focus around (maintaining the previously made selection) and Enter would select it. | |

H. Table of Functions for Keyboard

| Key | Function | Notes |
|---|---|---|
| Tabbing Arrow Keys | Navigates from program bubble to program bubble. Using the arrow keys moves the focus around (maintaining the previously made selection). | |
| Enter | Enter selects the program that has the focus. | |
| Ctrl+ . . . | Used in shortcut key combos for view control buttons and to open find a program box. | |

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In addition, the described techniques are applicable to architectures other than a set-top box architecture or architectures based upon the MOXI™ system. For example, an equivalent system and applications can be developed for other DVRs and STBs. The methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.) able to receive and record such content.

In the description, numerous specific details have been given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments. Thus, it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method for a computing device to present information about television programs via a graphical user interface, the method comprising:

receiving metadata information for multiple television programs;

identifying a first distinct group of the multiple television programs for a graphical user interface such that received metadata information for the first distinct group of television programs will be included in the graphical user interface, the first distinct group including multiple television programs that satisfy a search request of television programs and that are identified based at least in part on a corresponding first category of television programs;

displaying to a user of the computing device a graphical window that includes the graphical user interface, the graphical user interface having a state based at least in part on the identified group, the displayed graphical user interface having:

multiple distinct display areas including a first display area and a second display area, such that metadata information for a first portion of the identified first distinct group of television programs is displayed in the first display area and metadata information for a selected television program is displayable in the second display area, and a timebar displayed concurrently with the first display area, such that metadata information for a second portion of the identified first distinct group of television programs is displayed on the timebar in the form of graphical indicators, wherein the graphical indicators represent future occurrences of television programs in the second portion of the identified first distinct group of television programs, wherein a graphical indicator is displayed on the timebar in reference to a time-related characteristic of an associated television program in the second portion of the identified first distinct group of television programs, and wherein the graphical indicator is selectable by the user to display metadata information for the associated television program in the first display area;

receiving an indication of a selection by the user of one of the first distinct group of television programs having metadata information displayed in the first display area, and updating the state of the displayed graphical user interface to reflect the selected television program, such that metadata information for the selected television program is displayed in the second display area, wherein the updating of the state of the graphical user interface to reflect the selected television program includes displaying distinct information about the selected television program in a coordinated manner in the multiple distinct display areas of the displayed graphical user interface in the displayed graphical window, wherein displaying the distinct information in a coordinated manner comprises displaying the distinct information in a visibly different manner than information that is not included in the distinct information;

identifying a second distinct group of the multiple television programs, the second distinct group including multiple television programs that are identified based at least in part on a corresponding second category of television programs, wherein the second category is different from the first category, and wherein the second group does not include the selected television program;

automatically maintaining the state of the graphical user interface so as to reflect the selected television program by updating the displayed graphical user interface to include metadata information for a first portion of the identified second distinct group of television programs in the first display area, while maintaining display of the metadata information for the selected television program in the second display area until a new television program is selected by the user, wherein the maintaining of the state of the graphical user interface so as to reflect the selected television program includes maintaining coordination of information displayed in the multiple distinct display areas; and when the displayed graphical user interface is updated, automatically updating the timebar so as to display metadata information for a second portion of the identified second distinct group of television programs in the form of graphical indicators, wherein a graphical indicator is displayed on the timebar in reference to a time-related characteristic of an associated television program in the second portion of the identified second distinct group of television programs, and wherein the graphical indicator is selectable by the user to display metadata information for the associated television program in the first display area, so that a state of the graphical user interface that is based at least in part on a selected television program is maintained when information in the graphical user interface is updated.

2. The method of claim 1 wherein the multiple television programs include programs on multiple channels with multiple scheduled start times, wherein the received metadata information includes electronic programming guide information for each of the multiple television programs, wherein the identified first and second distinct groups of television programs include multiple television programs on the multiple channels whose start times are within a period of time, wherein the first display area includes indications of multiple channels and one or more indications of the period of time, wherein the metadata information for the television programs in the identified first and second distinct groups is displayed in a grid format within the first display area and includes detail information for each of the television programs in the identified group, wherein the updating of the state of the displayed graphical user interface to reflect the selected television program includes displaying in a coordinated manner in one or more other display areas of the displayed graphical user interface additional detail information for the selected television program and one or more other indications of the selected television program, and wherein the maintaining of the state of the graphical user interface so as to reflect the selected television program includes maintaining coordination of information displayed in the multiple distinct display areas regarding the selected television program.

3. The method of claim 1 wherein the updating of the displayed graphical user interface to include metadata information for the identified second distinct group of television programs includes modifying the identified second distinct group to include the selected television program, so that the updated displayed graphical user interface includes metadata information for the selected television program.

4. The method of claim 1 wherein the updating of the displayed graphical user interface to include metadata information for the identified second distinct group of television programs includes providing in the displayed graphical user interface a user-selectable control that when selected updates the displayed graphical user interface to include metadata information for the selected television program.

5. The method of claim 1 wherein the identifying of the first distinct group of the multiple television programs for the graphical user interface is based at least in part on an amount of information capable of being displayed in a display area of the displayed graphical user interface using an initial information size and/or based at least in part on an initial size of the display area of the displayed graphical user interface, and including identifying the second distinct group of the multiple television programs based at least in part on a change in the information size at which information will be displayed in the display area of the displayed graphical user interface and/or based at least in part on a change in the size of the display area of the displayed graphical user interface.

6. The method of claim 1 wherein the indicated selection by the user of the one of the first distinct group of television programs includes an indication from the user to use metadata information for the selected television program to assist in identifying one or more other related pieces of multimedia content, wherein the updating of the state of the displayed graphical user interface to reflect the selected television program includes displaying metadata information for the selected television program to the user for possible use as specified criteria to be used in the identifying of the other related pieces of multimedia content, and wherein the method further comprises:

receiving one or more indications of one or more selections by the user of multiple attributes of at least one television program for use as part of specified criteria to be used in the identifying of the other related pieces of multimedia content.

7. The method of claim 6 wherein the receiving of the indications of the selections by the user of the multiple attributes of the at least one television program for use as part of the specified criteria includes receiving a succession of multiple selections by the user that each indicate at least one attribute of an indicated television program for use as part of the specified criteria, at least one indicated television program being the selected television program, wherein the specified criteria is for use in identifying other television programs that each have the multiple attributes of the specified criteria, and wherein the identifying of the one or more other related pieces of multimedia content includes performing a search for the other television programs.

8. A method for a computing device to present information about television programs via a graphical user interface, the method comprising:

receiving metadata information for multiple television programs;

identifying a distinct group of the television programs for a graphical user interface such that received metadata information for those television programs will be included in the graphical user interface, the distinct group including multiple television programs that satisfy a search request of television programs and that are identified based at least in part on the television programs each having an associated genre or category that corresponds to an initially selected genre or category;

displaying to a user of the computing device a graphical window that includes the graphical user interface, the graphical user interface having a state based at least in part on the identified distinct group, the displayed graphical user interface having:

multiple distinct display areas including a first display area and a second display area, such that metadata information for the television programs in a first portion of the identified distinct group is displayed in the first display area and metadata information for a selected television program is displayable in the second display area, and a time scale displayed concurrently with the first display area, such that metadata information for a second portion of the identified distinct group is displayed on the time scale in the form of graphical indicators, wherein the graphical indicators represent future occurrences of television programs in the second portion of the identified distinct group, wherein a graphical indicator is displayed on the time scale in reference to a time-related characteristic of an associated television program in the second portion of the identified distinct group, and wherein the graphical indicator is selectable by the user to display metadata information for the associated television program in the first display area;

receiving an indication from the user via the graphical user interface of a selection of a television program of the identified group;

in response to the received indication of the selected television program, displaying metadata information for the selected television program in the second display area;

receiving one or more indications from the user via the graphical user interface of a new genre or category, identifying a new distinct group of the television programs for the graphical user interface, the new distinct group including multiple television programs that are identified based at least in part on the television programs each having an associated genre or category that corresponds to the new genre or category, and updating the state of the displayed graphical user interface to reflect the new distinct group of television programs, the updating including displaying metadata information for the new distinct group of television programs in the first display area;

automatically maintaining the state of the graphical user interface so as to reflect the new distinct group of television programs by, when the graphical user interface is to be updated such that at least some new metadata information is to be displayed in the graphical user interface, automatically performing the updating of the displayed graphical user interface in such a manner as to display the new metadata information in the first display area, to include one or more indications of a first portion of the new distinct group of television programs, and to maintain display of the metadata information for the selected television program in the second display area until a new television program is selected by the user; and when the graphical user interface is updated, automatically updating the time scale so as to display metadata information for a second portion of the new distinct group of television programs in the form of graphical indicators,
wherein a graphical indicator is displayed on the time scale in reference to a time-related characteristic of an associated television program in the second portion of new distinct group of television programs, and
wherein the graphical indicator is selectable by the user to display metadata information for the associated television program in the first display area, so that a state of the graphical user interface that is based at least in part on a selected group of television programs is maintained when information in the graphical user interface is updated.

9. The method of claim 8 wherein the received metadata information includes electronic programming guide information for each of the television programs,
wherein the new group of the television programs includes television programs on multiple channels having start times within a period of time,
wherein the first display area includes indications of multiple channels and one or more indications of the period of time,
wherein metadata information for the television programs in the new distinct group is displayed in the displayed graphical user interface in a grid format within the view display area and includes detail information for each of the television programs in the new distinct group,
wherein the updating of the state of the displayed graphical user interface to reflect the new distinct group includes displaying in a coordinated manner in one or more other display areas of the displayed graphical user interface additional detail information for one or more of the television programs of the new distinct group, and
wherein the maintaining of the state of the graphical user interface so as to reflect the new distinct group includes maintaining coordination of information displayed in the multiple distinct display areas.

10. The method of claim 8 wherein the updating of the state of the graphical user interface to reflect the new distinct group includes displaying distinct information about one or more of the television programs of the new distinct group in a coordinated manner in the multiple distinct display areas of the displayed graphical user interface in the displayed graphical window, and
wherein the maintaining of the state of the graphical user interface so as to reflect the new distinct group includes maintaining coordination of information displayed in the multiple distinct display areas.

11. The method of claim 8 wherein the maintaining of the state of the graphical user interface so as to reflect the new distinct group includes maintaining one or more of color coding and highlighting used to indicate at least portions of the new distinct group.

12. The method of claim 8 wherein the maintaining of the state of the graphical user interface when the graphical user interface is to be updated is based at least in part on modifying a type of view of metadata information for at least some of the television programs of the new distinct group.

13. A method for a computing device to present information about television programs via a graphical user interface, the method comprising:
receiving metadata information for multiple television programs;
identifying a group of the television programs for a graphical user interface such that received metadata information for those television programs will be included in the graphical user interface, the group including multiple television programs that satisfy a search request of television programs and that are identified based at least in part on the television programs each having an associated category that corresponds to an initially selected category and based at least in part on the television programs each having an associated time that corresponds to an initial currently selected time;
displaying to a user of the computing device a graphical window that includes the graphical user interface, the displayed graphical user interface having a state based at least in part on the currently selected time and based at least in part on the identified group, the displayed graphical user interface having:
multiple distinct display areas including a first display area and a second display area, the first display area displaying metadata information for the television programs in the identified group, and the second display area to display metadata information for a selected television program,
a first timebar associated with the first display area, wherein the first timebar corresponds to the initial currently selected time, and
a second timebar displayed simultaneously with the first display area that corresponds to a time period outside of the initial currently selected time, wherein the second timebar includes one or more graphical indicators representing future occurrences of television programs having an associated category that corresponds to the initially selected category and an associated time that corresponds to the time period outside of the initial currently selected time,
wherein a graphical indicator is displayed on the timebar in reference to a time-related characteristic of an associated television program, and
wherein the graphical indicator is selectable by the user to display metadata information for the associated television program in the first display area;
receiving an indication of a selection by the user of a television program of the identified group;
in response to the received indication of the selected television program, displaying metadata information for the selected television program in the second display area;
receiving an indication of a selection by the user of a new currently selected time, and updating the state of the displayed graphical user interface to reflect the new currently selected time, the updating including displaying in the first display area metadata information for television programs that are identified based at least in part on the television programs each having an associated category that corresponds to the initially selected category and based at least in part on the television programs each having an associated time that corresponds to the new currently selected time;

automatically maintaining the state of the graphical user interface so as to reflect the new currently selected time by, when the graphical user interface is to be updated such that at least some new metadata information is to be displayed in the graphical user interface, automatically performing the updating of the displayed graphical user interface in such a manner as to display the new metadata information in the first display area in a manner based at least in part on the new currently selected time and based at least in part on the initially selected category, while maintaining display of the metadata information for the selected television program in the second display area until a new television program is selected by the user; and when the graphical user interface is updated,
  automatically updating the first timebar to correspond to the new currently selected time, and
  automatically updating the second timebar so as to display one or more graphical indicators corresponding to television programs having an associated category that corresponds to the initially selected category and an associated time that corresponds to a time period outside of the new currently selected time,
    wherein a graphical indicator is displayed on the timebar in reference to a time-related characteristic of an associated television program, and
    wherein the graphical indicator is selectable by the user to display metadata information for the associated television program in the first display area,
so that a state of the graphical user interface that is based at least in part on a currently selected time and based at least in part on an initially selected category is maintained when information in the graphical user interface is updated.

14. The method of claim 13 wherein the identifying of the group of the television programs for the graphical user interface is based at least in part on selecting television programs associated with a time period for use with the graphical user interface that corresponds to the initial currently selected time, and wherein the updating of the state of the displayed graphical user interface to reflect the new currently selected time includes identifying a new group of television programs for the graphical user interface based at least in part on a change in the time period for use with the graphical user interface.

15. The method of claim 14 wherein the multiple television programs include programs on multiple channels with multiple scheduled start times,
  wherein the received metadata information includes electronic programming guide information for each of the television programs,
  wherein the identified group of the television programs includes multiple television programs on the multiple channels whose start times are within a period of time that is based on the initial currently selected time,
  wherein the first display area includes indications of multiple channels and one or more indications of the period of time,
  wherein the metadata information for the television programs in the identified group that is included in the displayed graphical user interface is displayed in a grid format within the first display area and includes detail information for each of the television programs in the identified group,
  wherein the updating of the state of the displayed graphical user interface to reflect the new currently selected time includes displaying in a coordinated manner in one or more other display areas of the displayed graphical user interface additional detail information that reflects the new currently selected time, and
  wherein the maintaining of the state of the graphical user interface so as to reflect the new currently selected time includes maintaining coordination of information displayed in the multiple distinct display areas regarding the new currently selected time.

16. The method of claim 13 wherein the identifying of the group of the television programs for the graphical user interface is based at least in part on an amount of information capable of being displayed in a display area of the displayed graphical user interface using an initial information size and/or based at least in part on an initial size of the display area of the displayed graphical user interface, and wherein the updating of the state of the displayed graphical user interface to reflect the new currently selected time is based at least in part on a change in the information size at which information will be displayed in the display area of the displayed graphical user interface and/or based at least in part on a change in the size of the display area of the displayed graphical user interface.

17. The method of claim 13 wherein the updating of the state of the graphical user interface to reflect the new currently selected time includes displaying distinct information about one or more television programs in a coordinated manner in the plurality of distinct display areas of the displayed graphical user interface in the displayed graphical window, and wherein the maintaining of the state of the graphical user interface so as to reflect the new currently selected time includes maintaining coordination of information displayed in the plurality of distinct display areas.

18. A computer-readable storage medium, wherein the medium is not a signal, whose contents enable a computing device to present information about television programming-related content via a user interface, by performing a method comprising:
  receiving information related to multiple pieces of television programming-related content;
  presenting a user interface that has multiple distinct display areas, wherein a first display area displays the received information for at least some of the pieces of television programming-related content that satisfy a search request of television programming-related content, wherein the received information is displayed in such a manner as to reflect at least one selected category, and wherein a time scale displayed simultaneously with the first display area displays graphical indicators corresponding to at least some of the pieces of television programming-related content, wherein the graphical indicators represent future occurrences of the at least some of the pieces of television programming-related content,
    wherein a graphical indicator is displayed on the time scale in reference to a time-related characteristic of an associated piece of television programming-related content, and
    wherein the graphical indicator is selectable to display the received information for the associated piece of television programming-related content in the first display area;
  receiving an indication of a selection of a piece of television programming-related content whose information is displayed in the first display area;
  in response to the received indication of the selected piece of television programming-related content, displaying at least some of the information related to the selected piece of television programming-related content in a second display area;

receiving an indication of a selection of a new category;

in response to the received indication of the new selected category, identifying a new distinct group of the television programming-related content based on the new selected category, wherein the new distinct group does not include the selected piece of television programming-related content;

updating the information displayed in the first display area to reflect the new selected category and the identified new distinct group of television programming-related content;

when information displayed in the first display area is updated to reflect the new selected category and the identified new distinct group of television programming-related content, maintaining a state of the user interface so as to reflect the selected piece of television programming-related content, such that the displayed information related to the selected piece of television programming-related content remains displayed in the second display area until a new piece of television programming-related content is selected, and automatically updating the time scale so as to display graphical indicators corresponding to at least some pieces of the identified new distinct group of television programming-related content, wherein a graphical indicator is displayed on the time scale in reference to a time-related characteristic of an associated piece of television programming-related content, and wherein the graphical indicator is selectable to display the received information for the associated piece of television programming-related content in the first display area.

19. The computer-readable storage medium of claim 18 wherein the selection of the piece of television programming-related content is based on an indication from a user for that piece of television programming-related content, wherein the presented user interface is a graphical user interface that supports multiple types of views of information for pieces of content, and wherein updating of the information included in the user interface is based on a change in the type of view of the included information.

20. The computer-readable storage medium of claim 18 wherein the maintaining of the state of the user interface so as to reflect the selection of the one piece of television programming-related content includes providing a user-selectable control in the user interface that when selected updates the user interface to include information about the selected piece of television programming-related content.

21. A computing system configured to present information about pieces of television programming content via a graphical user interface, comprising:

a display; and a content management system configured to:

present on the display a graphical user interface whose information reflects a state that is based at least in part on one or more selected pieces of content;

automatically maintain the state of the information of the graphical user interface as being based at least in part on those selected pieces of content when the graphical user interface is updated, such that when information in a first distinct display area of the graphical user interface is updated to reflect a search request of a new category of content that does not include the one or more selected pieces of content, information about the one or more selected pieces of content remains displayed in a second distinct display area of the graphical user interface; and automatically updating a timebar displayed concurrently with the first distinct display area so as to display information for the new category of content in the form of graphical indicators, wherein the graphical indicators represent future occurrences of pieces of content of the new category of content, wherein a graphical indicator is displayed on the timebar in reference to a time-related characteristic of an associated piece of content of the new category of content, and wherein the graphical indicator is selectable by the user to display information for the associated piece of content in the first distinct display area.

22. The computing system of claim 21 wherein the computing system further comprises a device for controlling presentation of television programs on one or more television display devices, and wherein the presented graphical user interface further includes user-selectable controls to allow a user to control the presentation of the television programs on the one or more television display devices via instructions sent to the device, the device being one of a group of devices that includes a set-top box, a digital video recorder device and a media center device.

* * * * *

UNITED STATES PATENT AND TRADEMARK OFFICE
CERTIFICATE OF CORRECTION

PATENT NO.        : 7,900,228 B2
APPLICATION NO.   : 11/120664
DATED             : March 1, 2011
INVENTOR(S)       : Korina J. B. Stark et al.

Page 1 of 1

It is certified that error appears in the above-identified patent and that said Letters Patent is hereby corrected as shown below:

On page 2, under "Other Publications", in column 2, line 51, delete "Controllng" and insert -- Controlling --, therefor.

On page 3, under "Other Publications", in column 1, line 6, delete "nikkeibq.com" and insert -- nikkeibp.com --, therefor.

On page 3, under "Other Publications", in column 1, line 15, delete "Technolgy:" and insert -- Technology: --, therefor.

In column 13, line 67, delete "examples," and insert -- example, --, therefor.

In column 57, line 31, in Claim 9, after "new" insert -- distinct --.

Signed and Sealed this
Twenty-fourth Day of May, 2011

David J. Kappos
*Director of the United States Patent and Trademark Office*